United States Patent
Ooi et al.

[19]

[11] Patent Number: 6,118,564
[45] Date of Patent: Sep. 12, 2000

[54] OPTICAL TIME DIVISION DEMULTIPLEXING APPARATUS AND DEMULTIPLEXED SIGNAL SWITCHING METHOD AS WELL AS OPTICAL TIME DIVISION MULTIPLEX TRANSMISSION SYSTEM

[75] Inventors: Hiroki Ooi; George Ishikawa; Hiroshi Nishimoto, all of Kawasaki, Japan

[73] Assignee: Fujitsu Limited, Kawasaki, Japan

[21] Appl. No.: 08/893,155

[22] Filed: Jul. 15, 1997

[30] Foreign Application Priority Data

Dec. 19, 1996 [JP] Japan ................................. 8-340184

[51] Int. Cl.[7] ............................. H04J 14/08; H04J 14/02
[52] U.S. Cl. ....................... 359/139; 359/139; 359/128; 359/138
[58] Field of Search ................................. 359/117, 122, 359/123, 128, 139, 140, 161, 135, 138

[56] References Cited

U.S. PATENT DOCUMENTS 4,991,975  2/1991  Alferness et al. ........................ 370/4
5,909,297  6/1999  Ishikawa et al. ...................... 359/161

FOREIGN PATENT DOCUMENTS 4-140712  5/1992  Japan .

Primary Examiner—Jason Chan
Assistant Examiner—Mohammad Sedighian
Attorney, Agent, or Firm—Staas & Halsey LLP

[57] ABSTRACT

The invention provides an optical time division demultiplexing apparatus which can perform optical time division demultiplexing while compensating for an operating point drift of an optical time division multiplex signal. The optical time division demultiplexing apparatus includes a clock signal generation element for generating a clock signal for optical time division demultiplexing processing of a received optical signal, and an optical switch for time division demultiplexing the optical signal based on the clock signal from the clock signal generation element. The optical time division demultiplexing apparatus further includes an operating point stabilization control circuit for superposing a predetermined low frequency signal set in advance on the clock signal for optical time division demultiplexing processing to be supplied to the optical switch and controlling the clock signal to be supplied to the optical switch based on a phase difference between a component of the predetermined low frequency signal of the optical signal after time division demultiplexing processing by the optical switch and a component of the predetermined low frequency signal set in advance so that an operating point of the optical switch on an operation characteristic may be a fixed position.

56 Claims, 34 Drawing Sheets

F I G. 6
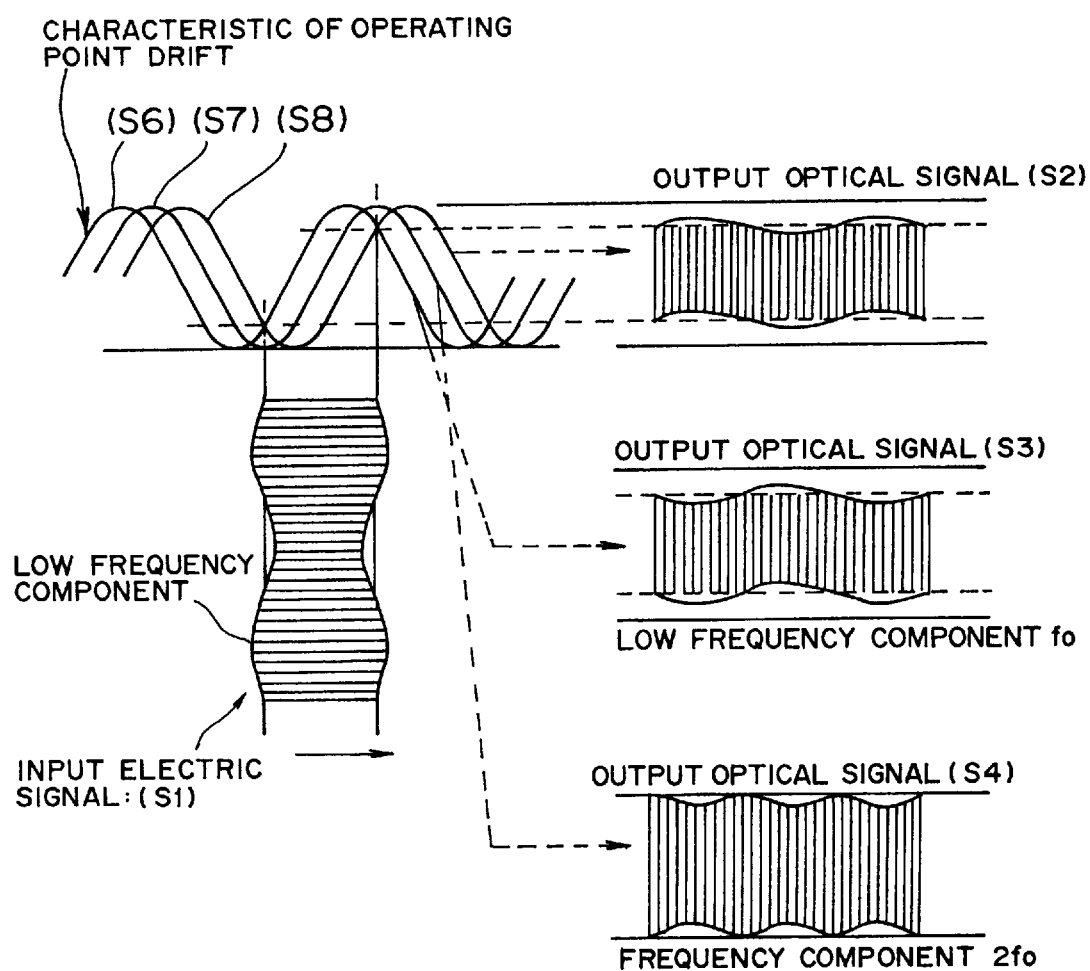

F I G. 27
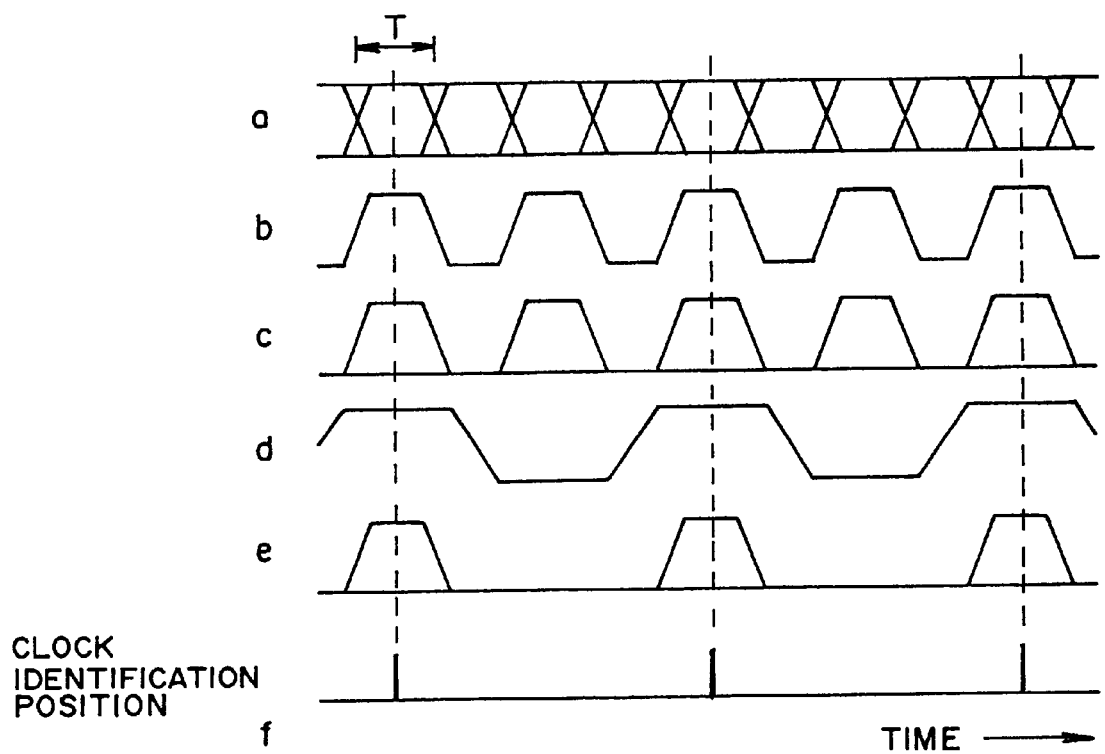

F I G. 28
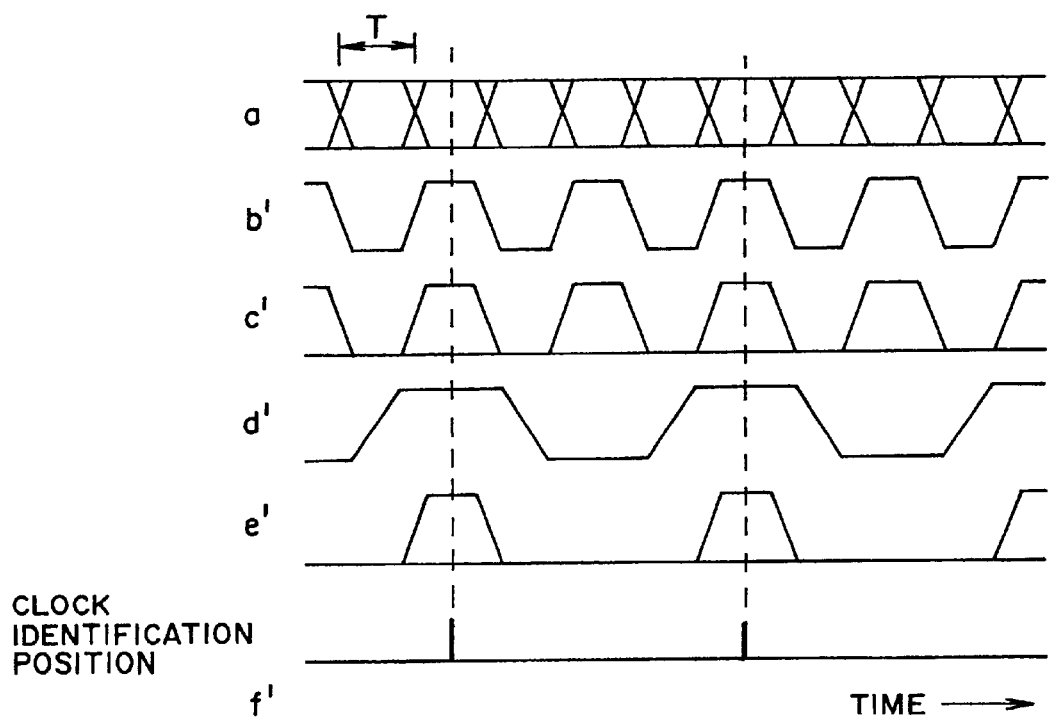

OPTICAL TIME DIVISION DEMULTIPLEXING APPARATUS AND DEMULTIPLEXED SIGNAL SWITCHING METHOD AS WELL AS OPTICAL TIME DIVISION MULTIPLEX TRANSMISSION SYSTEM

BACKGROUND OF THE INVENTION

This invention relates to an optical time division demultiplexing apparatus and a demultiplexed signal switching method as well as an optical time division multiplex transmission system suitable for use with an optical communication system which adopts an optical time division multiplex transmission method.

In recent years, as increase in information amount proceeds suddenly, increase in capacity of an optical communication system is demanded. At present, while an optical amplification multiplex repeating system having a transmission rate of 10 Gb/s (gigabit/second) is about to be put into practical use, since further increase in capacity is estimated for such a repeating system as just mentioned, development of an optical communication system which has a higher transmission rate is required In conventional large capacity optical communication systems, it is a principal countermeasure to increase the speed of operation of an electronic circuit for both of a transmission section and a reception section in order to achieve increase in capacity. In recent years, however, increase in speed of operation of an electronic circuit has been and is getting difficult. For example, also with electric devices for optical communication using Si, GaAs, HBT, HEMT and so forth to which investigation and development are directed at present, it is said that the transmission rate which can be put into practical use at present is 10 Gb/s to the utmost.

Therefore, in order to achieve increase in transmission rate of an optical transmission system to a rate higher than the working speed of an electronic device, it is considered effective to utilize multiplexing-demultiplexing in an optical region. In particular, methods of performing multiplexing-demultiplexing on the optical wavelength base or methods of performing bit multiplexing-demultiplexing on the time base seem available, and in recent years, investigation for and development of multiplexing-demultiplexing techniques which employ such methods as mentioned above have been and are being performed energetically by various institutes.

FIG. 32 is a block diagram showing an optical transmission-reception system (optical time division multiplex transmission system) which adopts an optical time division multiplexing and demultiplexing method (OTDM) described above wherein bit multiplexing-demultiplexing is performed on the time base. Referring to FIG. 32, the optical transmission-reception system is generally denoted at 100 and performs bit multiplexing-demultiplexing of an optical time division multiplex signal which consists of two signal series (hereinafter referred simply as series) of light signals. It is to be noted that also an optical transmission-reception system for three or more series can be formed similarly to the optical transmission-reception system shown in FIG. 32.

In the optical transmission-reception system 100 shown in FIG. 32, an optical transmitter 102 and an optical receiver 103 are connected to each other by a transmission line 101 formed from an optical fiber or a like element.

The optical transmitter 102 includes two optical modulation elements 104 and 105 and an optical time division multiplexing element 106 and is constructed such that a light signal including data signal information (B gigabit/second, for example, 20 Gb/s) modulated independently of each other by the two optical modulation elements 104 and 105 is optically time-division multiplexed by the optical time division multiplexing element 106 and outputs a resulting signal as an optical time-division multiplex signal (OTDM signal) of 2×B gigabit/second (for example, 40 Gb/s), which is transmitted by the transmission line 101.

The optical transmitter 102 described above includes, for example, as shown in FIG. 33, a laser diode 106a, a modulation element 106b, an oscillator 106c, a branching element 106d, a delay element 106e, modulation elements 106f and 106g and a combining element 106h.

The laser diode 106a emits CW light (Carrier Wave; light of a fixed level) as pump light. The modulation element 106b modulates the pump light from the laser diode 106a with a clock signal having a frequency of 20 GHz from the oscillator 106c.

The branching element 106d branches the light signal, which has been modulated by a clock signal component of 20 GHz by the modulation element 106b, into two. The delay element 106e delays one of the two signals branched by the branching element 106d, for example, by a half period of the clock signal of 20 GHz.

The modulation elements 106f and 106g modulate clock light pulses (data having a transmission rate of, for example, approximately 20 Gb/s) modulated by the optical modulation element 104 described above and outputs a resulting signal as an RZ (Return-to-Zero) light signal.

For example, the modulation element 106f modulates the clock light pulse signal using an electric input signal of 20 Gb/s at a timing at which a clock pulse of the light signal from the delay element 106e rises, and the modulation element 106g modulates the clock light pulse signal using another electric input signal of 20 Gb/s independent of the former electric input signal of 20 Gb/s at another timing at which a clock pulse of the light signal itself branched by the branching element 106d rises.

The combining element 106h combines the light signals (data of 20 Gb/s) modulated at different timings from each other by the modulation elements 106f and 106g and outputs a resulting light signal at a transmission rate of 2×20 Gb/s.

Meanwhile, the optical receiver 103 of the optical transmission-reception system 100 shown in FIG. 32 includes a light branching element 107, optical demultiplexers (DEMUX) 108 and 109, and identification elements 110 and 111.

The light branching element 107 receives an optical time division multiplex signal (2×B gigabit/sec, for example, 40 Gb/s) from the optical transmitter 102 via the transmission line 101 and power branches the received light signal into two. The two branched optical time division multiplex signals are outputted to the two optical demultiplexers 108 and 109.

The optical demultiplexers 108 and 109 modulate the optical time division multiplex signal branched by the light branching element 107 at different timings from each other to demultiplex the optical time division multiplex signal into signals modulated by the optical modulation elements 104 and 105 described above and outputs the demodulated signals.

Each of the optical demultiplexers 108 and 109 described above can be formed, for example, as shown in FIG. 34, from a Mach-Zehnder optical switch 112 of the 1-input 1-output (1×1) type and a driving circuit 113 for supplying driving voltages to the optical switch 112. However, for the optical switch 112, a 1-input 1-output field absorption optical switch may be used in place of a Mach-Zehnder optical switch.

The optical switch 112 has a waveguide formed such that it is first branched into two and then combined back into one. The optical switch 112 further has a pair of electrodes 112a and 112b for individually applying driving voltages to the two divided waveguide portions. Consequently, a light signal inputted to the optical switch 112 is branched on the waveguide and then passes the waveguide portions which have electric fields formed by driving voltages which will be hereinafter described, and is then combined by the combining portion and then outputted.

The driving circuit 113 receives a clock signal corresponding to the frequency of a clock signal generated by the oscillator 106c of the optical time division multiplexing element 106 on the transmission side and supplies mutually inverted (complementary) driving voltages relative to each other to the electrodes 112a and 112b.

In particular, as shown in FIG. 35, the driving circuit 113 supplies mutually inverted (complementary) driving voltages b and c relative to each other to the electrodes 112a and 112b so that one of two signals which form an inputted optical time division multiplex signal a, that is, a demultiplexed light signal d, is outputted from the optical switch 112.

It is to be noted that, if the driving voltage c is used as the driving voltage to be supplied to the electrode 112a described above and the driving voltage b is used as the driving voltage to be supplied to the electrode 112b, then the other of the two signals which forms the optical time division multiplex signal a, that is, the other demultiplexed light signal d', can be outputted.

More particularly, if the driving voltage b is used as the driving voltage to be supplied to the electrode 112a of the optical switch 112 which forms the optical demultiplexer 108 and the driving voltage c is used as the driving voltage to be supplied to the electrode 112b, then from an optical time division multiplex signal a (40 Gb/s) inputted from the light branching element 107, for example, a light signal (demultiplexed light signal d) having data information of 20 Gb/s modulated by the optical modulation element 104 can be demultiplexed.

Similarly, if the driving voltage c is used as the driving voltage to be supplied to the electrode 112a of the optical switch 112 which forms the optical demultiplexer 109 and the driving voltage b is used the driving voltage to be supplied to the electrode 112b, then from an optical time division multiplex signal (40 Gb/s) from the light branching element 107, for example, a light signal (demultiplexed light signal d') having data information of 20 Gb/s modulated by the optical modulation element 105 can be demultiplexed.

While the optical time division multiplex signal a illustrated in FIG. 35 has an NRZ (Non-Return-to-Zero) waveform, the optical demultiplexers 108 and 109 perform a similar optical demultiplexing operation also for an RZ waveform including a waveform of light pulses.

Further, the identification element 110 shown in FIG. 32 identifies actual data information from a light signal demultiplexed by the optical demultiplexer 108. Similarly, the identification element 111 identifies actual data information from a light signal demultiplexed by the optical demultiplexer 109.

Consequently, the optical receiver 103 can demultiplex an optical time division multiplex signal of 2×B gigabit/second (for example, 40 Gb/s) received via the transmission line 101 into two different original light signals of B gigabit/second (for example, 20 Gb/s) and identify the two light signals.

It is to be noted that, for the optical transmitter which performs such optical time division multiplexing processing as described above, in place of the optical transmitter 102 shown in FIG. 33, an optical transmitter which adopts a technique of multiplexing a light pulse signal obtained by modulating light from a short pulse light source may be used.

Or, in place of the optical receiver 103 described above which demultiplexes a duplex light signal, such an optical receiver 114 as shown in FIG. 36 may be used. In particular, the optical receiver 114 shown in FIG. 36 includes an optical demultiplexer (DEMUX) 115 and a pair of identification elements 116 and 117.

The optical demultiplexer 115 receives an optical time division multiplex signal (2×B gigabit/second, for example, 40 Gb/s) from the optical transmitter 102 via the transmission line 101 and performs time division demultiplexing processing for the received light signal. More particularly, as shown in FIG. 37, the optical demultiplexer 115 includes a Mach-Zehnder optical switch 118 of the 1-input 2-output (1×2) type and a driving circuit 119 for supplying a driving voltage to the optical switch 118.

The optical switch 118 has a waveguide formed thereon such that a light signal inputted thereto is branched into two and outputted as two light signals. The optical switch 118 further has a pair of electrodes 118a and 118b for supplying driving voltages to the two branched waveguide portions. Consequently, a light signal inputted to the optical switch 118 is branched on the waveguide, passes the waveguide portions which have electric fields provided by the driving voltages and is then outputted as two light signals.

The driving circuit 119 receives, similarly to the driving circuit 119 shown in FIG. 34 and described hereinabove, a clock signal corresponding to a frequency of a clock signal generated by the oscillator 106c of the optical time division multiplexing element 106 on the transmission side and supplies mutually inverted driving voltages relative to each other to the electrodes 118a and 118b.

Consequently, for example, as seen in FIG. 38, the driving circuit 119 supplies driving voltages b and c inverted relative to each other to the electrodes 118a and 118b so that one of two signals which form the inputted optical time division multiplex signal a, that is, the demultiplexed light signal d (for example, a light signal having data information modulated by the optical modulation element 104), is outputted from one of two output ports of the optical switch 118 and the other demultiplexed light signal e (for example, a light signal having data information modulated by the optical modulation element 105) is outputted from the other output port e of the optical switch 118.

By the way, the identification element 116 shown in FIG. 36 receives the demultiplexed light signal d from the one output port of the optical demultiplexer 115 and identifies actual data from the demultiplexed light signal d.

Similarly, the identification element 117 receives the demultiplexed light signal e from the other output port of the optical demultiplexer 115 and identifies actual data information from the demultiplexed light signal e.

Consequently, also the optical receiver 114 can demultiplex an optical time division multiplex signal of 2×B gigabit/second (for example, 40 Gb/s) received via the transmission line 101 back into two original light signals of B gigabit/second (for example, 20 Gb/s) and identify them.

By the way, in the Mach-Zehnder optical switches 112 and 118 which are used in the optical transmitter 102 and the optical receivers 103 and 114 described above, the powers of output lights have such a characteristic as indicated by a solid line A of FIG. 39 with respect to a potential difference between driving voltages to be applied complementarily to the two electrodes.

In this instance, as the amplitude of pulse signals to be applied from the driving circuit, such a potential difference with which the pulse signals reciprocate between "0" (a minimum output) and "1" (a maximum output) on an operation characteristic curve of the light output intensity is set. More particularly, as pulse signals to be provided by the driving voltages, such an amplitude with which the pulse signals reciprocate between Vb1 and Vb2, and also such an amplitude with which the pulse signals reciprocate between Vb2 and Vb3 can be provided.

However, while such an optical transmission-reception system 100 described above which adopts optical time division multiplexing as shown in FIG. 32 employs the Mach-Zehnder optical switch 112 for the optical demultiplexers 108 and 109 of the receiver, it has a subject to be solved in that, due to an influence of a lithium niobate construction which forms the Mach-Zehnder optical switch 112, the operating point drifts by a temperature variation or a secular change.

In particular, although the driving voltages are set such that the output intensity of the optical switch reciprocates between "0" (the minimum output) and "1" (the maximum output) of an operation characteristic curve when, for example, such an amplitude as shown in FIG. 39 that reciprocates between Vb1 and Vb2 is provided as the driving voltage, the operation characteristic curve is shifted as indicated by a broken line (B) or another broken line (C) of FIG. 39 by a temperature variation or a secular change.

In this instance, since the potential difference varies (the operating point drifts) such that it reciprocates between "0" (the minimum output) and "1" (the maximum output) on an operation characteristic curve of the light output intensity, where such an amplitude described above that reciprocates between Vb1 and Vb2 is provided, a sufficient light output intensity cannot be obtained.

Furthermore, in such an optical transmission-reception system 100 as shown in FIG. 32 which adopts optical time division multiplexing described above, the optical demultiplexer of the receiver performs optical time division demultiplexing processing for a received light signal to extract a bit train on a side required by the receiver side. However, the bit train to be extracted may be switched when necessary, and such switching must be performed efficiently taking the operating point drift described above into consideration.

SUMMARY OF THE INVENTION

It is an object of the present invention to provide an optical time division demultiplexing apparatus and an optical time division multiplex transmission system wherein an optical time division multiplex signal can be optically time division demultiplexed while compensating for an operating point drift.

It is another object of the present invention to provide a demultiplexed signal switching method which can efficiently switch a bit train to be extracted in response to a request of a receiver.

In order to attain the objects described above, according to an aspect of the present invention, there is provided an optical time division demultiplexing apparatus, comprising a clock signal generation element for generating a clock signal for optical time division demultiplexing processing of a received optical signal, an optical switch for time division demultiplexing the optical signal based on the clock signal from the clock signal generation element, and an operating point stabilization control circuit for superposing a predetermined low frequency signal set in advance on the clock signal for optical time division demultiplexing processing to be supplied to the optical switch and controlling the clock signal to be supplied to the optical switch based on a phase difference between a component of the predetermined low frequency signal of the optical signal after time division demultiplexing processing by the optical switch and a component of the predetermined low frequency signal set in advance so that an operating point of the optical switch on an operation characteristic may be a fixed position.

With the optical time division demultiplexing apparatus, since the operating point stabilization control circuit can superpose the predetermined low frequency signal set in advance by the low frequency oscillator on the clock signal for optical time division demultiplexing processing to be supplied to the optical switch, which may be a 1-input 1-output Mach-Zehnder optical switch or a 1-input 2-output Mach-Zehnder optical switch, and control the clock signal to be supplied to the optical switch based on the phase difference between a component of the low frequency signal of the optical signal after time division demultiplexing processing by the optical switch and a component of the predetermined low frequency signal set in advance by the low frequency oscillator so that the operating point of the optical switch on the operation characteristic may be a fixed position, it is advantageous in that optical time division demultiplexing can be performed for an optical time division multiplex signal while compensating for the operating point drift, and consequently, a decomposed signal having a sufficient optical output intensity can be outputted.

According to another aspect of the present invention, there is provided an optical time division demultiplexing apparatus, comprising a clock signal generation element for generating a clock signal for optical time division demultiplexing processing of a received optical signal, a plurality of optical switches connected in a plurality of stages for time division demultiplexing the optical signal based on the clock signal from the clock signal generation element so that time division demultiplexing for the received optical signal is performed by a plurality of times, and an operating point stabilization control circuit for superposing a predetermined low frequency signal set in advance on the clock signal for optical time division demultiplexing processing to be supplied to the optical switches and controlling the clock signal to be supplied to the optical switches based on a phase difference between a component of the predetermined low frequency signal of the optical signal after time division demultiplexing processing by the optical switches and a component of the predetermined low frequency signal set in advance so that operating points of the optical switches on operation characteristics may be fixed positions.

With the optical time division demultiplexing apparatus, since the low frequency detection elements, each of which may be formed from a band-pass filter, provided corresponding to the optical switches of the operating point stabilization control circuit can detect low frequency signals from an optical signal outputted from the optical switch in the last stage, a branching element for branching the output optical signal and an optical receiver for converting the branched optical signal into an electric signal can be used commonly. Consequently, the optical time division demultiplexing apparatus is advantageous in that the number of branching operations for an optical signal can be reduced and operating point stabilization control can be performed collectively. The optical time division demultiplexing apparatus is advantageous also in that increase of the circuit scale or increase of the mounting area can be achieved and miniaturization can be achieved and further in that the cost required to construct the apparatus can be reduced.

According to a further aspect of the present invention, there is provided an optical time division demultiplexing apparatus, comprising a clock signal generation element for generating a clock signal for optical time division demultiplexing processing of a received optical signal, a first optical splitting element for splitting the received optical signal into a plurality of optical signals, a plurality of optical switches for time division demultiplexing the optical signals demultiplexed by the first optical splitting element, an optical combining element for combining the optical signals time division demultiplexed by the optical switches, and an operating point stabilization control circuit for superposing a predetermined low frequency signal set in advance on the clock signal for optical time division demultiplexing processing to be supplied to the optical switches and controlling the clock signal to be supplied to the optical switches based on a phase difference between a component of the predetermined low frequency signal of the optical signal after time division demultiplexing processing by the optical switches and a component of the predetermined low frequency signal set in advance so that operating points of the optical switches on operation characteristics may be fixed positions.

With the optical time division demultiplexing apparatus, since it comprises the clock signal generation element, the first optical splitting element and the optical combining element and can superpose the predetermined low frequency signal set in advance on the clock signal for optical time division demultiplexing processing to be supplied to the optical switches and control the clock signal to be supplied to the optical switches based on a phase difference between a component of the predetermined low frequency signal of the optical signal after time division demultiplexing processing by the optical switches and a component of the predetermined low frequency signal set in advance so that operating points of the optical switches on operation characteristics may be fixed positions, components of feedback systems for performing operating point compensation for the optical switches can be used commonly and the number of branching operations for light can be reduced. Consequently, the optical time division demultiplexing apparatus is advantageous in that the loss of an optical signal can be reduced and reduction in scale of the circuit and reduction of the cost required to construct the apparatus can be achieved.

According to a still further aspect of the present invention, there is provided a demultiplexed signal switching method for switching, when an inputted optical signal is to be optically time division demultiplexed based on a clock signal using a plurality of optical switches, a signal to be time division demultiplexed and outputted, comprising the step of shifting, when a bit train to be optically time division demultiplexed by a certain one of the optical switches is switched, a phase of the clock signal to be inputted to another one of the optical switches by a desired amount in synchronism with a switching timing of the optical signal to be time division demultiplexed.

With the demultiplexed signal switching method, since, when a bit train to be optically time division demultiplexed by a certain one of the optical switches is switched, a phase of the clock signal to be inputted to a different one of the optical switches in the following stage can be shifted by a desired amount in synchronism with a switching timing of the optical signal to be time division demultiplexed, it is advantageous in that the center of the gate of the different optical switch can be prevented from being displaced from the center of a bit of the input signal and also in that a desired optical signal can be obtained efficiently and with certainty.

According to a yet further aspect of the present invention, there is provided a demultiplexed signal switching method for switching, when time division demultiplexing is to be performed based on a clock signal electrically for an electric signal obtained by conversion of an inputted optical signal after the inputted optical signal is optically time division demultiplexed by an optical switch, a signal to be time division demultiplexed and outputted, comprising the step of shifting, when a bit train to be optically time division demultiplexed by the optical switch is switched, a phase of the clock signal to be used for the electric time division demultiplexing by a desired amount in synchronism with a switching timing of the bit train to be extracted.

With the demultiplexed signal switching method, since, when a bit train to be optically time division demultiplexed by the optical switch is switched, a phase of the clock signal to be used for the electric time division demultiplexing may be shifted by a desired amount in synchronism with a switching timing of the bit train to be extracted, it is advantageous in that the center of identification when electric time division demultiplexing is to be performed can be prevented from being displaced from the center of a bit of the input signal and also in that a desired optical signal can be obtained efficiently and with certainty.

According to a yet further aspect of the present invention, there is provided a demultiplexed signal switching method for switching a signal to be time division demultiplexed and identified when data are to be identified based on an identification clock signal from an electric signal obtained by conversion of an inputted optical signal by optical time division demultiplexing by an optical switch, comprising the step of shifting, when an optical signal to be time division demultiplexed by the optical switch is switched, a phase of the identification clock signal by a desired amount in synchronism with a switching timing of the optical signal to be time division demultiplexed.

With the demultiplexed signal switching method, since, when an optical signal to be time division demultiplexed by the optical switch is switched, a phase of the identification clock signal for use for data identification can be shifted by a desired amount in synchronism with a switching timing of the optical signal to be time division demultiplexed, when switching of the bit train to be optically time division demultiplexed and extracted is to be performed, synchronization of the phase relationship between the signal after the optical time division demultiplexing processing and the identification clock signal can be established. Consequently, the demultiplexed signal switching method is advantageous in that a desired bit train can be identified efficiency and with certainty.

According to a yet further aspect of the present invention, there is provided an optical time division multiplex transmission system, comprising an optical time division multiplexing apparatus including a pump light source for outputting pump light, a low frequency oscillator for generating a predetermined low frequency signal set in advance, a low frequency superposition element for superposing the low frequency signal from the low frequency oscillator on an input clock signal and a data signal, an optical switch for performing time division multiplexing modulation of the pump light from the pump light source with the clock signal and the data signal on which the low frequency signal has been superposed by the low frequency superposition element and transmitting a resulting optical signal, a low frequency signal detection element for detecting the low frequency signal included in the optical signal time division multiplexed by the optical switch, and a bias voltage supply element for applying to the optical switch a bias voltage corresponding to a difference between a phase of the low frequency from the low frequency oscillator and a phase of the low frequency signal detected by the low frequency signal detection element, and an optical time division demultiplexing apparatus including a clock signal generation element for generating a clock signal for optical time division demultiplexing processing of a received optical signal, a low frequency oscillator for generating a predetermined low frequency signal set in advance, a low frequency superposition element for superposing the low frequency signal from the low frequency oscillator on the clock signal from the clock signal generation element, an optical switch for time division demultiplexing the received optical signal based on the clock signal on which the low frequency signal has been superposed by the low frequency superposition element, a low frequency signal detection element for detecting the low frequency signal included in the optical signal time division demultiplexed by the optical switch, and a bias voltage supply element for applying to the optical switch a bias voltage corresponding to a difference between a phase of the low frequency signal from the low frequency oscillator and a phase of the low frequency signal detected by the low frequency detection element.

With the optical time division multiplex transmission system, since the operating point stabilization control circuit can superpose the predetermined low frequency signal set in advance by the low frequency oscillator on the clock signal for optical time division demultiplexing processing to be supplied to the optical switch, which may be a 1-input 1-output Mach-Zehnder optical switch or a 1-input 2-output Mach-Zehnder optical switch, and control the clock signal to be supplied to the optical switch based on the phase difference between a component of the low frequency signal of the optical signal after time division demultiplexing processing by the optical switch and a component of the predetermined low frequency signal set in advance by the low frequency oscillator so that the operating point of the optical switch on the operation characteristic may be a fixed position, it is advantageous in that optical time division demultiplexing can be performed for an optical time division multiplex signal while compensating for the operating point drift, and consequently, a decomposed signal having a sufficient optical output intensity can be outputted.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 6 is a waveform diagram illustrating operation of the optical time division demultiplexing apparatus of FIG. 4;

FIGS. 27 and 28 are time charts illustrating operation of the time division demultiplexing apparatus of FIG. 26;

DESCRIPTION OF THE PREFERRED EMBODIMENTS a. Aspects of the Invention

Several aspects of the present invention are described first with reference to the accompanying drawings.

Figure 1:
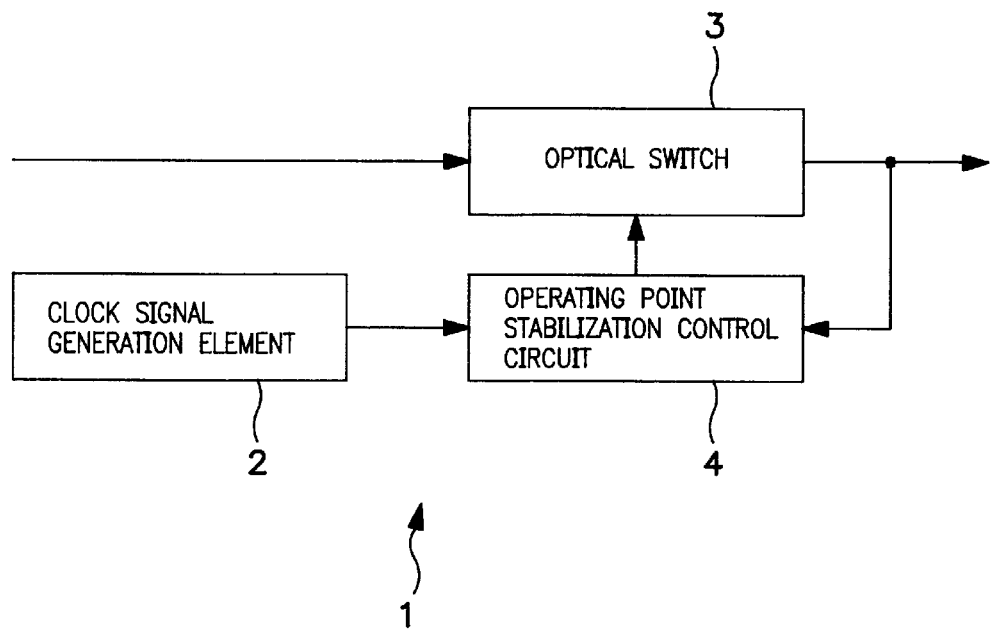
FIGS. 1 to 3 are block diagrams illustrating different aspects of the present invention.

FIG. 1 illustrates in block diagram an aspect of the present invention and shows an optical time division demultiplexing apparatus 1 which includes a clock signal generation element 2, an optical switch 3 and an operating point stabilization control circuit 4.

The clock signal generation element 2 generates a clock signal for optical time division demultiplexing processing of a received optical signal. The optical switch 3 time division demultiplexes the optical signal based on the clock signal from the clock signal generation element 2.

The operating point stabilization control circuit 4 superposes a predetermined low frequency signal set in advance on the clock signal for optical time division demultiplexing processing to be supplied to the optical switch 3 and controlling the clock signal to be supplied to the optical switch 3 based on a phase difference between a component of the predetermined low frequency signal of the optical signal after time division demultiplexing processing by the optical switch 3 and a component of the predetermined low frequency signal set in advance so that an operating point of the optical switch 3 on an operation characteristic may be a fixed position.

The operating point stabilization control circuit 4 mentioned above may include a low frequency oscillator for generating the predetermined low frequency signal set in advance, a low frequency superposition element for superposing the low frequency signal from the low frequency oscillator on the clock signal from the clock signal generation element 2 and outputting a resulting signal as the clock signal to the optical switch 3, a low frequency signal detection element for detecting the low frequency signal included in the optical signal that is time division demultiplexed by the optical switch 3, and a bias voltage supply element for applying to the optical switch 3 a bias voltage corresponding to a difference between a phase of the low frequency signal from the low frequency oscillator and a phase of the low frequency signal detected by the low frequency signal detection element.

Accordingly, the optical time division demultiplexing apparatus is advantageous in that, since the operating point stabilization control circuit 4 can superpose the predetermined low frequency signal set in advance by the low frequency oscillator on the clock signal for optical time division demultiplexing processing to be supplied to the optical switch 3, which may be a 1-input 1-output Mach-Zehnder optical switch or a 1-input 2-output Mach-Zehnder optical switch, and control the clock signal to be supplied to the optical switch 3 based on the phase difference between a component of the low frequency signal of the optical signal after time division demultiplexing processing by the optical switch 3 and a component of the predetermined low frequency signal set in advance by the low frequency oscillator so that the operating point of the optical switch 3 on the operation characteristic may be a fixed position, optical time division demultiplexing can be performed for an optical time division multiplex signal while compensating for the operating point drift, and consequently, a decomposed signal having a sufficient optical output intensity can be outputted.

Figure 2:
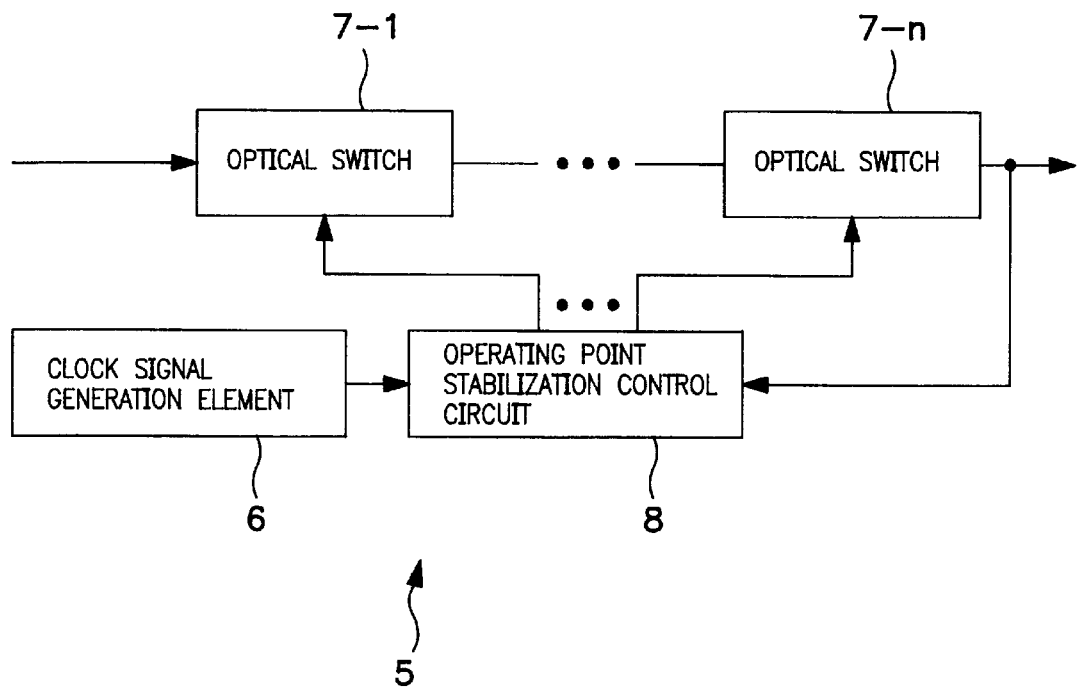

FIG. 2 illustrates in block diagram another aspect of the present invention and shows an optical time division demultiplexing apparatus 5 which includes a clock signal generation element 6, a plurality of optical switches 7-1 to 7-n (n; an integer equal to or larger than 2) and an operating point stabilization control circuit 8. The clock signal generation element 6 generates a clock signal for optical time division demultiplexing processing of a received optical signal. The optical switches 7-1 to 7-n time division demultiplex an optical signal based on the clock signal from the clock signal generation element 6. In particular, the optical switches 7-1 to 7-n are connected in a plurality of stages so that time division demultiplexing for the received optical signal is performed a plurality of times.

The operating point stabilization control circuit 8 superposes a predetermined low frequency signal set in advance on the clock signal for optical time division demultiplexing processing to be supplied to the optical switches 7-1 to 7-n and controls the clock signal to be supplied to the optical switches 7-1 to 7-n based on a phase difference between a component of the predetermined low frequency signal of the optical signal after time division demultiplexing processing by the optical switches 7-1 to 7-n and a component of the predetermined low frequency signal set in advance so that operating points of the optical switches 7-1 to 7-n on operation characteristics may be fixed positions.

The operating point stabilization control circuit 8 described above may include, provided for each of the optical switches 7-1 to 7-n, a low frequency oscillator, a low frequency superposition element, a low frequency signal detection element, and a bias voltage supply element.

The low frequency oscillators generate predetermined low frequency signals different from each other. Each of the low frequency superposition elements superposes a predetermined low frequency signal from the corresponding low frequency oscillator on the clock signal from the clock signal generation element 6 and outputs a resulting signal as the clock signal to the corresponding optical switch 7-i (i; arbitrary integer from within 1 to n). Each of the low frequency signal detection elements detects the low frequency signal from the optical signal outputted from the optical switch 7-n in the last stage.

The bias voltage supply element applies to the corresponding optical switch 7-i a bias voltage corresponding to a difference between a phase of the low frequency signal from the low frequency oscillator and a phase of the low frequency signal detected by the low corresponding low frequency signal detection element.

With the optical time division demultiplexing apparatus, since the low frequency detection elements, each of which may be formed from a band-pass filter, provided corresponding to the optical switches 7-1 to 7-n of the operating point stabilization control circuit 8 can detect low frequency signals from an optical signal outputted from the optical switch 7-n in the last stage, a branching element for branching the output optical signal and an optical receiver for converting the branched optical signal into an electric signal can be used commonly. Consequently, the optical time division demultiplexing apparatus is advantageous in that the number of branching operations for an optical signal can be reduced and operating point stabilization control can be performed collectively. The optical time division demultiplexing apparatus is advantageous also in that increase of the circuit scale or increase of the mounting area can be suppressed and miniaturization can be achieved and further in that the cost required to construct the apparatus can be reduced.

Alternatively, the operating point stabilization control circuit 8 described above may include low frequency oscillator, a low frequency signal detection element, a phase difference detection element, a plurality of low frequency superposition elements, a plurality of bias voltage holding elements, a first change-over switch and a second change-over switch.

The low frequency oscillator generates a predetermined low frequency signal set in advance. The low frequency signal detection element detects the low frequency signal from the optical signal outputted from the optical switch 7-n in the last stage. The phase difference detection element detects a difference between a phase of the low frequency signal from the low frequency oscillator and a phase of the low frequency signal detected by the low frequency signal detection element.

The low frequency superposition elements are provided individually for the optical switches 7-1 to 7-n in the individual stages and superpose the low frequency signal from the low frequency oscillator on the clock signal from the clock signal generation element 6. The bias voltage holding elements are provided individually for the optical switches 7-1 to 7-n in the individual stages and temporarily hold bias voltages corresponding to detection information of the phase difference from the phase different detection element.

The first change-over switch switches the low frequency signal from the low frequency oscillator to selectively output the low frequency signal to one of the low frequency superposition elements in the individual stages. The second change-over switch switches the phase difference detection information from the phase difference detection element to selectively output the phase difference detection information to one of the bias voltage holding elements in the individual stages.

The operating point stabilization control circuit 8 controls switching of the first and second change-over switches so that control of an operating point of a clock signal to be supplied to a selected one of the optical switches 7-1 to 7-n to a fixed position of an operation characteristic of the optical switch 7-1 to 7-n is performed by switching the selected optical switch 7-1 to 7-n, and controls updating of information of the bias voltages to be held by the bias voltage holding elements.

With the optical time division demultiplexing apparatus, since the operating point stabilization control circuit 8 controls switching of the first and second change-over switches so that control of an operating point of a clock signal to be supplied to a selected one of the optical switches 7-1 to 7-n to a fixed position of an operation characteristic of the optical switch 7-1 to 7-n is performed by switching the selected optical switch 7-1 to 7-n, and controls updating of information of the bias voltages to be held by the bias voltage holding elements, components of feedback systems for performing operating point compensation for the optical switches 7-1 to 7-n can be used commonly and the number of branching operations for light can be reduced. Consequently, the optical time division demultiplexing apparatus is advantageous in that the loss of monitor light as a demultiplexed signal can be reduced and reduction in scale of the circuit and reduction of the cost required to construct the apparatus can be achieved.

Figure 3:
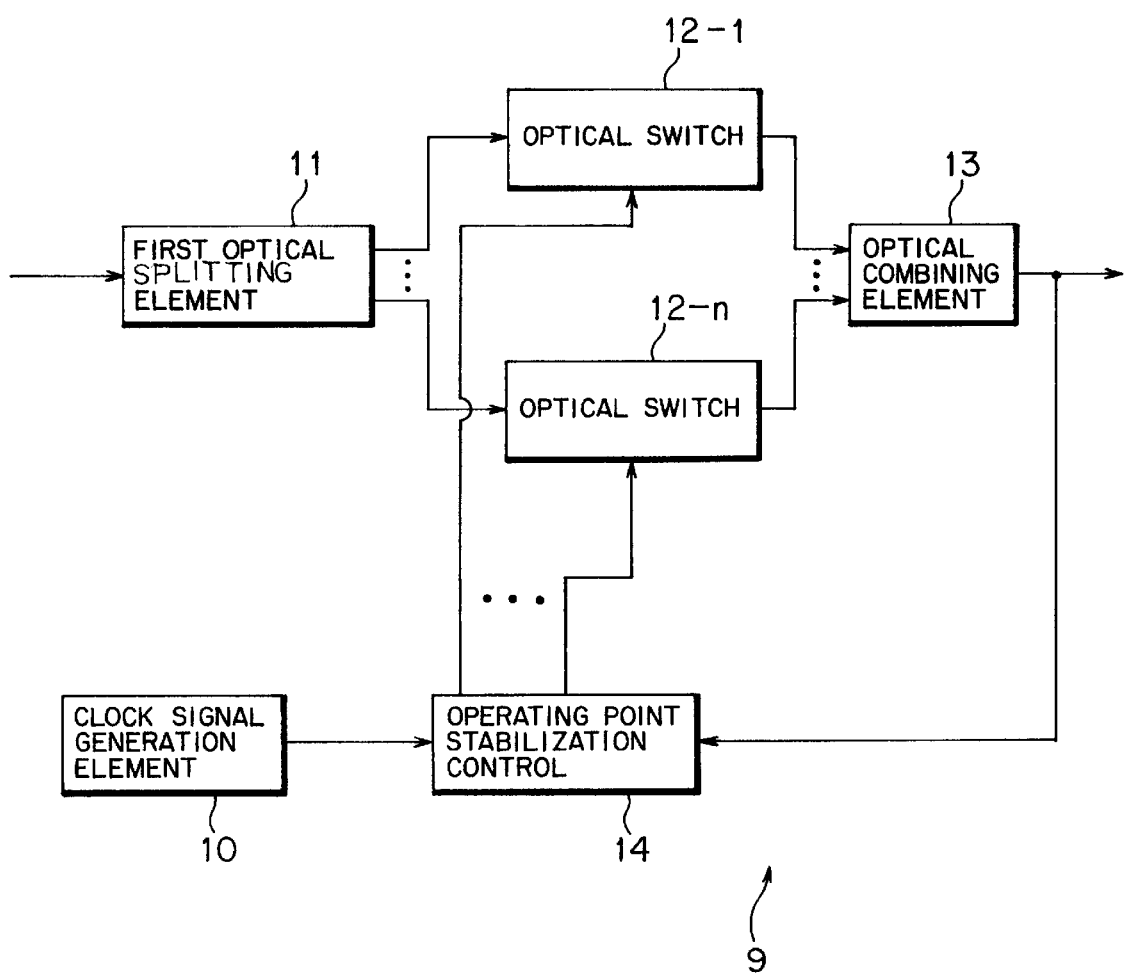

Further, FIG. 3 illustrates in block diagram a further aspect of the present invention and shows an optical time division demultiplexing apparatus 9 which includes a clock signal generation element 10, a first optical splitting element 11, a plurality of optical switches 12-1 to 12-n, an optical combining element 13 and an operating point stabilization control circuit 14.

The clock signal generation element 10 generates a clock signal for optical time division demultiplexing processing of a received optical signal. The first optical splitting element 11 demultiplexes the received optical signal into a plurality of optical signals.

Each optical switch 12-i (i; integer within 1 to n) time division demultiplexes a corresponding optical signal demultiplexed by the first optical splitting element 11. The optical combining element 13 combines optical signals time division demultiplexed by the optical switches 12-1 to 12-n.

The operating point stabilization control circuit 14 superposes a predetermined low frequency signal set in advance on the clock signal (for optical time division demultiplexing processing) to be supplied to each optical switch 12-i, and controls the clock signal to be supplied to the optical switches based on a phase difference between a component of the predetermined low frequency signal of the optical signal after time division demultiplexing processing by the optical switches and a component of the predetermined low frequency signal set in advance so that operating points of the optical switches on operation characteristics may be fixed positions.

The operating point stabilization control circuit 14 includes, provided for each optical switch 12-i, a low frequency oscillator, a low frequency superposition element, a low frequency signal detection element and a bias voltage supply element.

The low frequency oscillators generate predetermined low frequency signals different from each other. The low frequency superposition element superposes the predetermined low frequency signal from the low frequency oscillator on the clock signal from the clock signal generation element 10. The low frequency signal detection element detects the low frequency signal from the optical signal combined by the optical combining element 13.

The bias voltage supply element applies to each optical switch 12-i a bias voltage corresponding to a difference between a phase of the low frequency signal from the low frequency oscillator and a phase of the low frequency signal detected by the low frequency signal detection element.

With the optical time division demultiplexing apparatus, since it comprises the clock signal generation element 10, the first optical splitting element 11 and the optical combining element 13 and can superpose the predetermined low frequency signal set in advance on the clock signal for optical time division demultiplexing processing to be supplied to the optical switches 12-1 to 12-n and control the clock signal to be supplied to the optical switches 12-1 to 12-n based on a phase difference between a component of the predetermined low frequency signal of the optical signal after time division demultiplexing processing by the optical switches 12-1 to 12-n and a component of the predetermined low frequency signal set in advance so that operating points of the optical switches 12-1 to 12-n on operation characteristics may be fixed positions, components of feedback systems for performing operating point compensation for the optical switches 12-1 to 12-n can be used commonly and the number of branching operations for light can be reduced. Consequently, the optical time division demultiplexing apparatus is advantageous in that the loss of an optical signal can be reduced and reduction in scale of the circuit and reduction of the cost required to construct the apparatus can be achieved.

Alternatively, the operating point stabilization control circuit 14 may include a low frequency oscillator, a low frequency signal detection element, a bias voltage supply element, a plurality of low frequency superposition elements, a plurality of bias voltage holding elements, a first change-over switch, and a second change-over switch.

The low frequency oscillator generates a predetermined low frequency signal set in advance. The low frequency signal detection element detects the low frequency signal from the optical signal combined by the optical combining element 13. The bias voltage supply element applies to the optical switches 12-1 to 12-n a bias voltage corresponding to the difference between a phase of the low frequency signal from the low frequency oscillator and a phase of the low frequency signal detected by the low frequency signal detection element.

The low frequency superposition elements are provided individually for the optical switches 12-1 to 12-n and superpose the low frequency signal from the low frequency oscillator on the clock signal from the clock signal generation element 10.

The bias voltage holding elements are provided individually for the optical switches 12-1 to 12-n and temporarily hold information of the bias voltage from the bias voltage supply element.

The first change-over switch switches the low frequency signal from the low frequency oscillator to selectively output the low frequency signal to one of the low frequency superposition elements. The second change-over switch switches the bias voltage from the bias voltage supply element to selectively output the bias voltage to one of the bias voltage holding elements.

The operating point stabilization control circuit 14 controls switching of the first and second change-over switches such that the bias voltage from the bias voltage supply element is supplied so that an operating point of the clock signal to be supplied to a selected one of the optical switches 12-1 to 12-n may be a fixed position on an operation characteristic of the selected one of the optical switches 12-1 to 12-n, and controls updating of the information of the bias voltages held by the bias voltage holding elements.

With the optical time division demultiplexing apparatus, since switching of the first and second change-over switches is controlled so that control of the operating point of the clock signal to be supplied to a selected one of the optical switches 12-1 to 12-n to a fixed position on an operation characteristic of the selected switch may be performed, and so that switching the same with respect to time and updating of the information of the bias voltages held by the bias voltage holding elements is controlled, components of feedback systems for performing operating point compensation for the optical switches 12-1 to 12-n can be used commonly and the number of branching operations for light can be reduced. Consequently, the optical time division demultiplexing apparatus is advantageous in that the loss of an optical signal can be reduced and reduction in scale of the circuit and reduction of the cost required to construct the apparatus can be achieved.

The first optical splitting element 11 described above may be constructed so as to wavelength demultiplex a wavelength multiplexed component of the received signal light. Where this construction is employed, the optical time division demultiplexing apparatus is advantageous in that it can perform optical time division demultiplexing processing also for an optical time division multiplex signal for which wavelength multiplexing processing has been performed.

Or, the first optical splitting element 11 may be constructed so as to demultiplex two polarized wave components of the received signal light. In this instance, a second optical splitting element for demultiplexing two polarized wave components of the optical signal combined by the optical combining element 13 may be provided in a stage preceding the operating point stabilization control circuit 14.

With the optical time division demultiplexing apparatus, where the first optical splitting element 11 is constructed so as to demultiplex two polarized wave components of the received signal light and the second optical splitting element for demultiplexing two polarized wave components of the optical signal combined by the optical combining element 13 is provided in a stage preceding the operating point stabilization control circuit 14, it is advantageous in that it can be constructed as an apparatus of the polarization non-dependent type.

In any of the optical time division demultiplexing apparatus 1, 5 and 9 shown in FIGS. 1 to 3, the bias voltage supply element of the operating point stabilization control circuit 4, 8 or 14 may be constructed such that it detects a drift of an operating characteristic of the corresponding optical switch based on a difference between the phase of the low frequency signal from the corresponding low frequency oscillator and the phase of the low frequency signal detected by the corresponding low frequency signal detection element, and supplies a bias voltage with which the operating point of the clock signal to be supplied to the optical switch 3, 7-1 to 7-n or 12-1 to 12-n is controlled to a fixed position of the operating characteristic.

In this instance, the bias voltage supply element 4, 8 or 14 may be constructed such that it includes a drift detection element for detecting a drift of the operation characteristic of the corresponding optical switch 3, 7-1 to 7-n or 12-1 to 12-n based on the difference between the phase of the low frequency signal detected by the corresponding low frequency signal detection element and the phase of the low frequency signal from the corresponding low frequency oscillator, and a bias voltage application element for applying a bias voltage corresponding to the drift detected by the drift detection element in a superposing relationship with the clock signal to be supplied to the corresponding optical switch 3, 7-1 to 7-n or 12-1 to 12-n.

Further, any of the optical time division demultiplexing apparatus 1, 5 and 9 shown in FIGS. 1 to 3 may be constructed such that it further comprises a branching element for branching the optical signal outputted from the optical switch or switches 3, 7-1 to 7-n or 12-1 to 12-n and a photo-electric conversion element for converting the optical signal branched by the branching element into an electric signal and the low frequency signal detection element is formed from a band-pass filter capable of passing therethrough the predetermined low frequency component of the electric signal from the photo-electric conversion element.

Further, any of the optical time division demultiplexing apparatus 1, 5 and 9 shown in FIGS. 1 to 3 may be constructed such that it further comprises an extraction bit train switching element for switching a bit train to be time division demultiplexed and extracted from the optical switch or switches 3, 7-1 to 7-n or 12-1 to 12-n. In this instance, the extraction bit train switching element may be constructed such that it shifts the operating point of the optical switch 3, 7-1 to 7-n or 12-1 to 12-n, from one in which a bit train is to be time division demultiplexed and extracted, on the operation characteristic by one half period.

Furthermore, the extraction bit train switching element may be formed from a clock variation element for varying a component of the clock signal from the clock signal generation element 2, 6 or 10 and outputting a resulting signal to the optical switch 3, 7-1 to 7-n or 12-1 to 12-n from which a bit train is to be time division demultiplexed and extracted.

In this instance, the clock variation element may be constructed such that it is capable of reversing the clock signal from the clock signal generation element 2, 6 or 10 or such that it is capable of delaying the clock signal from the clock signal generation element 2, 6 or 10 by one half period.

Or, the extraction bit train switching element may be formed from an optical path length switch interposed in a stage preceding to the optical switch or switches 3, 7-1 to 7-n or 12-1 to 12-n and capable of switching the bit train to that of an optical path with which an optical path length of the received light signal is varied by one time slot.

Accordingly, the optical time division demultiplexing apparatus is advantageous also in that, since the bit train to be extracted after time division demultiplexing can be switched arbitrarily by the extraction bit train switching element for switching a bit train to be time division demultiplexed and extracted by the optical switch or switches 3, 7-1 to 7-n or 12-1 to 12-n, reception setting can be performed in accordance with a requirement of a receiver of the optical signal.

Further, any of the optical time division demultiplexing apparatus 1, 5 and 9 described hereinabove with reference to FIGS. 1 to 3 may be constructed such that the optical switch 3 or each of the optical switches 7-1 to 7-n, 12-1 to 12-n is formed from a 1-input 1-output Mach-Zehnder optical switch or from a 1-input 2-output Mach-Zehnder optical switch.

Accordingly, the optical time division demultiplexing apparatus is advantageous in that, since the operating point stabilization control circuit 14 can superpose a predetermined low frequency signal set in advance by the low frequency oscillator or each of the low frequency oscillators on the clock signal for optical time division demultiplexing processing to be supplied to the corresponding optical switch 3, 7-1 to 7-n or 12-1 to 12-n, which may be a 1-input 1-output Mach-Zehnder optical switch or a 1-input 2-output Mach-Zehnder optical switch, and control the clock signal to be supplied to the optical switch 3, 7-1 to 7-n or 12-1 to 12-n based on the phase difference between a component of the low frequency signal of the optical signal after time division demultiplexing processing by the optical switch 3 or optical switches 7-1 to 7-n or 12-1 to 12-n and a component of the predetermined low frequency signal set in advance by the low frequency oscillator so that the operating point of the optical switch 3 on the operation characteristic may be a fixed position, optical time division demultiplexing can be performed for an optical time division multiplex signal while compensating for the operating point drift, and consequently, a decomposed signal having a sufficient optical output intensity can be outputted.

On the other hand, according to the present invention, a demultiplexed signal switching method for switching, when an inputted optical signal is to be optically time division demultiplexed based on a clock signal using a plurality of optical switches, a signal to be time division demultiplexed and outputted, is characterized in that, when a bit train to be optically time division demultiplexed by a certain one of the optical switches is switched, a phase of the clock signal to be inputted to another one of the optical switches is shifted by a desired amount in synchronism with a switching timing of the optical signal to be time division demultiplexed.

Accordingly, with the demultiplexed signal switching method, since, when a bit train to be optically time division demultiplexed by a certain one of the optical switches is switched, a phase of the clock signal to be inputted to a different one of the optical switches in the following stage can be shifted by a desired amount in synchronism with a switching timing of the optical signal to be time division demultiplexed, it is advantageous in that the center of the gate of the different optical switch can be prevented from being displaced from the center of a bit of the input signal and also in that a desired optical signal can be obtained efficiently and with certainty.

According to the present invention, another demultiplexed signal switching method for switching, when time division demultiplexing is to be performed based on a clock signal electrically for an electric signal obtained by conversion of an inputted optical signal after the inputted optical signal is optically time division demultiplexed by an optical switch, a signal to be time division demultiplexed and outputted is characterized in that, when a bit train to be optically time division demultiplexed by the optical switch is switched, a phase of the clock signal to be used for the electric time division demultiplexing is shifted by a desired amount in synchronism with a switching timing of the bit train to be extracted.

Accordingly, with the demultiplexed signal switching method, since, when a bit train to be optically time division demultiplexed by the optical switch is switched, a phase of the clock signal to be used for the electric time division demultiplexing may be shifted by a desired amount in synchronism with a switching timing of the bit train to be extracted, it is advantageous in that the center of identification when electric time division demultiplexing is to be performed can be prevented from being displaced from the center of a bit of the input signal and also in that a desired optical signal can be obtained efficiently and with certainty.

According to the present invention, a further demultiplexed signal switching method for switching a signal to be time division demultiplexed and identified when data are to be identified based on an identification clock signal from an electric signal obtained by conversion of an inputted optical signal by optical time division demultiplexing by an optical switch is characterized in that, when an optical signal to be time division demultiplexed by the optical switch is switched, a phase of the identification clock signal is shifted by a desired amount in synchronism with a switching timing of the optical signal to be time division demultiplexed.

Accordingly, with the demultiplexed signal switching method, since, when an optical signal to be time division demultiplexed by the optical switch is switched, a phase of the identification clock signal for use for data identification can be shifted by a desired amount in synchronism with a switching timing of the optical signal to be time division demultiplexed, when switching of the bit train to be optically time division demultiplexed and extracted is to be performed, synchronization of the phase relationship between the signal after the optical time division demultiplexing processing and the identification clock signal can be established. Consequently, the demultiplexed signal switching method is advantageous in that a desired bit train can be identified efficiency and with certainty.

Further, according to the present invention, an optical time division multiplex transmission system is characterized in that it comprises an optical time division multiplexing apparatus including a pump light source for outputting pump light, a low frequency oscillator for generating a predetermined low frequency signal set in advance, a low frequency superposition element for superposing the low frequency signal from the low frequency oscillator on an input clock signal and a data signal, an optical switch for performing time division multiplexing modulation of the pump light from the pump light source with the clock signal and the data signal on which the low frequency signal has been superposed by the low frequency superposition element and transmitting a resulting optical signal, a low frequency signal detection element for detecting the low frequency signal included in the optical signal time division multiplexed by the optical switch, and a bias voltage supply element for applying to the optical switch a bias voltage corresponding to a difference between a phase of the low frequency from the low frequency oscillator and a phase of the low frequency signal detected by the low frequency signal detection element, and an optical time division demultiplexing apparatus including a clock signal generation element for generating a clock signal for optical time division demultiplexing processing of a received optical signal, a low frequency oscillator for generating a predetermined low frequency signal set in advance, a low frequency superposition element for superposing the low frequency signal from the low frequency oscillator on the clock signal from the clock signal generation element, an optical switch for time division demultiplexing the received optical signal based on the clock signal on which the low frequency signal has been superposed by the low frequency superposition element, a low frequency signal detection element for detecting the low frequency signal included in the optical signal time division demultiplexed by the optical switch, and a bias voltage supply element for applying to the optical switch a bias voltage corresponding to a difference between a phase of the low frequency signal from the low frequency oscillator and a phase of the low frequency signal detected by the low frequency detection element.

Accordingly, the optical time division multiplex transmission system is advantageous in that, since the operating point stabilization control circuit can superpose the predetermined low frequency signal set in advance by the low frequency oscillator on the clock signal for optical time division demultiplexing processing to be supplied to the optical switch, which may be a 1-input 1-output Mach-Zehnder optical switch or a 1-input 2-output Mach-Zehnder optical switch, and control the clock signal to be supplied to the optical switch based on the phase difference between a component of the low frequency signal of the optical signal after time division demultiplexing processing by the optical switch and a component of the predetermined low frequency signal set in advance by the low frequency oscillator so that the operating point of the optical switch on the operation characteristic may be a fixed position, optical time division demultiplexing can be performed for an optical time division multiplex signal while compensating for the operating point drift, and consequently, a decomposed signal having a sufficient optical output intensity can be outputted.

b. First Embodiment

Several preferred embodiments of the present invention are described below with reference to the accompanying drawings.

Figure 4:
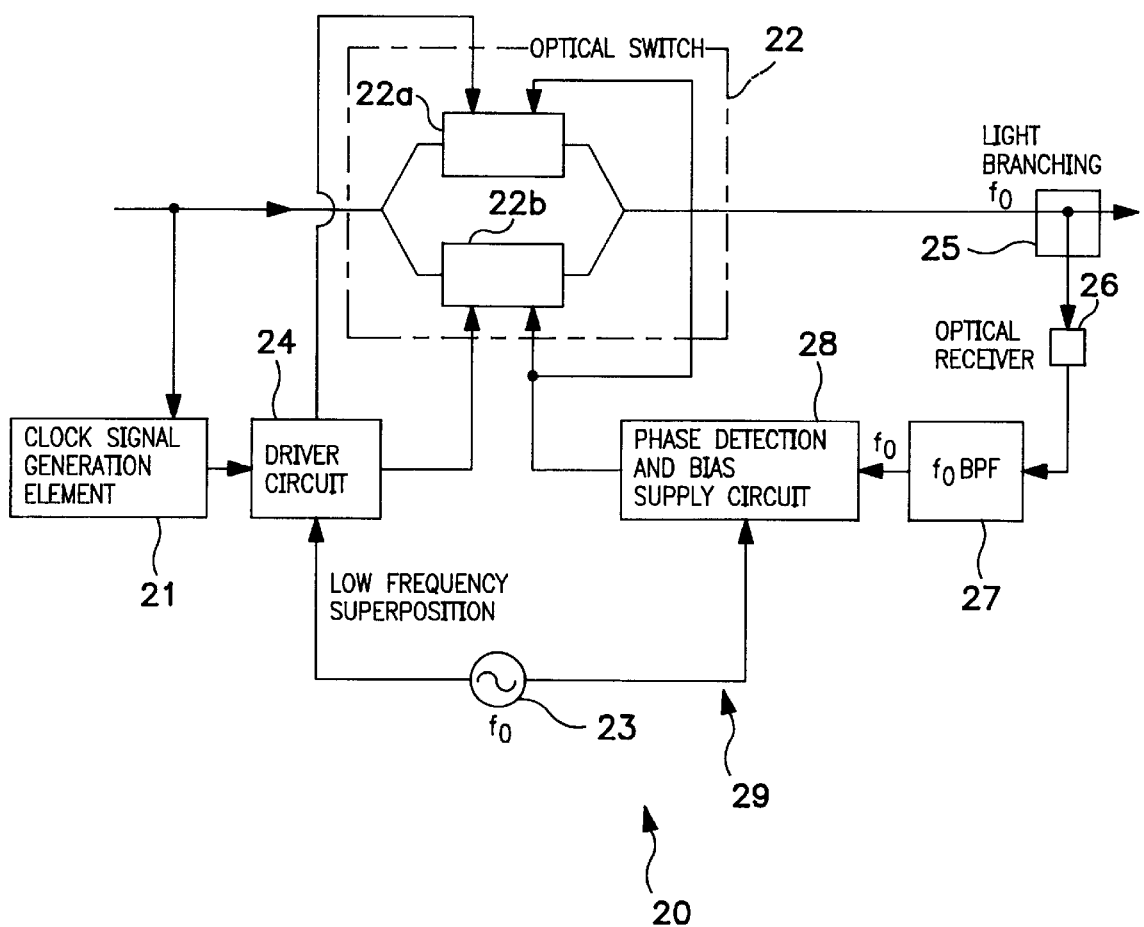
FIG. 4 is a block diagram showing an optical time division demultiplexing apparatus according to a first embodiment of the present invention.

FIG. 4 is a block diagram showing an optical time division demultiplexing apparatus according to a first preferred embodiment of the present invention. Referring to FIG. 4, the optical time division demultiplexing apparatus shown can be applied as the optical demultiplexer 108 or 109 of the optical receiver 103 described hereinabove with reference to FIG. 32 (that is, can be disposed at the position of the optical demultiplexer 108 or 109).

In other words, in the optical time division multiplexing apparatus of the first embodiment, an optical receiver is constructed by disposing an optical demultiplexer (DEMUX) 20 at the position of each of the optical demultiplexers 108 and 109.

Figure 32:
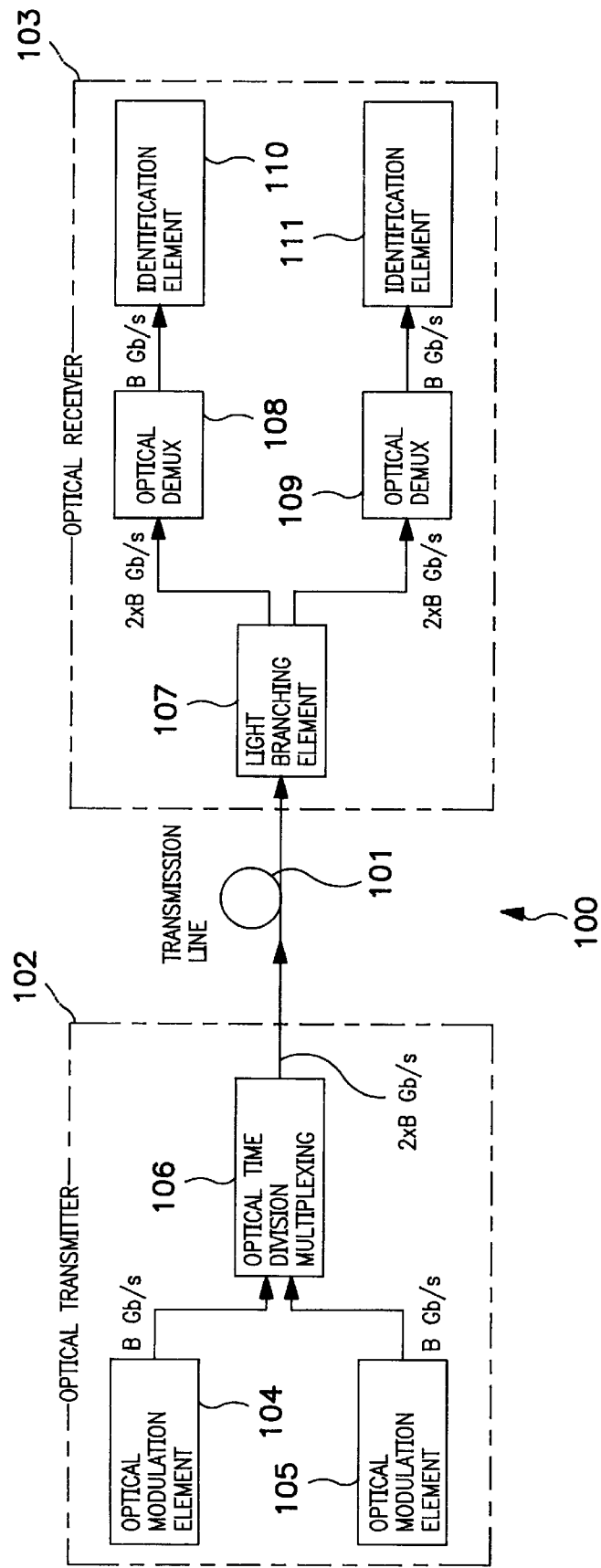
FIG. 32 is a block diagram showing an optical transmission and reception system which adopts an optical time division multiplexing and demultiplexing method.

It is to be noted that, similarly as in the optical time division demultiplexing apparatus of FIG. 32 described hereinabove, the optical demultiplexers 20 disposed at the positions of the optical demultiplexers 108 and 109 modulate a time division multiplex signal branched by the light branching element 107 at different timings from each other to demultiplex the time division multiplex signal into series of signals different from each other and output the signals.

Consequently, similarly as in the optical time division demultiplexing apparatus of FIG. 32 described hereinabove, also the optical receiver 103 which includes the optical demultiplexers 20 for the optical demultiplexers 108 and 109 demultiplexes an optical time division multiplex signal of 2×B gigabit/second (for example, 40 Gb/s) received via the transmission line 101 back into two different light signals of B gigabit/second (for example, 20 Gb/s) and identifies the light signals.

The optical demultiplexer 20 shown in FIG. 4 includes a clock signal generation element 21, an optical switch 22, a low frequency oscillator 23, a low frequency superposition element 24, a light branching element 25, an optical receiver 26, a band-pass filter 27 and a phase detection and bias supply circuit 28.

Figure 33:
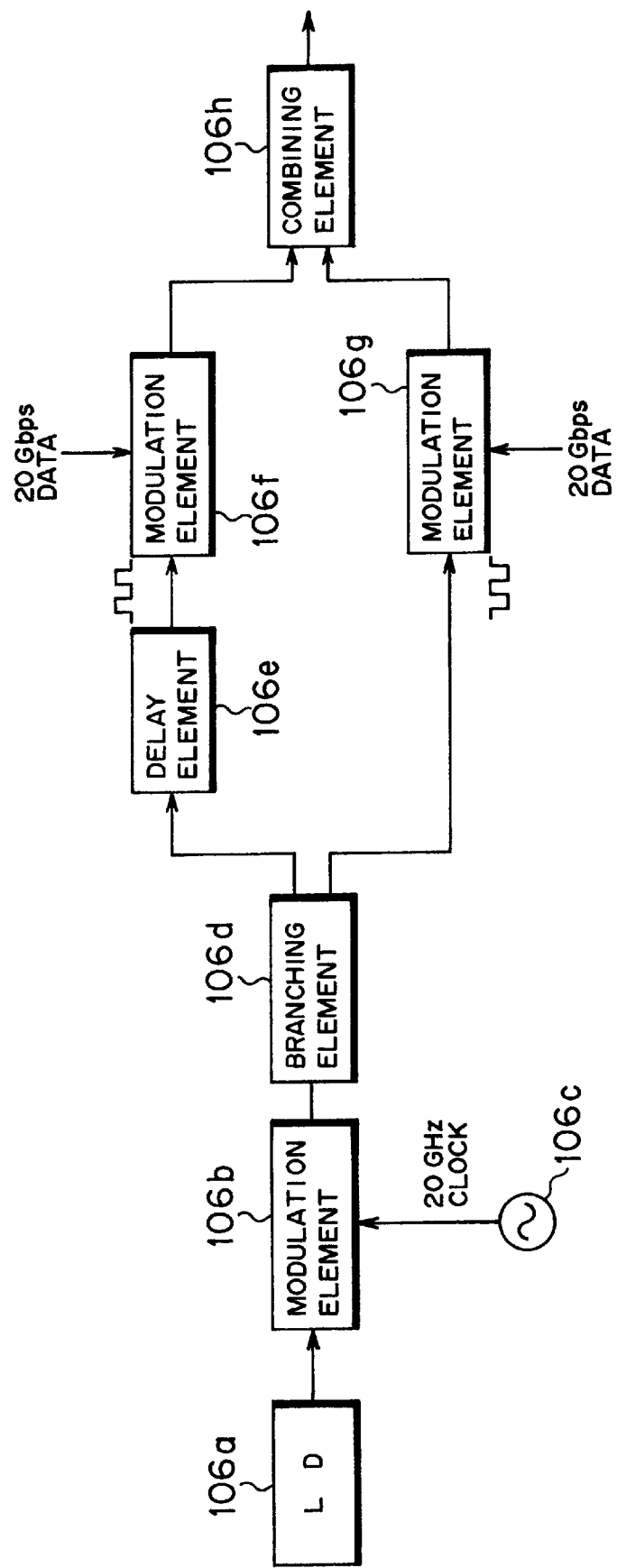
FIGS. 33 and 34 are block diagrams showing details of different components of the optical transmission and reception system shown in FIG. 32.

The clock signal generation element 21 generates a clock signal for optical time division demultiplexing processing of a received light signal. In particular, the clock signal generation element 21 extracts a clock signal component modulated by the modulation element 106b (refer to FIG. 33) of the optical time division multiplexing element 106 on the transmission side from a received light signal and generates the clock signal for optical time division multiplexing processing from the clock signal component.

Figure 34:
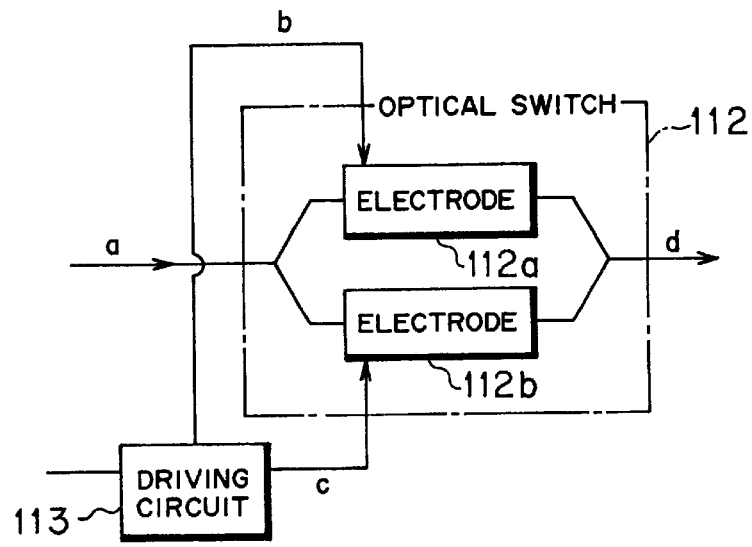

The optical switch 22 is formed from a 1×2 Mach-Zehnder optical switch similarly as in the optical time division demultiplexing apparatus of FIG. 34 described hereinabove, and performs time division demultiplexing processing for a light signal of 2×B gigabit/second inputted thereto from the light branching element 107 based on a clock signal generated by the clock signal generation element 21 described above and outputs a resulting signal as a light signal of B gigabit/second. The optical switch 22 has a pair of electrodes 22a and 22b which receive driving voltages thereto (in the following description, a Mach-Zehnder optical switch will be referred to simply as optical switch).

For example, the optical switch 22 demultiplexes and extracts an optical time division multiplex signal of 2×B gigabit/second after every one bit based on a clock signal of B gigahertz from the clock signal generation element 21.

The low frequency oscillator 23 generates a predetermined low frequency signal f0 set in advance. The driving circuit 24 receives a clock signal from the clock signal generation element 21 and produces clock signals as driving signals to be supplied to the electrodes 22a and 22b. Further, the driving circuit 24 superposes the low frequency signal f0 from the low frequency oscillator 23 on the clock signals and outputs the two clock signals superposed with the low frequency signal f0 as driving signals to the electrodes 22*a* and 22*b* of the optical switch 22.

The two clock signals generated by the driving circuit 24 are two clock signals complementary to each other produced based on a clock signal generated by the clock signal generation element 21, and the two clock signals are superposed with the low frequency signal f0 from the low frequency oscillator 23 and outputted to the optical switch 22.

Consequently, the electrodes 22*a* and 22*b* of the optical switch 22 receive the mutually complementary clock signals (superposed with the low frequency signal f0) from the driving circuit 24 so that a received light signal can be time division demultiplexed on the clock signals.

The light branching element 25 power branches a light signal time division multiplexed by the optical switch 22. The optical receiver 26 receives and converts a branched light signal from the light branching element 25 into an electric signal and outputs the electric signal, and has a function as a photo-electric converter.

The band-pass filter (BPF) 27 is adapted to pass therethrough the low frequency signal f0 of an electric signal from the optical receiver 26 and extracts the low frequency signal f0 included in a light signal time division multiplexed by the optical switch 22, and has a function as a low frequency signal detection element.

Figure 5:
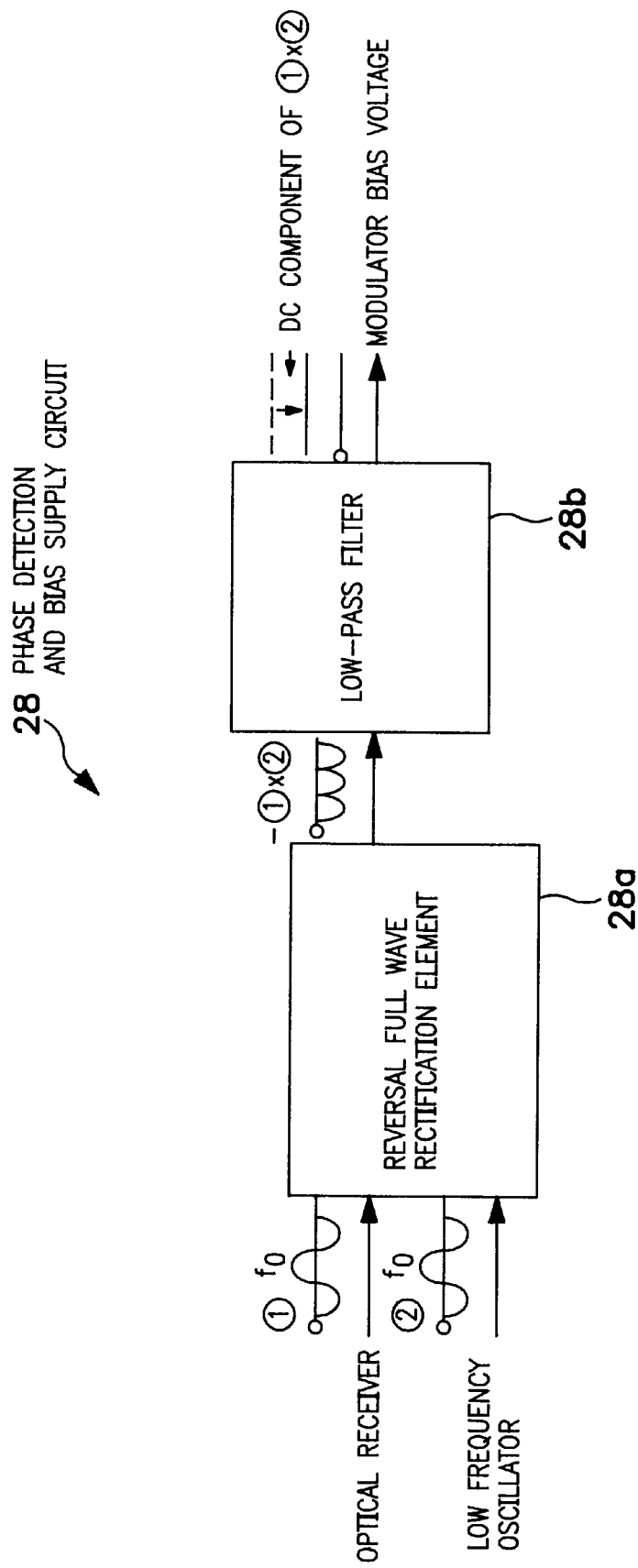
FIG. 5 is a block diagram showing details of a component of the optical time division demultiplexing apparatus of FIG. 4.

The phase detection and bias supply circuit 28 serving as a bias voltage supply element applies to the optical switch 22 a bias voltage corresponding to a difference between the phase of the low frequency signal f0 from the low frequency oscillator 23 and the phase of the low frequency signal f0 extracted by the band-pass filter 27, and particularly has such a construction as shown in FIG. 5.

The phase detection and bias supply circuit 28 shown in FIG. 5 includes a reversal full wave rectification element 28*a* and a low-pass filter 28*b*.

The reversal full wave rectification element 28*a* calculates the product between a component of the low frequency signal f0 from the low frequency oscillator 23 (refer to ① of FIG. 5) and a component of the low frequency signal f0 detected by the band-pass filter 27 (refer to ② of FIG. 5). The low-pass filter 28*b* performs low-pass filter processing for a result of the calculation from the reversal full wave rectification element 28*a* to extract a dc component.

In particular, a dc component outputted from the low-pass filter 28*b* described above can be used as drift detection information based on the difference between the phase of the low frequency signal f0 from the low frequency oscillator 23 and the low frequency signal f0 detected by the band-pass filter 27 and is outputted as a bias voltage corresponding to the dc component drift in a superposing relationship on a clock signal from the driving circuit 24.

It is to be noted that, when no operating point drift occurs with the optical switch 22, since the low frequency signal f0 described above is not detected from an output signal of the optical switch 22, although the low frequency signal f0 is superposed by the driving circuit 24, no dc component is detected from the low-pass filter 28*b* and no bias voltage is applied to the optical switch 22.

Accordingly, the reversal full wave rectification element 28*a* and the low-pass filter 28*b* function as a drift detection element for detecting a drift of the operation characteristic of the optical switch 22 based on the difference between the phase of the low frequency signal f0 detected by the band-pass filter 27 and the phase of the low frequency signal f0 from the low frequency oscillator 23, and further function as a bias voltage application element for applying a bias voltage corresponding to the detected drift in a superposing relationship with a clock signal to be supplied to the optical switch 22.

Consequently, the phase detection and bias supply circuit 28 which includes the reversal full wave rectification element 28*a* and the low-pass filter 28*b* described above can detect a drift of the operation characteristic of the optical switch 22 based on the difference between the phase of a low frequency signal from the low frequency oscillator 23 and the phase of the low frequency signal f0 detected by the band-pass filter 27, and supply a bias voltage with which the operating point of the clock signal to be supplied to the optical switch 22 is controlled to a fixed position with respect to the operation characteristic (automatic bias control, ABC control).

Accordingly, the low frequency oscillator 23, driving circuit 24, light branching element 25, optical receiver 26, band-pass filter 27 and phase detection and bias supply circuit 28 described above cooperatively construct an operating point stabilization control circuit 29 which superposes a low frequency signal f0 set in advance on a clock signal for optical time division demultiplexing processing to be supplied to the optical switch 22 and controls the clock signal to be supplied to the optical switch 22 based on the phase difference between the low frequency signal f0 of a light signal after time division demultiplexing processing by the optical switch 22 and a component of the low frequency signal f0 superposed on the clock signal so that the operating point of the optical switch 22 on its operation characteristic may be a fixed position.

In the optical time division demultiplexing apparatus according to the first embodiment of the present invention having the construction described above, if a time division multiplex signal of 2×B gigabit/second composed of, for example, two series of light signals from the transmitter 102 is received, then the clock signal generation element 21 of each of the optical demultiplexers 20 disposed at the positions of the optical demultiplexers 108 and 109 produces a clock signal (in this instance, of B gigahertz) to be used for optical time division demultiplexing by the optical switch 22 from the time division multiplex signal received by the optical receiver 103.

Further, the driving circuit 24 produces two mutually complementary clock signals based on the clock signal from the clock signal generation element 21, superposes the low frequency signal f0 from the low frequency oscillator 23 on the two clock signals and supplies resulting signals to the electrodes 22*a* and 22*b* of the optical switch 22.

The optical switch 22 modulates the optical time division multiplex signal as a received light signal inputted thereto via the light branching element 107 with the two clock signals for optical time division demultiplexing processing generated by the driving circuit 24 and outputs one of two resulting signals as a demultiplexed signal of one of the two series.

Here, for example, as seen in FIG. 6, the driving circuit 24 of the optical demultiplexer 20 described hereinabove applies amplitude modulation to the two clock signals from the clock signal generation element 21 with the low frequency signal f0 from the low frequency oscillator 23 [refer to the input electric signal (S1)] and applies the two mutually complementary clock signals, for which the amplitude modulation processing has been performed, individually to the electrodes 22*a* and 22*b*.

Consequently, the optical switch 22 outputs a demultiplexed signal in a situation in which it is influenced by amplitude modulation of the low frequency signal f0 regarding the clock signal.

In particular, where an operating point drift arising from a temperature variation or a secular change does not occur with the optical switch 22, since the operating characteristic curve indicating the relationship between the potential difference between driving voltages applied to the electrodes 22a and 22b of the optical switch 22 and the output light power is such as that denoted by (S7) of FIG. 6, and accordingly, when the input electric signal (S1) is applied as the driving signals to the electrodes 22a and 22b, the output light signal becomes such as indicated by the curve (S4). In particular, since the low frequency signal f0 is superposed on the driving signals, the output light signal (S4) is outputted with a component of the low frequency signal f0 remaining therein.

Further, if an operating point drift occurs with the optical switch 22 and the operating characteristic curve described above is shifted as indicated by (S8), the output light signal becomes such as indicated by (S2). In particular, since the low frequency signal f0 is superposed on the driving signals, the output light signal (S2) is outputted with a component of the low frequency signal f0 contained therein.

Similarly, when an operating point drift occurs with the optical switch 22 and the operation characteristic curve described above is shifted as indicated by (S6), the output light signal becomes such as indicated by (S3). In particular, since the low frequency signal f0 is superposed with the driving signals, the output light signal (S3) is outputted with a component of the low frequency signal f0 contained therein.

The light branching element 25 branches an output light signal from the optical switch 22 and outputs one of the branched light signals to the identification element 110 or the identification element 111 while the other output light signal from the light branching element 25 is outputted to the band-pass filter 27 after it is converted as monitor light into an electric signal by the optical receiver 26.

The band-pass filter 27 extracts a component of the low frequency signal f0 included in an output light signal from the optical receiver 26. If a component of the low frequency signal f0 is extracted by the bandpass filter 27, then this signifies that an operating point drift occurs, and the phase detection and bias supply circuit 28 performs comparison in phase between the low frequency signal f0 from the band-pass filter 27 and the low frequency signal f0 from the low frequency oscillator 23 to detect an operating point drift.

Further, the phase detection and bias supply circuit 28 produces a dc bias voltage based on an amount of the operating point drive and outputs resulting signals to the electrodes 22a and 22b of the optical switch 22 in a superposing relationship on the clock signal from the driving circuit 24.

Consequently, the dc bias voltage is added to clock signals as driving signals in accordance with the detected operating point drift, and the optical switch 22 is controlled by the driving signals so that the operating point on the operation characteristic of the optical switch 22 may be a fixed position.

It is to be noted that a branched light signal outputted from the optical switch 22 to the identification element 110 or the identification element identification element 111 via the light branching element 25 is identified as a demultiplexed signal.

By the way, since the output light intensity characteristic of the Mach-Zehnder optical switch 22 depends upon the potential difference between the driving signals supplied to the two electrodes 22a and 22b, by applying signals having opposite polarities to each other to the two electrodes 22a and 22b, the optical switch 22 can be driven with an electric amplitude which is half that required to drive the optical switch 22 by applying a driving signal to only one of the two electrodes 22a and 22b.

Figure 35:
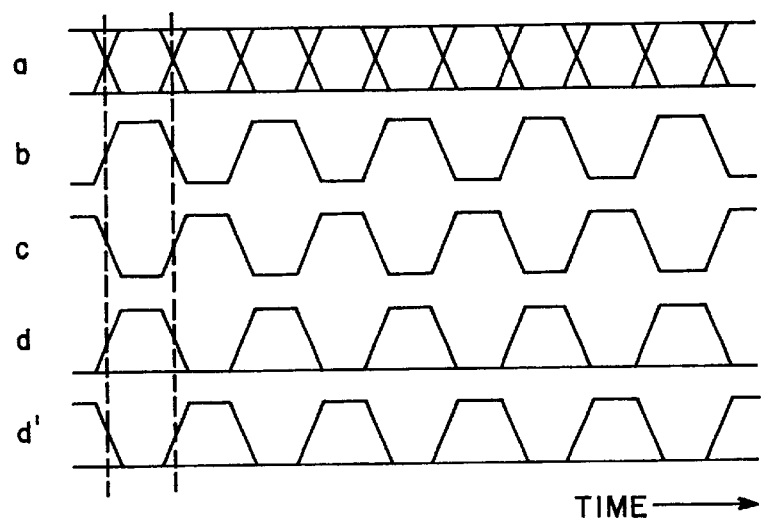
FIG. 35 is a time chart illustrating operation of the time division demultiplexing apparatus of FIG. 32.

Further, if two clock signals to be supplied to the electrodes 22a and 22b which form the optical demultiplexer 20 disposed at the position of the optical demultiplexer 108 are set such that they are reverse to corresponding clock signals to be supplied to the electrodes 22a and 22b which form the optical demultiplexer 20 disposed at the position of the optical demultiplexer 109, then the optical demultiplexers 20 disposed at the positions of the optical demultiplexers 108 and 109 can demultiplex an optical time division multiplex signal formed from two light signals multiplexed with each other into light signals of different series from each other (refer to d and d' shown in FIG. 35).

In this manner, with the optical time division demultiplexing apparatus according to the first embodiment of the present invention, the operating point stabilization control circuit 29 can superpose a predetermined low frequency signal f0 set in advance by the low frequency oscillator 23 on clock signals for optical time division multiplexing processing to be supplied to the optical switch 22 and control the clock signal to be supplied to the optical switch 22 based on the phase difference between a component of the low frequency signal f0 described above of the light signal after time division demultiplexing processing by the optical switch 22 and a component of the predetermined low frequency signal f0 set by the low frequency oscillator 23 so that the operating point of the optical switch 22 on its operation characteristic may be a fixed position. Consequently, the optical time division demultiplexing apparatus is advantageous in that optical time division demultiplexing of an optical time division multiplex signal can be performed while compensating for an operating point drift and consequently a demultiplexed signal having a sufficient optical output intensity can be outputted.

c. Second Embodiment

The optical time division demultiplexing apparatus of the first embodiment described above is adapted to the light transmission-reception system 100 described hereinabove with reference to FIG. 32 and is disposed as the optical demultiplexer 20 at each of the positions of the optical demultiplexers 108 and 109 of the optical receiver 103. In other words, in the optical time division demultiplexing apparatus of the first embodiment, the optical receiver 103 for an optical time division multiplex transmission system is formed by connecting the optical demultiplexer 20 as optical time division demultiplexing apparatus in parallel in two stages.

Figure 7:
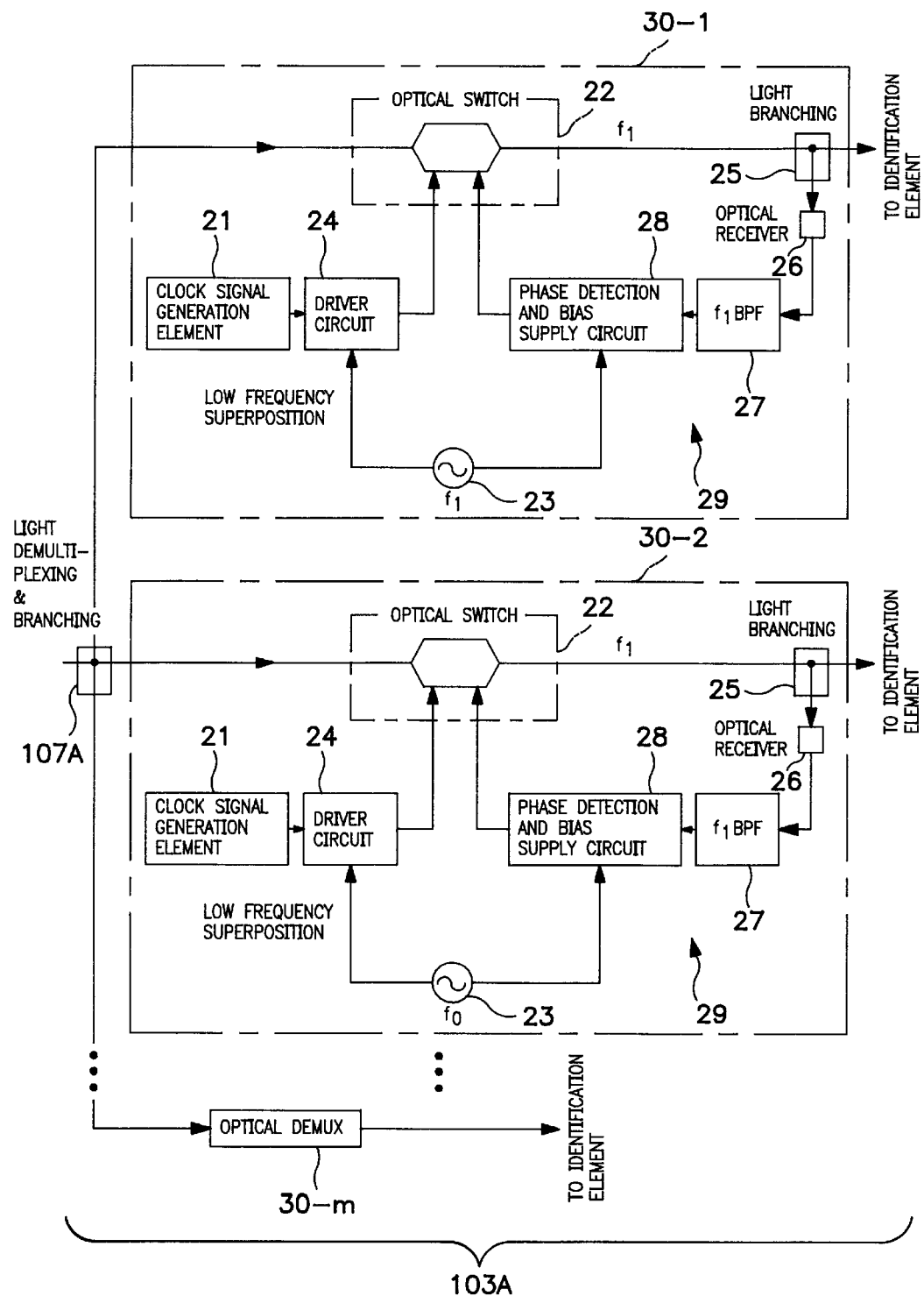
FIG. 7 is a block diagram showing essential part of an optical receiver to which an optical time division demultiplexing apparatus according to a second embodiment of the present invention is applied.

However, according to the present invention, by using a light demultiplexer having a similar construction to that of the optical demultiplexer (refer to reference numeral 20) in the first embodiment described above, an optical receiver for a light transmission-reception system can be formed from a single optical demultiplexer 20 and an identification element, or, for example, as shown in FIG. 7, another optical receiver for a light transmission-reception system can be formed by connecting three or more optical demultiplexers 20 in parallel to each other and providing a number of identification elements corresponding to the number of stages of the optical demultiplexers 20.

FIG. 7 is a block diagram showing part of an optical receiver according to a second preferred embodiment of the present invention. The optical receiver 103A shown in FIG. 7 can demultiplex such an optical time division multiplex signal of multiple series of three or more multiple series as described above.

The optical receiver 103A has a similar construction to that described hereinabove with reference to FIG. 32 (refer to reference numeral 103). In particular, the optical receiver 103A according to the second embodiment includes a light demultiplexing and branching element 107A and optical demultiplexers 30-1 to 30-m (m; an integer equal to or larger than 3). The optical receiver 103A further includes identification elements (not shown) individually provided for the optical demultiplexers 30-1 to 30-m for identifying demultiplexed signals from the optical demultiplexers 30-1 to 30-m.

Each of the optical demultiplexers 30-1 to 30-m includes a clock signal generation element 21, an optical switch 22 and an operating point stabilization control circuit 29 which have functions substantially similar to those in the first embodiment described above.

Meanwhile, a driving circuit 24 of each of the optical demultiplexers 30-1 to 30-m supplies a driving signal to only one of two electrodes of the optical switch 22. It is to be noted that, in FIG. 7, like reference symbols to those of FIG. 4 denote similar elements, and detailed overlapping description is omitted here.

In the optical receiver of the second embodiment of the present invention having the construction described above, if a time division multiplex signal is received via a transmission line from a transmitter, then it is branched into m by the light branching element 107A and inputted to the optical demultiplexers 30-1 to 30-m.

The clock signal generation element 21 of each of the optical demultiplexers 30-i generates a desired clock signal for optical time division multiplexing processing from the optical time division multiplex signal as a received light signal. The optical switch 22 modulates the optical time division multiplex signal inputted thereto with the clock signal from the clock signal generation element 21 to produce a desired demultiplexed signal and outputs the demultiplexed signal.

It is to be noted that the demultiplexed signal outputted from the optical switch 22 is outputted to the corresponding identification section not shown via the light branching element 25 and identified as a demultiplexed signal.

Further, each of the optical demultiplexers 30-i performs operating point stabilization control similarly to that in the first embodiment described above by the operating point stabilization control circuit 29.

In particular, each of the optical demultiplexers 30-i superposes a predetermined low frequency signal $f_1$ set in advance by the low frequency oscillator 23 on a clock signal for optical time division demultiplexing processing supplied to the optical switch 22. Further, the phase detection and bias supply circuit 28 receives a component of the low frequency signal $f_1$ of a light signal after time division demultiplexing processing by the optical switch 22 via the light branching element 25, optical receiver 26 and band-pass filter 27 and receives a low frequency signal $f_1$ from the low frequency oscillator 23.

Then, the phase detection and bias supply circuit 28 compares the phases of a component of the low frequency signal $f_1$ of the light signal after time division demultiplexing processing by the optical switch 22 and the low frequency signal $f_1$ from the low frequency oscillator 23 with each other and supplies a dc bias voltage based on the phase difference in a superposing relationship on a driving signal to the optical switch 22. Consequently, the clock signal to be supplied to the optical switch 22 is controlled so that the operating point of the optical switch 22 on its operation characteristic may be at a fixed position.

In this manner, also the optical receiver of the second embodiment of the present invention is advantageous in that, since operating point stabilization control can be performed by the operating point stabilization control circuit of each of the optical demultiplexers 30-1 to 30-m as optical time division demultiplexing apparatus, an operating point drift of an optical time division multiplex signal can be compensated for and desired optical time division demultiplexing processing can be performed while maintaining a sufficient optical output intensity similarly as in the optical time division demultiplexing apparatus of the first embodiment.

d. Third Embodiment

Figure 37:
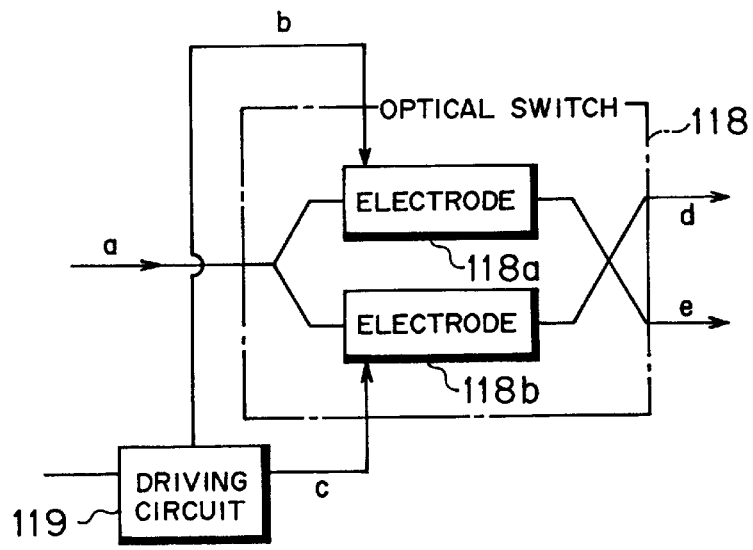
Figure 38:
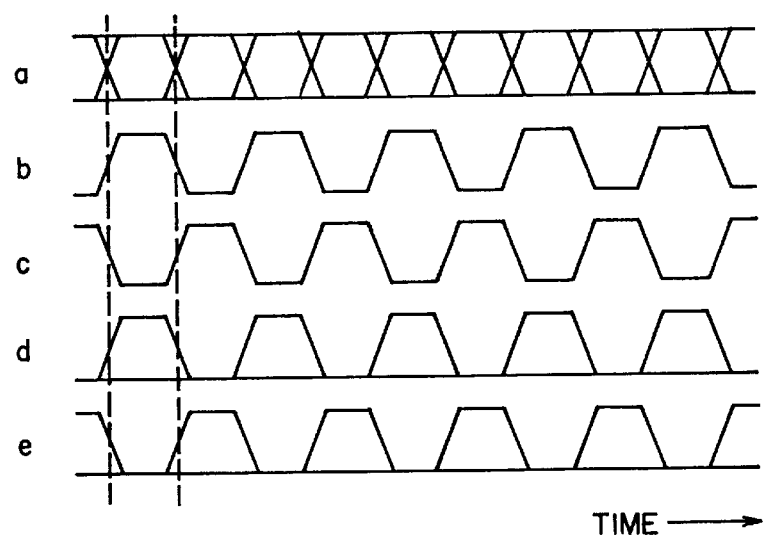
FIG. 38 is a time chart illustrating different operation of the time division demultiplexing apparatus of FIG. 32.

While the optical time division demultiplexing apparatus according to the first embodiment described above employs a 1×1 Mach-Zehnder optical switch for the optical switch 22, the optical switch 22 is not limited to this, and a 1×2 Mach-Zehnder optical switch 22A similar to that described hereinabove with reference to FIG. 37 (refer to reference numeral 118) may be employed instead.

In particular, if an optical time division demultiplexing apparatus is formed using a 1×2 Mach-Zehnder optical switch for the optical switch 22A, then this optical time division demultiplexing apparatus can be applied as the optical demultiplexer 115 (disposed at the position of the optical demultiplexer 115) of the optical receiver 114 described hereinabove with reference to FIG. 36.

Figure 8:
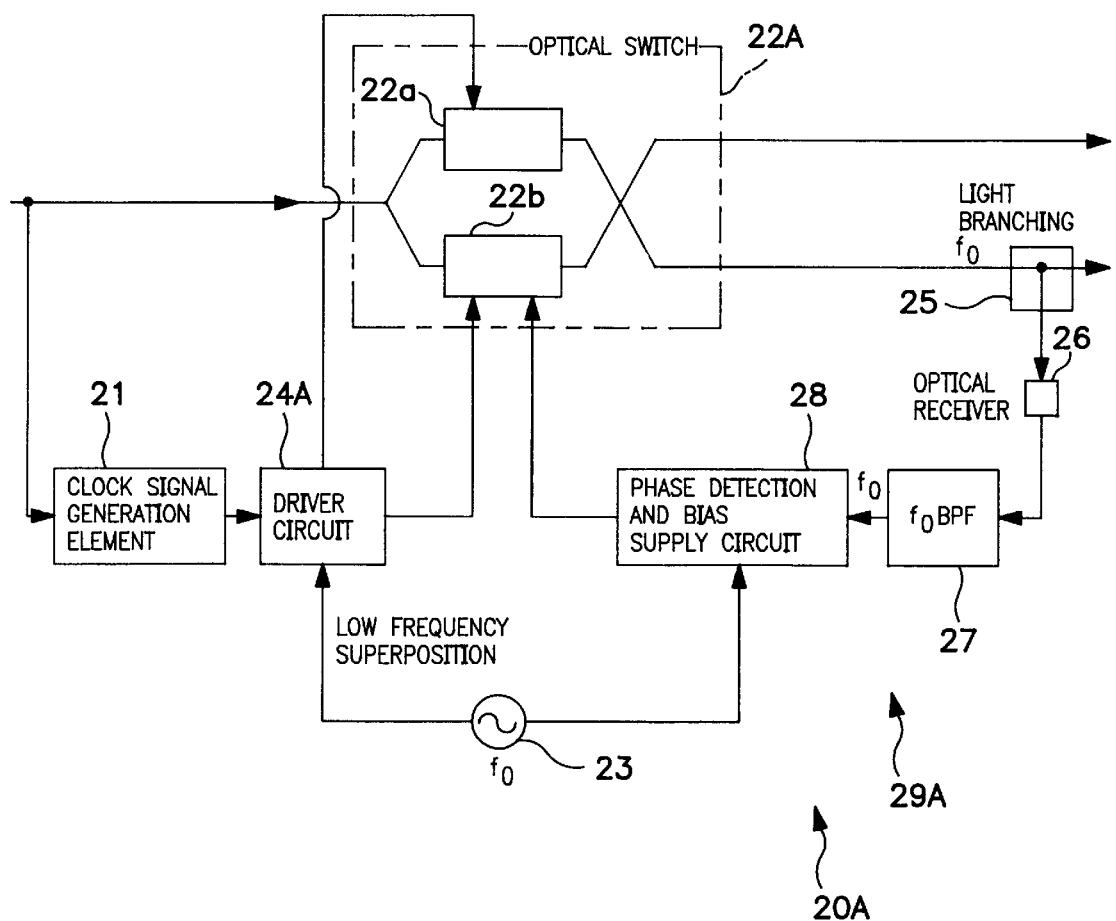
FIG. 8 is a block diagram showing an optical time division demultiplexing apparatus according to a third embodiment of the present invention.

FIG. 8 is a block diagram showing an optical demultiplexer as the optical time division demultiplexing apparatus 20A to which a 1×2 Mach-Zehnder optical switch described above is applied. Where the optical demultiplexer 20A shown in FIG. 8 is disposed at the position of the optical demultiplexer 115 described hereinabove with reference to FIG. 36, an optical receiver for an optical time division multiplex transmission system can be formed from the optical demultiplexer 20A and the identification elements 116 and 117.

Similarly as in the optical switch of FIG. 37 described hereinabove, an optical switch 22A of the optical demultiplexer 20A has a waveguide formed thereon such that a light signal inputted is first branched into two and outputted as two outputs, and includes a pair of electrodes 22a and 22b formed for the two branched waveguide portions such that driving voltages are supplied thereto. Consequently, a light signal inputted to the optical switch 22A is branched on the waveguide, passes the waveguide portions in which electric fields are formed by driving signals, and is outputted as two outputs.

Also the optical demultiplexer 20A shown in FIG. 8 includes an operating point stabilization control circuit 29A similarly as in the optical time division demultiplexing apparatus of the first embodiment described above. It is to be noted that, in FIG. 8, like reference symbols to those of FIG. 4 denote substantially similar elements and overlapping detailed description thereof is omitted here.

A driving circuit 24A receives a clock signal for optical time division demultiplexing processing generated by the clock signal generation element 21 and produces two mutually complementary clock signals as driving signals for the electrodes 22a and 22b based on the clock signal. Consequently, the optical switch 22A can output light signals of two series which form an optical time division multiplex signal inputted thereto as two demultiplexed signals.

It is to be noted that, similarly as in the optical time division demultiplexing apparatus of the first embodiment described hereinabove, two clock signals generated by the driving circuit 24A are supplied to the optical switch 22A after they are superposed with a low frequency signal f0 from the low frequency oscillator 23.

By the way, while two complementary signals are outputted from the optical switch 22A, in this instance, for operating point stabilization control, both of the two light outputs need not be branched for feedback control, but only one of the two light outputs may be used. Particularly, where only one of the signals is used for identification on the reception side, the other signal can be used only for operating point stabilization control without optically demultiplexing the same.

Figure 36:
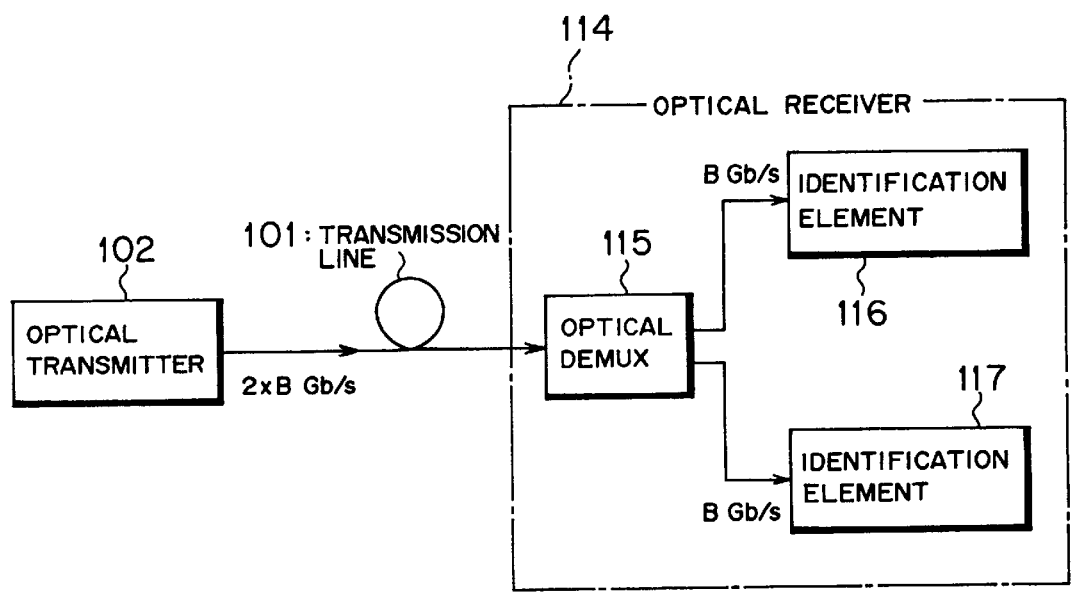
FIGS. 36 and 37 are block diagrams showing details of further different components of the optical transmission and reception system shown in FIG. 32.

With the optical time division demultiplexing apparatus of the third embodiment of the present invention having the construction described above, if the optical demultiplexer 20A shown in FIG. 8 is disposed at the position of the optical demultiplexer 115 shown in FIG. 36, then when a time division multiplex signal is received from the transmitter via the transmission line, the optical switch 22A can output two series of light signals, which form the inputted optical time division multiplex signal, as two demultiplexed signals based on driving signals from the driving circuit 24A.

It is to be noted that the two demultiplexed signals outputted from the optical switch 22A are outputted to the identification elements not shown, by which they are individually identified as demultiplexed signals.

Further, in the optical demultiplexer 20A, operating point stabilization control basically similar to that as in the optical time division demultiplexing apparatus of the first embodiment described hereinabove is performed by the operating point stabilization control circuit 29A.

In particular, the operating point stabilization control circuit 29A superposes a predetermined low frequency signal f0 set in advance by the low frequency oscillator 23 on two clock signals for optical time division demultiplexing processing supplied to the optical switch 22A. Further, the phase detection and bias supply circuit 28 receives a component of the low frequency signal f0 of one of the two demultiplexed signals after time division demultiplexing processing by the optical switch 22A via the light branching element 25, optical receiver 26 and band-pass filter 27 and further receives the low frequency signal f0 from the low frequency oscillator 23.

Then, the phase detection and bias supply circuit 28 compares the phases of the component of the low frequency signal f0 of the light signal after time division demultiplexing processing by the optical switch 22A described above and the low frequency signal f0 from the low frequency oscillator 23 with each other, and supplies a dc bias voltage based on the phase difference in a superposing relationship on driving signals for the optical switch 22A. Consequently, the clock signals to be supplied to the optical switch 22A are controlled so that the operating point of the optical switch 22 on its operation characteristic may be a fixed position.

In this manner, also the optical time division demultiplexing apparatus of the third embodiment of the present invention is advantageous in that, since operating point stabilization control can be performed by the operating point stabilization control circuit of the optical demultiplexer 20A serving as a time division demultiplexing apparatus, an operating point drift of an optical time division multiplex signal can be compensated for and desired optical time division demultiplexing processing can be performed while maintaining a sufficient optical output intensity similarly as in the optical time division demultiplexing apparatus of the first embodiment.

Further, since the optical time division demultiplexing apparatus is constructed using a 1×2 Mach-Zehnder optical switch, it is advantageous also in that the apparatus construction can be simplified comparing with the alternative apparatus construction which employs a 1×1 Mach-Zehnder optical switch and the cost required for construction of the apparatus can be reduced.

e. Fourth Embodiment

Figure 9:
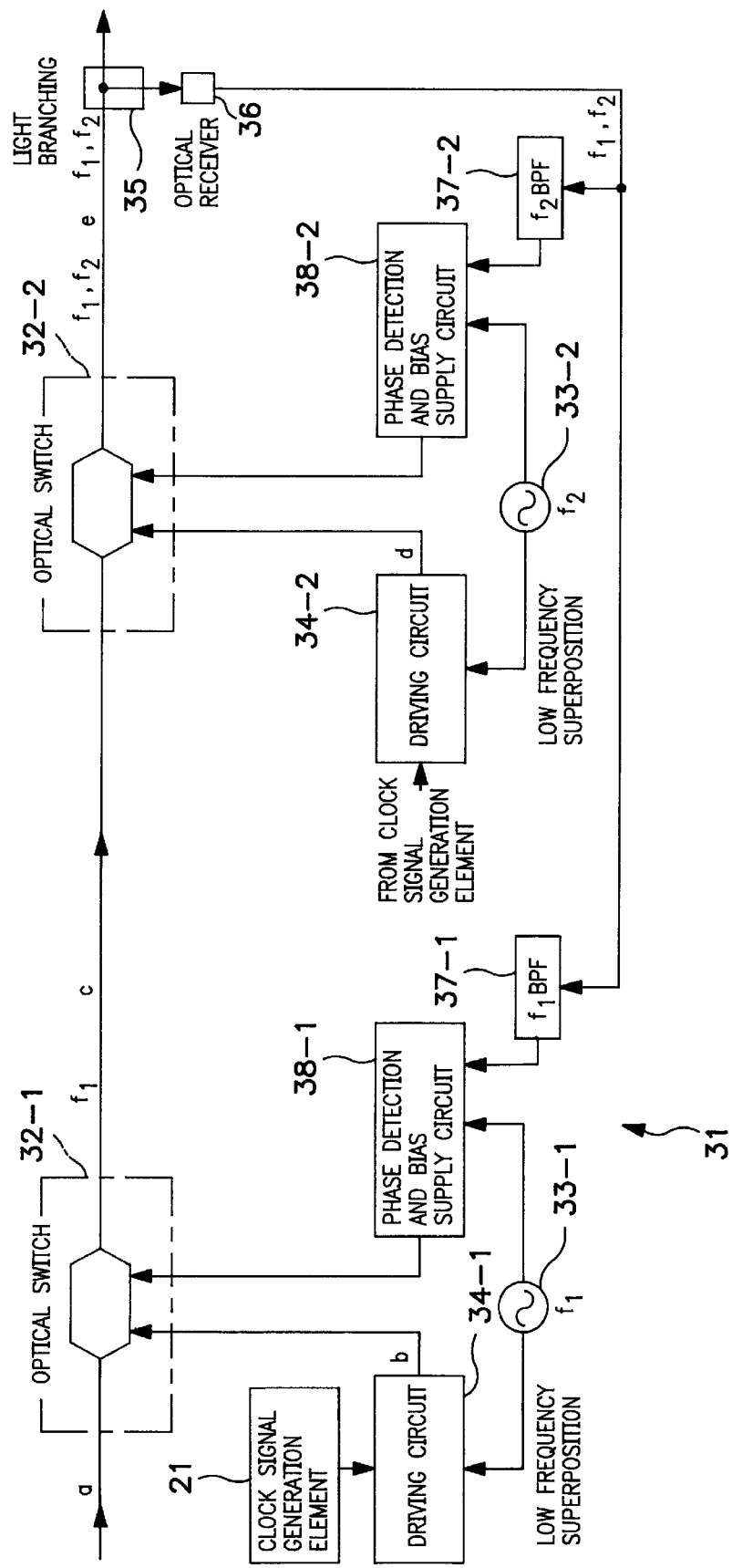
FIG. 9 is a block diagram showing an optical time division demultiplexing apparatus according to a fourth embodiment of the present invention.

FIG. 9 is a block diagram showing an optical time division multiplexing apparatus according to a fourth preferred embodiment of the present invention. Also the optical time division demultiplexing apparatus 31 shown in FIG. 9 can be applied to an optical receiver which performs optical time division demultiplexing of an optical time division multiplex signal from the optical transmitter 102 of such an optical time division multiplex transmission system as described hereinabove with reference to FIG. 32 similarly as in the embodiments described above.

The optical time division demultiplexing apparatus 31 according to the fourth embodiment is constructed such that, different from that of the first embodiment described above (refer to reference numeral 20 of FIG. 4), optical switches for time division demultiplexing an optical time division multiplex signal are connected in series in two stages.

In particular, the optical time division demultiplexing apparatus 31 shown in FIG. 9 can demultiplex an optical time division multiplex signal of, for example, 4×B gigabit/second (for example, 40, Gb/s) inputted thereto into light signals of B gigabit/second (for example, 10 Gb/s).

Figure 10:
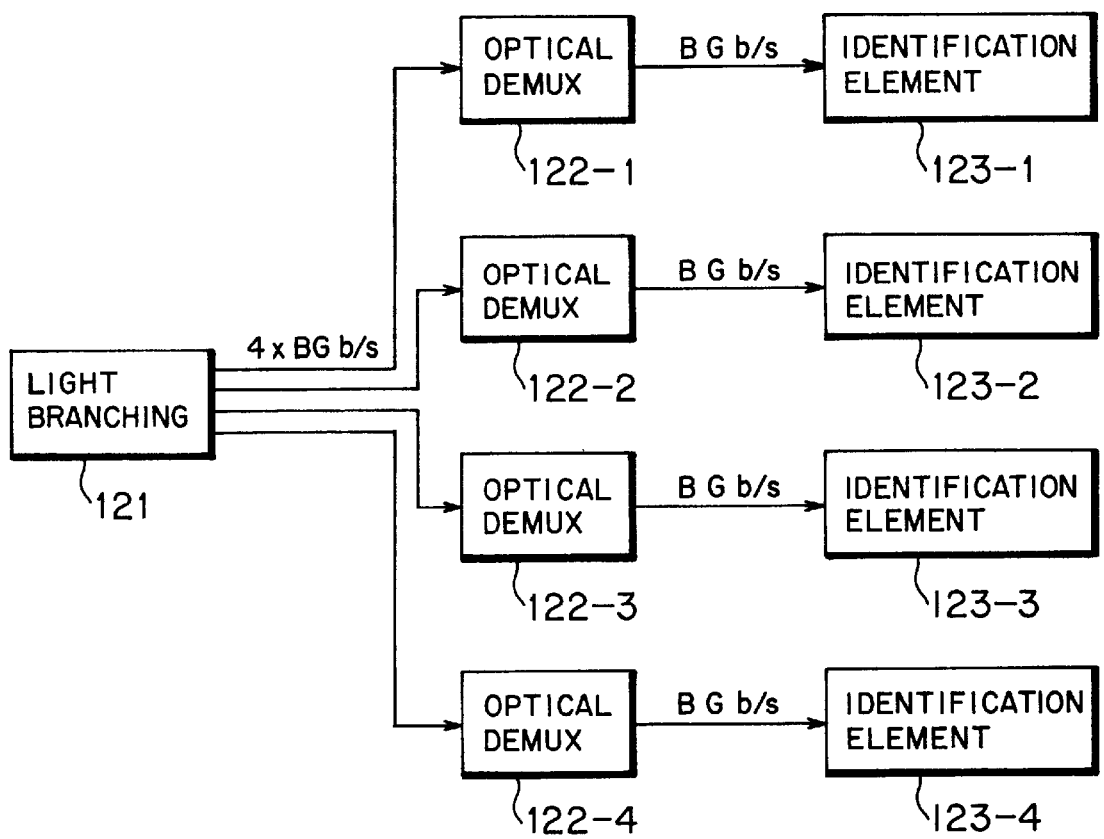
FIG. 10 is a block diagram showing an optical receiver to which the optical time division demultiplexing apparatus of FIG. 9 is applied.

Accordingly, by applying the optical time division demultiplexing apparatus 31 according to the fourth embodiment, for example, as shown in FIG. 10, to optical demultiplexers 122-1 to 122-4 in a similar manner as in the optical receiver 103 which demultiplexes an optical time division multiplex signal of two series described hereinabove with reference to FIG. 32, an optical receiver 120 which can demultiplex and identify an optical time division multiplex signal of 4 series can be constructed.

It is to be noted that, in FIG. 10, reference numeral 121 denotes a light branching element which branches a received optical time division multiplex signal into four, and reference symbols 123-1 to 123-4 denote identification elements which identify demultiplexed signals from the optical demultiplexers 122-1 to 122-4, respectively.

Referring back to FIG. 9, the optical time division demultiplexing apparatus 31 applied to the optical demultiplexers 122-1 to 122-4 described above includes a clock signal generation element 21 for generating clock signals for optical time division demultiplexing processing of a received light signal and further includes a pair of optical switches 32-1 and 32-2 connected in series in two stages.

Also each of the optical switches 32-1 and 32-2 in the optical time division demultiplexing apparatus 31 of the fourth embodiment shown in FIG. 9 time division demultiplexes a light signal based on clock signals from the clock signal generation element 21 and is formed from a 1×2 Mach-Zehnder optical switch.

The optical time division demultiplexing apparatus 31 shown in FIG. 9 further includes, for the individual optical switches 32-1 and 32-2, a pair of low frequency oscillators 33-1 and 33-2, a pair of driving circuits 34-1 and 34-2, a pair of band-pass filters 37-1 and 37-2 and a pair of phase detection and bias supply circuits 38-1 and 38-2, respectively, and further includes a light branching element 35 and an optical receiver 36.

The low frequency oscillators 33-1 and 33-2 generate predetermined low frequency signals different from each other. For example, the low frequency oscillator 33-1 generates a low frequency signal f1 while the low frequency oscillator 33-2 generates another low frequency signal f2.

The driving circuit 34-1 serving as a low frequency supervision element superposes the predetermined low frequency signal f1 from the low frequency oscillator 33-1 on a clock signal from the clock signal generation element 21 and outputs a resulting signal as a clock signal to the optical switch 32-1.

The driving circuit 34-2, serving as another low frequency superposition element, produces a clock frequency equal to one half (½) times that of the clock signal from the clock signal generation element 21, superposes the predetermined low frequency signal f2 from the low frequency oscillator 33-2 on the thus produced clock signal, and outputs a resulting signal as a clock signal to the optical switch 32-2.

Figure 11:
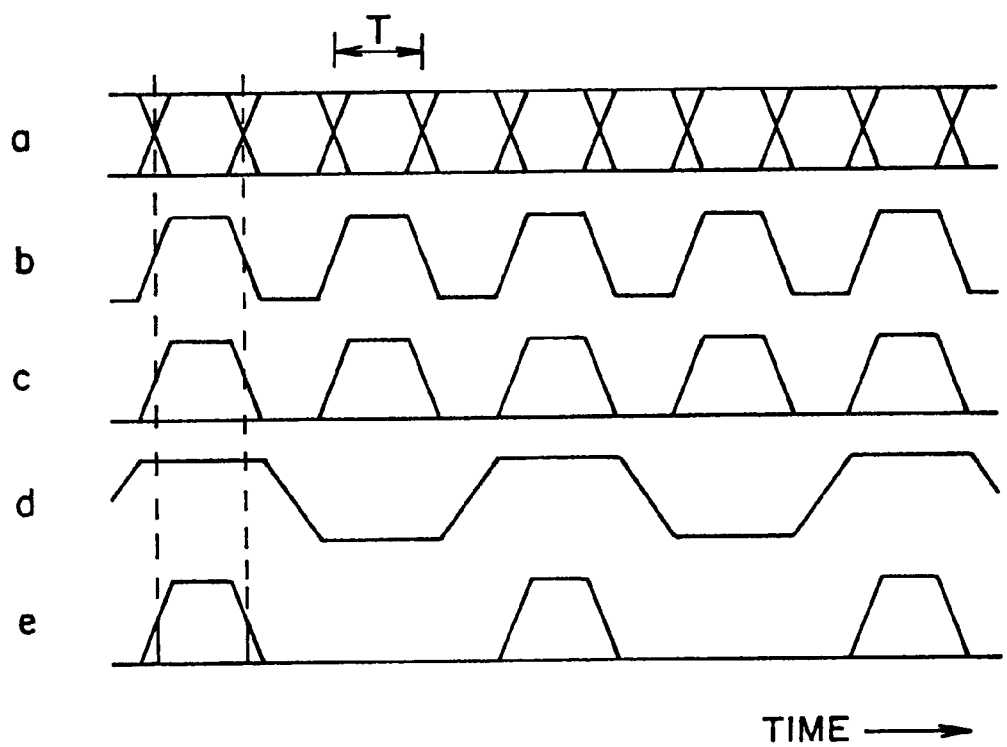
FIG. 11 is a time chart illustrating operation of the optical time division demultiplexing apparatus of FIG. 9.

Accordingly, the optical switch 32-1 performs, as seen in FIG. 11, time division demultiplexing processing of a received optical time division multiplex signal a (4×B gigabit/second) based on a clock signal b from the driving circuit 34-1 and outputs a resulting signal as a demultiplexed signal c of 2×B gigabit/second. It is to be noted that, similar as in the optical time division demultiplexing apparatus of the first embodiment described hereinabove, when an operating point drift occurs with the optical switch 32-1, the low frequency component f1 is included in the demultiplexed signal c.

Similarly, the optical switch 32-2 performs time division demultiplexing processing of the light signal c of 2×B gigabit/second inputted thereto from the optical switch 32-1 base on a different clock signal d from the driving circuit 34-2 and outputs a resulting signal as a light signal of B gigabit/second. In this instance, when an operating point drift occurs in the optical switch 32-2, the low frequency component f2 is included in the demultiplexed signal e.

It is to be noted that, since the low frequency signals f1 and f2 to be superposed on the clock signals for the optical switches 32-1 and 32-2 described above have different frequencies from each other, a low frequency signal for detection of an operating point drift for each of the optical switches 32-1 and 32-2 in the different stages can be detected distinctly from the other low frequency signal superposed by the other optical switch.

In other words, a low frequency component which appears because of an operating point drift in each of the optical switches 32-1 and 32-2 can be detected separately from within light sent out from the optical switch 32-2 in the last stage due to a difference of the frequency (f1 or f2) to be superposed.

Further, the clock signal generation element 21 described above produces clock signals of B gigahertz and 2×B gigahertz from a received optical time division multiplex signal by means of a PLL (Phase Locked Loop) or a like element and outputs the clock signals to the driving circuit 34-2 and the driving circuit 34-1, respectively.

The light branching element 35 branches a light signal outputted from the optical switch 32-2 in the last stage into two. One of the branched light signals is outputted to the identification elements 123-1 to 123-4 in the next stage while the other light signal is outputted to the optical receiver 36.

The optical receiver 36 converts the branched light signal from the light branching element 35 into an electric signal. The electric signal obtained by the conversion is outputted to band-pass filters 37-1 and 37-2.

The band-pass filter 37-1 detects the low frequency signal f1 from the electric signal obtained by conversion of the light signal outputted from the optical switch 32-2 in the last stage. Similarly, the band-pass filter 37-2 detects the low frequency signal f2 from the electric signal obtained by the conversion of the signal light outputted from the optical switch 32-2 in the last state. Accordingly, each of the band-pass filters 37-1 and 37-2 described above functions as a low frequency signal detection element.

The phase detection and bias supply circuit 38-1 applies to the optical switch 32-1 a bias voltage corresponding to the difference between the phase of the low frequency signal f1 from the low frequency oscillator 33-1 and the phase of the low frequency signal f1 detected by the band-pass filter 37-1.

Similarly, the phase detection and bias supply circuit 38-2 applies to the optical switch 32-2 a bias voltage corresponding to the difference between the phase of the low frequency signal f2 from the low frequency oscillator 33-2 and the phase of the low frequency signal f2 detected by the band-pass filter 37-2.

In other words, while each of the phase detection and bias supply circuits 38-1 and 38-2 described above functions as a bias voltage supply element, it has such a construction as shown in FIG. 5 similarly to that of the optical time division demultiplexing apparatus of the first embodiment described hereinabove (refer to reference numeral 28).

Accordingly, the low frequency oscillators 33-1 and 33-2, driving circuits 34-1 and 34-2, band-pass filters 37-1 and 37-2 and phase detection and bias supply circuits 38-1 and 38-2 provided corresponding to the optical switches 32-1 and 32-2 described above, respectively, cooperatively construct an operating point stabilization control circuit which controls clock signals to be supplied to the optical switches 32-1 and 32-2 so that the operation point of the optical switches 32-1 and 32-2 on their operation characteristic may be a fixed position.

In the optical time division demultiplexing apparatus according to the fourth embodiment of the present invention having the construction described above, if a time division multiplex signal (4×B gigabit/second) composed of, for example, four series of light signals multiplexed with each other is received from the transmitter via the transmission line, then the clock signal generation element 21 of the optical time division demultiplexing apparatus 20 disposed at the position of each of the optical demultiplexers 122-1 to 122-4 produces clock signals to be used for optical time division demultiplexing by the optical switches 32-1 and 32-2 from the time division multiplex signal received by the receiver.

In this instance, the clock signal generation element 21 produces a clock signal of 2×B hertz as a clock signal to be used for time division demultiplexing by the optical switch 32-1 and produces another clock signal of B hertz as a clock signal to be used for time division demultiplexing by the optical switch 32-2.

The driving circuit 34-1 superposes the low frequency signal f1 from the low frequency oscillator 33-1 on the clock signal from the clock signal generation element 21 and supplies a resulting signal to one of the two electrodes of the optical switch 32-1. Similarly, the driving circuit 34-2 superposes the low frequency signal f2 from the low frequency oscillator 33-2 on the clock signal from the clock signal generation element 21 and supplies a resulting signal to one of the two electrodes of the optical switch 32-2.

As seen from FIG. 11, the optical switch 32-1 modulates the optical time division multiplex signal a (multiplexed signal including four series of signals) as a received light signal inputted thereto from the light branching element 121 with the clock signal b for optical time division demultiplexing processing generated by the driving circuit 34-1 described hereinabove and outputs a resulting signal as a demultiplexed signal c.

Similarly, as seen from FIG. 11, the optical switch 32-2 modulates the output signal c from the optical switch 32-1 with another clock signal d for optical time division demultiplexing processing generated by the driving circuit 34-2 described hereinabove and outputs a resulting signal as a demultiplexed signal e of one of the four series.

Each of the optical switches 32-1 and 32-2 outputs a demultiplexed signal c or e under an influence of the amplitude modulation of the low frequency signal f1 or f2 described above.

In particular, similarly as in the optical time division demultiplexing apparatus of the first embodiment described hereinabove [refer to (S4) of FIG. 6], if the driving signal b (d) is applied to an electrode while an operating point drift arising from a temperature variation or a secular change does not occur with the optical switch 32-1 (32-2), a component of the frequency 2f1 (2f2) is included in the output light signal, but a component of the low frequency signal f1 (f2) is not included in the output light signal.

On the other hand, if the driving signal b (d) is applied to the electrode in another situation wherein an operating point drift occurs with the optical switch 32-1 (32-2), then the light signal outputted includes a component of the frequency f1 (f2).

The light branching element 35 branches an output light signal from the optical switch 32-2 and outputs one of the branched light signals to the identification elements 123-1 to 123-4 in the following stage. Meanwhile, the other output light signal from the light branching element 35 is outputted to the band-pass filters 37-1 and 37-2 after it is converted into an electric signal by the optical receiver 36.

The band-pass filter 37-1 detects a component of the low frequency signal f1 included in an output light signal from the optical switch 32-2 based on the electric signal obtained by conversion by the optical receiver 36. When a component of the low frequency signal f1 is detected by the band-pass filter 37-1, this signifies that an operating point drift occurs with the optical switch 32-1.

In particular, the phase detection and bias supply circuit 38-1 performs phase comparison between the low frequency signal f1 from the band-pass filter 37-1 and the low frequency signal f1 from the low frequency oscillator 33-1. Based on a result of the comparison, the phase detection and bias supply circuit 38-1 outputs a dc bias voltage, with which the operating point of the optical switch 32-1 on its operation characteristic curve is controlled to a fixed position, to the electrode of the optical switch 32-1 in a superposing relationship on a clock signal from the driving circuit 34-1.

Similarly, the band-pass filter 37-2 detects a component of the frequency f2 included in the output light signal from the optical switch 32-2 based on the electric signal obtained by conversion by the optical receiver 36. When a component of the frequency f2 is detected by the band-pass filter 37-2, this signifies that an operating point drift occurs with the optical switch 32-2.

In particular, the phase detection and bias supply circuit 38-2 performs phase comparison between the low frequency signal f2 from the band-pass filter 37-2 and the low frequency signal f2 from the low frequency oscillator 33-2. Based on a result of the comparison, the phase detection and bias supply circuit 38-2 outputs a dc bias voltage, with which the operating point of the optical switch 32-2 on its operation characteristic curve is controlled to a fixed position, to the electrode of the optical switch 32-2 in a superposing relationship on a clock signal from the driving circuit 34-2.

Accordingly, a dc bias voltage is added to a clock signal as a driving signal in accordance with a detected operating point drift, and a resulting signal is applied to each of the optical switches 32-1 and 32-2. Consequently, each of the optical switches 32-1 and 32-2 is controlled so that the operating point thereof on its operation characteristic may be a fixed position.

In this manner, with the optical time division demultiplexing apparatus according to the fourth embodiment of the present invention, since the operating point of each of the optical switches 32-1 and 32-2 on its operating characteristic curve can be controlled so that it may be stabilized by the operating point stabilization control circuit, it is advantageous in that, similarly as with the optical time division demultiplexing apparatus of the first embodiment, an operating point drift of an optical time division multiplex signal can be compensated for and desired optical time division demultiplexing processing can be performed while maintaining a sufficient optical output intensity. Further, the optical time division demultiplexing apparatus is advantageous also in that, since the band-pass filters 37-1 and 37-2 provided corresponding to the optical switches 32-1 and 32-2 can detect the low frequency signals f1 and f2 from a light signal outputted from the optical switch 32-2 in the last stage, the light branching element 35 for branching an output light signal and the optical receiver 36 for converting a branched light signal into an electric signal can be used commonly, and consequently, the number of times by which a light signal is branched can be reduced to reduce the loss caused by branching of light while reduction of the circuit can be achieved and reduction of the cost required for construction of the apparatus can be achieved.

It is to be noted that, while, in the optical time division demultiplexing apparatus 31 according to the fourth aspect of the present invention described above, the 1×1 Mach-Zehnder optical switches 32-1 and 32-2 are connected in series in two stages, according to the present invention, such 1×1 Mach-Zehnder optical switches may be connected in series in more than two stages. By this arrangement, an optical receiver which demultiplexes an optical time division multiplex signal composed of four or more series of signals multiplexed with each other can be constructed in a similar manner as in the optical receiver described hereinabove with reference to FIG. 10.

In this instance, the low frequency oscillators provided for the individual optical switches are constructed so as to generate low frequency signals different from one another, and also the band-pass filters for the individual switches are constructed so as to pass therethrough low frequency signals similar to the frequencies generated by the low frequency oscillators described above.

Further, in this instance, for the frequencies of the driving clock signals to be inputted to the individual optical switches, frequencies equal to one half those of the driving signals for the optical switches in the preceding stage produced using, for example, a PLL described above or some other suitable element.

f. Fifth Embodiment

Figure 12:
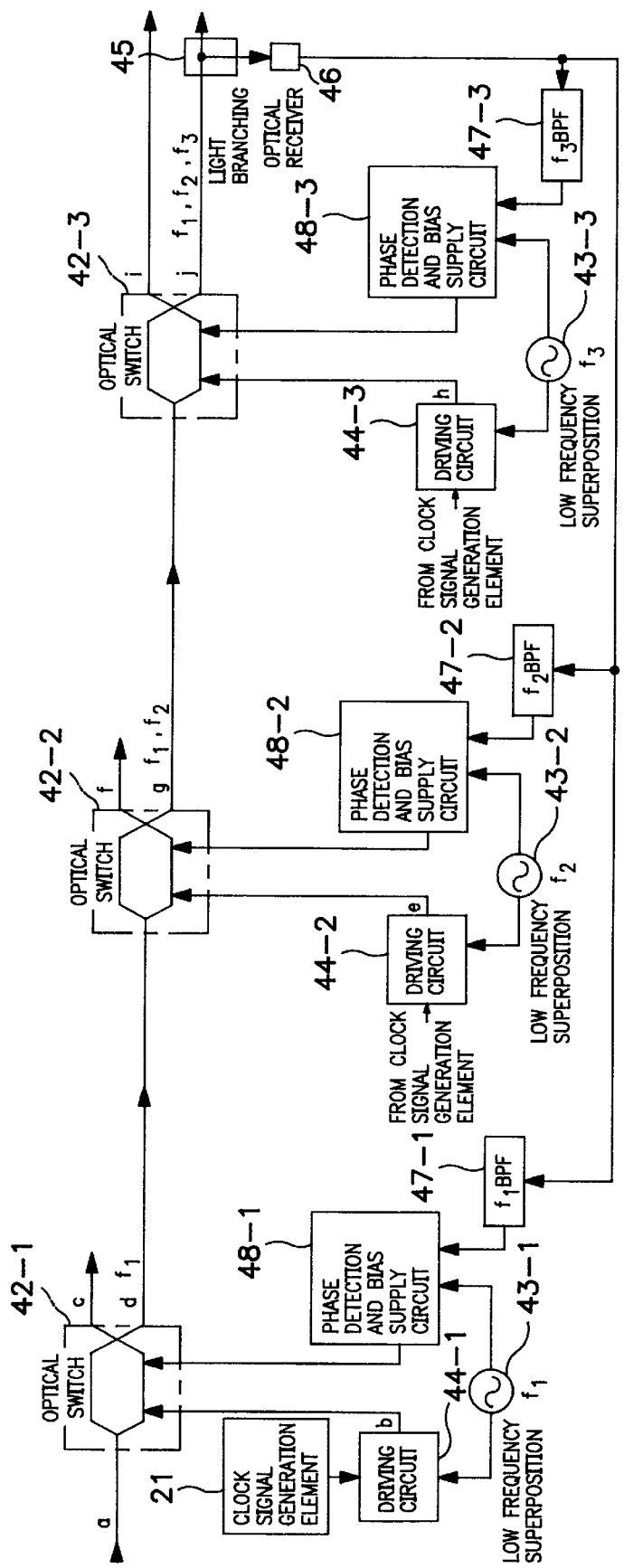
FIG. 12 is a block diagram showing an optical time division demultiplexing apparatus according to a fifth embodiment of the present invention.

FIG. 12 is a block diagram showing an optical time division demultiplexing apparatus according to a fifth preferred embodiment of the present invention. Also the optical time division demultiplexing apparatus 40 shown in FIG. 12 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

While the optical time division demultiplexing apparatus 40 according to the fifth embodiment is different from that of the fourth embodiment described above in that it employs, as an optical switch, not a 1×1 Mach-Zehnder optical switch but a 1×2 Mach-Zehnder optical switch and that such 1×2 Mach-Zehnder optical switches are connected in series in three stages, it includes a clock signal generation element 21 similar to that in the fourth embodiment described above.

In particular, one of two output terminals of an optical switch 42-1 is connected to an input terminal of another optical switch 42-2 while one of two output terminals of the optical switch 42-2 is connected to an input terminal of a further optical switch 42-3, and a light path connected to one of two output terminals of the optical switch 42-3 is branched by a light branching element 45.

The optical time division demultiplexing apparatus 40 includes low frequency oscillators 43-1 to 43-3, driving circuits 44-1 to 44-3, band-pass filters 47-1 to 47-3 and phase detection and bias supply circuits 48-1 to 48-3 having similar functions to those of the optical time division demultiplexing apparatus of the fourth embodiment described above corresponding to the optical switches 42-1 to 42-3, respectively, and an operating point stabilization control circuit is formed from those function elements.

It is to be noted that the low frequency oscillators 43-1 to 43-3 provided for the individual optical switches 42-1 to 42-3 are constructed so as to generate low frequency signals f1 to f3 different from one another, and also the band-pass filters 47-1 to 47-3 provided for the individual optical switches 42-1 to 42-3 are constructed so as to pass therethrough low frequency signals similarly to the frequencies generated by the low frequency oscillators 43-1 to 43-3 described above.

Accordingly, if any of the band-pass filters 47-1 to 47-3 detects that a corresponding one of the low frequency signals f1 to f3 is included in an output light signal from the optical switch 42-3 in the last stage, then since this signifies that an operating point drift occurs with a corresponding one of the optical switches 42-1 to 42-3, the phase detection and bias supply circuits 48-1 to 48-3 supply dc biases with which the operating points of the optical switches 42-1 to 42-3 on their operation characteristic curves are controlled to fixed positions, respectively.

In the optical time division demultiplexing apparatus 40 according to the fifth embodiment of the present invention having the construction described above, the clock signal generation element 21 produces clock signals to be used for optical time division demultiplexing by the optical switches 42-1 to 42-3 from a received optical time division multiplex signal, and the driving circuits 44-1 to 44-3 superpose predetermined low frequency signals f1 to f3 on the clock signals from the clock signal generation element 21 and output resulting signals.

Figure 13:
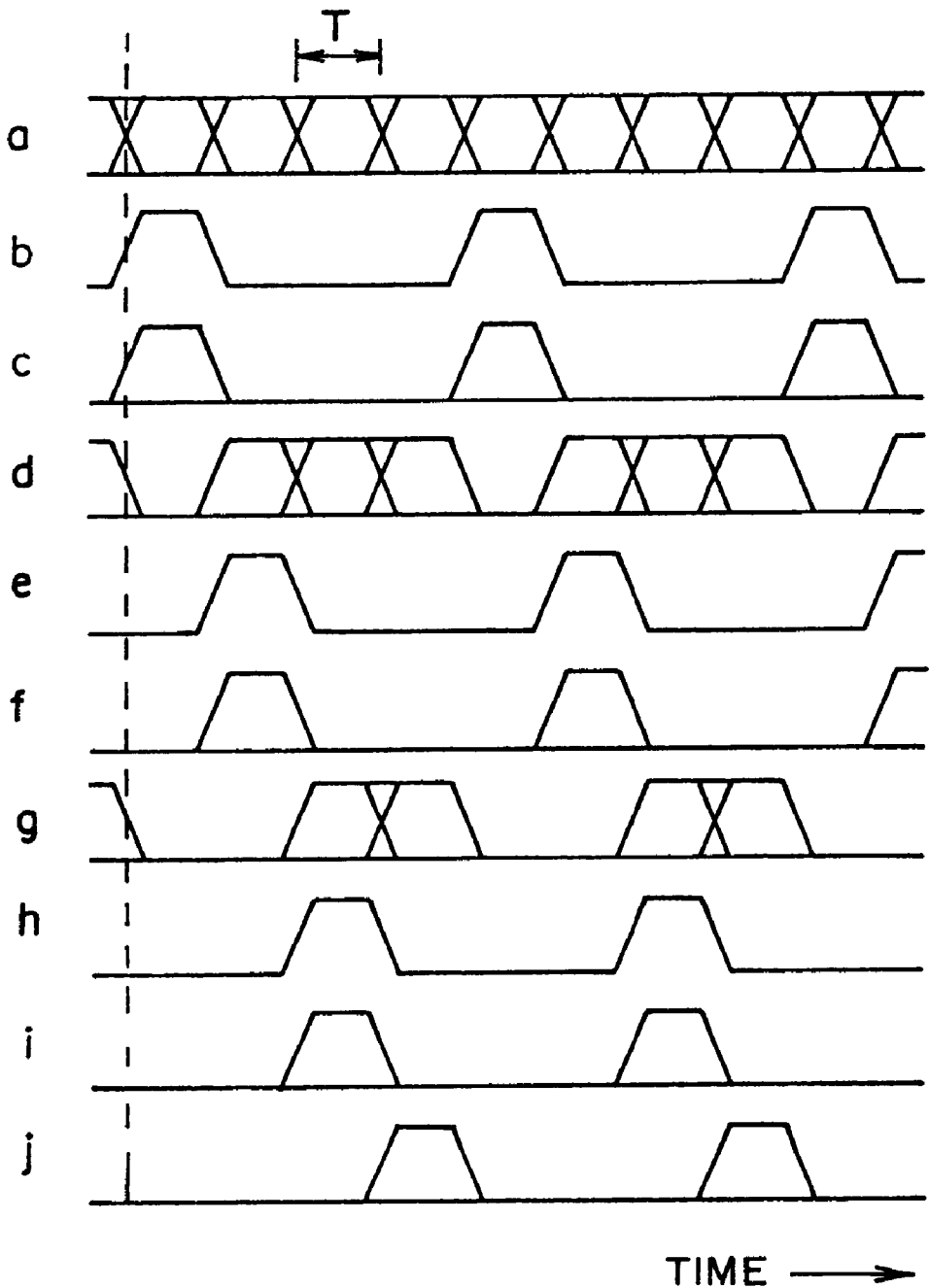
FIG. 13 is a time chart illustrating operation of the time division demultiplexing apparatus of FIG. 12.

The optical switch 42-1 modulates, as seen in FIG. 13, an optical time division multiplex signal a (for example, 4×B gigabit/second) as the inputted received light signal with a clock signal b (for example, B gigahertz) for optical time division multiplexing processing generated by the driving circuit 44-1 to demultiplex the optical time division multiplex signal a and outputs resulting signals as demultiplexed signals c and d.

In particular, the demultiplexed signal d (3×B gigabit/second) demultiplexed with the clock signal b described above is inputted from one of two output terminals of the optical switch 42-1 to the optical switch 42-2 while the remaining demultiplexed signal c (B gigabit/second) can be identified by the identification element at the following stage not shown.

Similarly, the optical switch 42-2 receives the output signal d of the optical switch 42-1 and modulates the received output signal d with the clock signal e for optical time division multiplexing processing generated by the driving circuit 44-2 described above to further demultiplex the demultiplexed signal d into demultiplexed signals f and g. Then, the optical switch 42-2 outputs the two demultiplexed signals f and g.

In this instance, the demultiplexed signal g (2×B gigabit/second) demultiplexed with the clock signal e described above is inputted from one of output terminals of the optical switch 42-2 to the optical switch 42-3 while the remaining demultiplexed signal f (B gigabit/second) can be identified in the next stage not shown.

Further, the optical switch 42-3 receives the output signal g of the optical switch 42-2 and modulates the received output signal g with a clock signal h for optical time division multiplexing processing generated by the driving circuit 44-3 described above to further demultiplex the demultiplexed signal g into demultiplexed signals i and j. The optical switch 42-3 thus outputs the demultiplexed signals i and j.

In particular, the demultiplexed signal j (B gigabit/second) demultiplexed with the clock signal h described above is branched into two by the light branching element 45 in the next stage while the remaining demultiplexed signal i (B gigabit/second) can be identified by the identification section in the next stage not shown.

Accordingly, if driving signals to be applied to the three optical switches 42-1 to 42-3 are set to pulse signals which have a gate width equal to a time slot T of an input light signal and have phases displaced by one time slot T from each other, then the input light signal can be extracted after every 4 bits to different outputs.

By the way, the optical switch 42-3 outputs demultiplexed signals i and j under an influence of the low frequency signals f1 to f3 superposed on the clock signals by the driving circuits 44-1 to 44-3.

In particular, if the driving signals b, e and h on which the low frequency signals f1, f2 and f3 are superposed are applied to the electrodes in a situation wherein an operating point drift which arises from a temperature variation or a secular change occurs with none of the optical switches 42-1 to 42-3, although an output light signal includes components of the frequencies 2f1, 2f2 and 2f3, it includes no component of the low frequency signal f1, f2 or f3.

On the other hand, if the driving signals b, e and h are applied to the electrodes in another situation wherein an operating point drift occurs with any of the optical switches 42-1 to 42-3, a light signal outputted includes a component of one of the frequencies f1, f2 and f3.

The light branching element 45 branches an output light signal of the optical switch 42-3 in the last stage, and the branched output light signal is converted into an electric signal by an optical receiver 46.

The band-pass filter 47-1 detects a component of the frequency f1 included in the output light signal from the optical switch 42-3 based on the electric signal obtained by conversion by the optical receiver 46. If a component of the frequency f1 is detected by the band-pass filter 47-1, this signifies that an operating point drift occurs with the optical switch 42-1.

In this instance, the phase detection and bias supply circuit 48-1 outputs, based on a result of phase comparison between the low frequency signal f1 from the band-pass filter 47-1 and the low frequency signal f1 from the low frequency oscillator 43-1, a dc bias voltage, with which the operating point of the optical switch 42-1 on its operation characteristic curve is controlled to a fixed position, to the electrode of the optical switch 42-1 in a superposing relationship on a clock signal from the driving circuit 44-1.

Similarly, the band-pass filter 47-2 detects a component of the frequency f2 included in an output light signal from the optical switch 42-2 based on the electric signal obtained by conversion by the optical receiver 46. If a component of the frequency f2 is detected by the band-pass filter 47-2, then this signifies that an operating point drift is generated by the optical switch 42-2.

In particular, the phase detection and bias supply circuit 48-2 outputs, based on a result of comparison between the low frequency signal f2 from the band-pass filter 47-2 and the low frequency signal f2 from the low frequency oscillator 43-2, a dc bias voltage, with which the operating point of the optical switch 42-2 on its operation characteristic curve is controlled to a fixed position, to the electrode of the optical switch 42-2 in a superposing relationship on a clock signal from the driving circuit 44-2.

Further, the band-pass filter 47-3 detects a component of the frequency f3 included in the output light signal from the optical switch 42-3 based on the electric signal obtained by conversion by the optical receiver 46. If a component of the frequency f3 is detected by the band-pass filter 47-3, then this signifies that an operating drift point occurs with the optical switch 42-3.

In particular, the phase detection and bias supply circuit 48-3 outputs, based on a result of phase comparison between the low frequency signal f3 from the band-pass filter 47-3 and the low frequency signal f3 from the low frequency oscillator 43-3, a dc bias voltage, with which the operating point of the optical switch 42-3 on its operation characteristic curve is controlled to a fixed position, to the electrode of the optical switch 42-3 in a superposing relationship on the clock signal from the driving circuit 44-3.

Consequently, a dc bias voltage is added to a clock signal as a driving signal in accordance with a detected operating point drift, and a resulting signal is applied to each of the optical switches 42-1 to 42-3. Consequently, each of the optical switches 42-1 to 42-3 is controlled so that the operation point thereof on its operation characteristic may be a fixed position.

In this manner, also with the optical time division demultiplexing apparatus of the fifth embodiment of the present invention, since the operating points of the optical switches 42-1 to 42-3 on their operation characteristic curves can be controlled so as to be stabilized, similarly as in the optical time division demultiplexing apparatus of the first embodiment, an operating point drift of an optical time division multiplex signal can be compensated for and desired optical time division demultiplexing processing can be performed while maintaining a sufficient optical output intensity.

Further, since the branching element 45 which branches an output light signal and the optical receiver 46 which converts a branched light signal into an electric signal can be used commonly as components for compensating for the operating point drifts of the optical switches 42-1 to 42-3, the optical time division demultiplexing apparatus is advantageous also in that reduction in size of the circuit can be achieved and it can contribute to reduction of the cost required to construct the apparatus.

It is to be noted that, also in the optical time division demultiplexing apparatus of the fifth embodiment of the present invention, the number of stages of 1×2 Mach-Zehnder light switches to be connected in series can be set arbitrarily.

g. Sixth Embodiment

Figure 14:
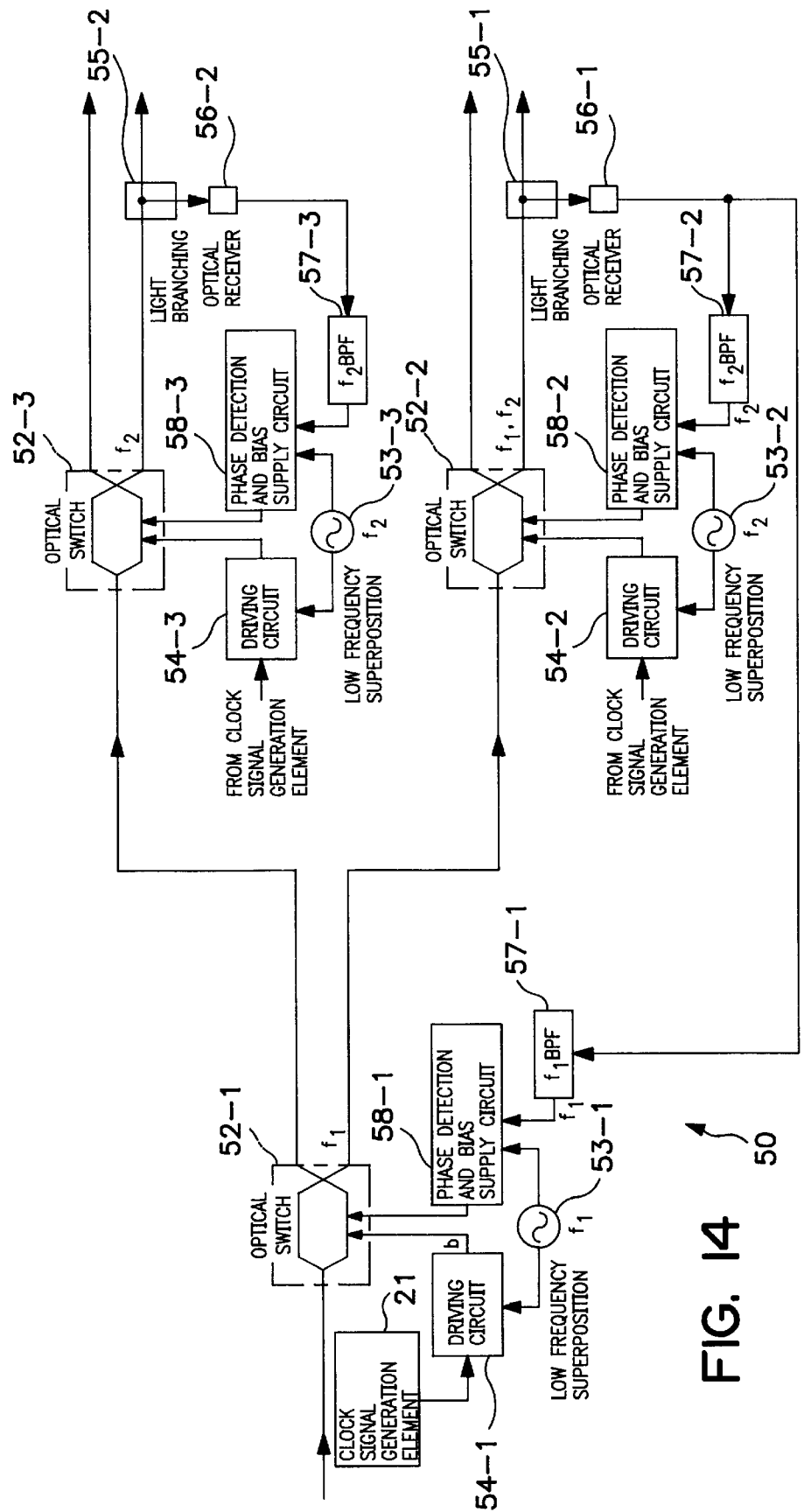
FIG. 14 is a block diagram showing an optical time division demultiplexing apparatus according to a sixth embodiment of the present invention.

FIG. 14 shows an optical time division demultiplexing apparatus according to a sixth preferred embodiment of the present invention. Also the optical time division demultiplexing apparatus 50 shown in FIG. 14 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

While the optical time division demultiplexing apparatus 50 according to the sixth embodiment includes a clock signal generation element 21 similar to that of the fifth embodiment (refer to reference numeral 40) described above and employs a 1×2 Mach-Zehnder optical switch as an optical switch, it is different from that of the fifth embodiment described above in that it includes optical switches 52-2 and 52-3 which demultiplex two demultiplexed signals outputted from an optical switch 52-1 in the first stage.

In particular, in the optical time division demultiplexing apparatus 50 shown in FIG. 14, one of two output terminals of the optical switch 52-1 is connected to an input terminal of the optical switch 52-2 while the other one of the two output terminals of the optical switch 52-1 is connected to an input terminal of the optical switch 52-3.

Further, also the optical time division demultiplexing apparatus 50 according to the sixth embodiment includes low frequency oscillators 53-1 to 53-3, driving circuits 54-1 to 54-3, band-pass filters 57-1 to 57-3 and phase detection and bias supply circuits 58-1 to 58-3, which are basically similar to those of the optical time division demultiplexing apparatus of the fifth embodiment described above, corresponding to the optical switches 52-1 to 52-3, respectively.

The driving circuits 54-1 to 54-3 superpose desired low frequency signals f1, f2 and f2 from the low frequency oscillators 53-1 to 53-3 on a clock signal from the clock signal generation element 21 and output resulting signals as driving signals for the optical switches 52-1 to 52-3, respectively.

The frequency f1 of the low frequency signal to be superposed on the clock signal to the optical switch 52-1 in the first stage and the frequency f2 of the low frequency signals to be superposed on the clock signals to the optical switches 52-2 and 52-3 in the next stage are set so as to be different from each other. Consequently, a low frequency signal used to detect an operating point drift of each of the optical switches 52-1 to 52-3 in the individual stages can be detected distinctly from a low frequency signal superposed by any other optical switch.

One of two output terminals of the optical switch 52-2 is connected to a branching element 55-1 and an optical receiver 56-1 which are similar to those of the optical time division demultiplexing apparatus of the fifth embodiment described above (refer to reference numerals 45 and 56). The branching element 55-1 and the optical receiver 56-1 are used commonly as components for compensating for operating point drifts of the optical switches 52-1 and 52-2.

In particular, the band-pass filter 57-1 detects a component of the low frequency signal f1 included in a demultiplexed signal from the optical switch 52-2 after conversion into an electric signal by the optical receiver 56-1 while the band-pass filter 57-2 detects a component of the low frequency signal f2 included in a demultiplexed signal from the optical switch 52-2.

Consequently, the phase detection and bias supply circuits 58-1 and 58-2 can supply dc bias voltages for compensation for operating point drifts of the optical switches 52-1 and 52-2 based on detection information of the low frequency signals f1 and f2 from the band-pass filters 57-1 and 57-2, respectively.

Further, a light path connected to one of two output terminals of the optical switch 52-3 includes a light branching element 55-2 and an optical receiver 56-2 which construct an independent feedback system for compensating for the operating point drift of the optical switch 52-3.

In particular, the band-pass filter 57-3 detects a component of the low frequency signal f2 included in a demultiplexed signal from the optical switch 52-3 after conversion into an electric signal by the optical receiver 56-2. The phase detection and bias supply circuit 58-3 supplies a dc bias voltage for compensating for the operating point drift of the optical switch 52-3 based on detection information of the low frequency signal f2 from the band-pass filter 57-3.

Also in the optical time division demultiplexing apparatus 50 according to the sixth embodiment of the present invention having the construction described above, similarly as in the optical time division demultiplexing apparatus of the fifth embodiment described above, the clock signal generation element 21 produces a clock signal to be used for optical time division demultiplexing by the optical switches 52-1 to 52-3 from a received optical time division multiplex signal, and the driving circuits 54-1 to 54-3 superpose predetermined low frequency signals f1 and f2 on the clock signals from the clock signal generation element 21 and output resulting signals.

The optical switch 52-1 modulates the optical time division multiplex signal (for example, 4×B gigabit/second) as an inputted received light signal with the clock signal b (for example, 2×B gigahertz) for optical time division multiplexing processing generated by the driving circuit 54-1 to demultiplex the optical time division multiplex signal, and outputs resulting signals as two demultiplexed signals (for example, 2×B gigabit/second).

The demultiplexed signal outputted from one of the output terminals of the optical switch 52-1 is inputted to the optical switch 52-2 and further demultiplexed into and outputted as two demultiplexed signals (for example, B gigabit/second) by and from the optical switch 52-2. Similarly, the demultiplexed signal outputted from the other one of the output terminals of the optical switch 52-1 is inputted to the optical switch 52-3 and further demultiplexed into and outputted as two demultiplexed signals (for example, B gigabit/second) by and from the optical switch 52-3.

It is to be noted that the branching element 55-1 branches an output light signal from the optical switch 52-2 in the last stage, and the branched output light signal is converted into an electric signal by the optical receiver 56-1. Meanwhile, the branching element 55-2 branches an output light signal from the optical switch 52-3, and the branched output light signal is converted into an electric signal by the optical receiver 56-2.

By the way, the optical switches 52-2 and 52-3 output demultiplexed signals under an influence of the low frequency signals $f_1$ and $f_2$ superposed with clock signals by the driving circuits 54-1 to 54-3.

In particular, in the optical switch 52-2, if driving voltages superposed with the low frequency signals $f_1$ and $f_2$ are applied to the electrodes of the optical switches 52-1 and 52-2 in a situation wherein an operating point drift arising from a temperature variation or a secular change does not occur with any of the optical switches 52-1 and 52-2, then although components of the frequencies 2 $f_1$ and 2 $f_2$ are included in an output light signal of the optical switch 52-2, components of the frequencies $f_1$ and $f_2$ are not included in the output light signal.

On the other hand, if driving voltages superposed with the low frequency signals $f_1$ and $f_2$ are applied to the electrodes in another situation wherein an operating point drift occurs with any of the optical switches 52-1 and 52-2, then the outputted light signal of the optical switch 52-2 includes a component of one of the low frequency signals $f_1$ and $f_2$.

The band-pass filter 57-1 detects a component of the low frequency signal $f_1$ included in the output light signal from the optical switch 52-2 based on the electric signal obtained by conversion by the optical receiver 56-1.

Here, if an operating point drift occurs with the optical switch 52-1, then the phase detection and bias supply circuit 58-1 outputs, based on the phase difference between the low frequency signal $f_1$ detected by the band-pass filter 57-1 and the low frequency signal $f_1$ from the low frequency oscillator 53-1, a dc bias voltage, with which the operating point of the optical switch 52-1 on its operation characteristic curve is controlled to a fixed position, to the electrode of the optical switch 52-1 in a superposing relationship on the clock signal from the driving circuit 54-1.

Similarly, the band-pass filter 57-2 detects a component of the frequency $f_2$ included in the output light signal from the optical switch 52-2 based on the electric signal obtained by conversion by the optical receiver 56-1.

Here, if an operating point drive occurs with the optical switch 52-2, then the phase detection and bias supply circuit 58-2 outputs, based on a result of phase comparison (phase difference) between the low frequency signal $f_2$ detected by the band-pass filter 57-2 and the low frequency signal $f_2$ from the low frequency oscillator 53-2, a dc bias voltage, with which the operating point of the optical switch 52-2 on its operation characteristic curve is controlled to a fixed position, to the electrode of the optical switch 52-2 in a superposing relationship on the clock signal from the driving circuit 54-2.

Further, the band-pass filter 57-3 detects a component of the low frequency signal $f_2$ included in the output light signal from the optical switch 52-3 based on the electric signal obtained by conversion by the optical receiver 56-2.

Here, if an operating point drift occurs with the optical switch 52-3, a dc bias voltage with which the operating point of the optical switch 52-3 on its operation characteristic curve is controlled to a fixed position is outputted, based on a result of phase comparison between the low frequency signal $f_2$ detected by the band-pass filter 57-3 and the low frequency signal $f_2$ from the low frequency oscillator 53-3, to the electrode of the optical switch 52-3 in a superposing relationship on the clock signal from the driving circuit 54-3.

Consequently, a dc bias voltage is added to a clock signal as a driving signal in accordance with a detected operating point drift, and a resulting signal is applied to each of the optical switches 52-1 to 52-3 so that the operating points of the optical switches 52-1 to 52-3 on their operation characteristics are controlled so as to be fixed positions.

In this manner, also the optical time division demultiplexing apparatus according to the sixth embodiment of the present invention is advantageous in that, since the operating pints of the optical switches 52-1 to 52-3 on their operation characteristic curves can be controlled so as to be stabilized, similarly as in the optical time division demultiplexing apparatus of the first embodiment, an operating point drift of an optical time division multiplex signal can be compensated for and desired optical time division demultiplexing processing can be performed while maintaining a sufficient optical output intensity.

Further, since the branching element 55-1 which branches an output light signal and the optical receiver 56-1 which converts a branched light signal into an electric signal can be used commonly as components for compensating for operating point drifts of the optical switches 52-1 and 52-2, the optical time division demultiplexing apparatus is advantageous also in that the number of branching operations of the circuit can be reduced and reduction in size of the circuit and reduction of the cost required to construct the apparatus can be achieved.

It is to be noted that, also in the optical time division demultiplexing apparatus of the sixth embodiment of the present invention, similarly as in the optical time division multiplexing apparatus of the fourth and fifth embodiments described above, the number of stages of 1×2 Mach-Zehnder optical switches to be connected in series can be set arbitrarily.

h. Seventh Embodiment

Figure 15:
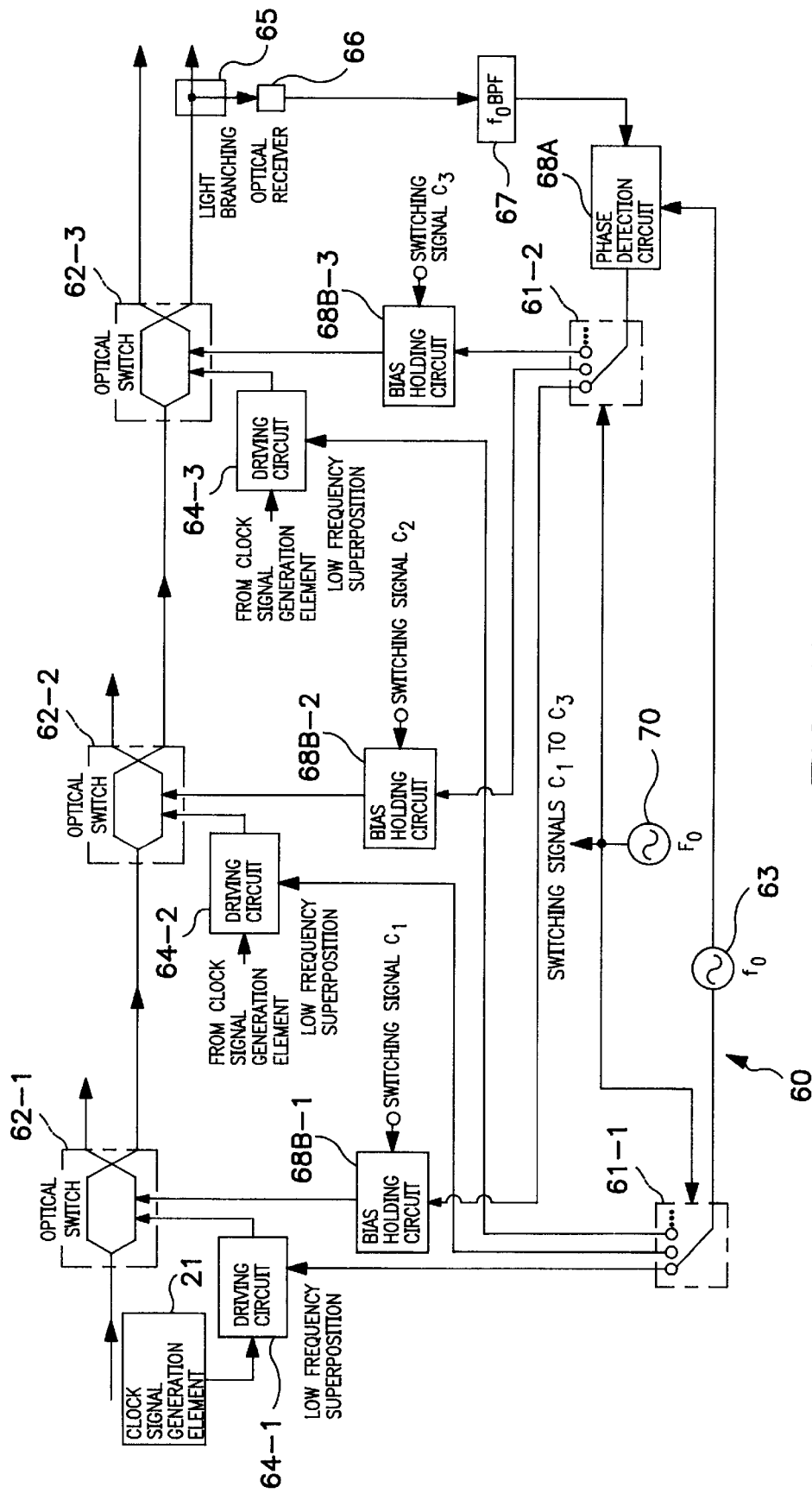
FIG. 15 is a block diagram showing an optical time division demultiplexing apparatus according to a seventh embodiment of the present invention.

FIG. 15 is a block diagram showing an optical time division demultiplexing apparatus according to a seventh preferred embodiment of the present invention. Also the optical time division demultiplexing apparatus 60 shown in FIG. 15 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

While the optical time division demultiplexing apparatus 60 according to the seventh embodiment includes three 1×2 Mach-Zehnder optical switches 62-1 to 62-3 connected in series in three stages similarly as in the optical time division demultiplexing apparatus of the fifth embodiment described above, it is different in that compensation controls for operating point drifts of the optical switches 62-1 to 62-3 are performed successively switching the same with respect to time.

Further, also the optical time division demultiplexing apparatus 60 shown in FIG. 15 includes a clock signal generation element 21, driving circuits 64-1 to 64-3, a light branching element 65 and an optical receiver 66 similar to those (refers to reference numerals 21, 44-1 to 44-3, 45 and 46) of the optical time division demultiplexing apparatus of the fifth embodiment described above. Overlapping description of the common components is omitted here to avoid redundancy.

The optical time division demultiplexing apparatus 60 additionally includes a low frequency oscillator 63 for generating a predetermined low frequency signal $f_0$ set in advance, and a band-pass filter 67 serving as a low frequency signal detection element for detecting the low frequency signal $f_0$ from an optical signal outputted from the optical switch 62-3 in the last stage.

The optical time division demultiplexing apparatus 60 further includes a phase detection circuit 68A serving as a phase difference detection element. The phase detection circuit 68A detects a difference between the phase of the low frequency signal $f_0$ from the low frequency oscillator 63 and the phase of a low frequency signal $f_0$ detected by the band-pass filter 67 and can be formed from, for example, the reversal full wave rectification element 28a described hereinabove with reference to FIG. 5.

The optical time division demultiplexing apparatus 60 further includes a first change-over switch 61-1 which switches the low frequency signal $f_0$ from the low frequency oscillator 63 under switching control of an oscillation circuit 70 which generates a timing pulse signal of a period of $1/F_0$ so that the low frequency signal $f_0$ may be selectively outputted to one of the driving circuits 64-1 to 64-3 in the different stages.

The optical time division demultiplexing apparatus 60 further includes a second change-over switch 61-2 which switches a bias voltage from the phase detection and bias voltage supply circuit 68A under switching control by the timing pulse signal of the period of $1/F_0$ from the oscillation circuit 70 so that the bias voltage may be selectively outputted as a bias voltage for operating point compensation of one of the optical switches 62-1 to 62-3.

The optical time division demultiplexing apparatus 60 further includes bias holding circuits 68B-1 to 68B-3 serving as bias voltage holding elements. The bias holding circuits 68B-1 to 68B-3 are provided individually for the optical switches 62-1 to 62-3 in the different stages and temporarily store bias voltage information from the phase detection and bias voltage supply circuit 68A. In particular, each of the bias holding circuits 68B-1 to 68B-3 includes an integration circuit 69a and a voltage follower 69b as shown in FIG. 16.

In this instance, the integration circuit 69a which is used to form the bias holding circuits 68B-1 to 68B-3 has a function as the low-pass filter 28b described hereinabove with reference to FIG. 5 and performs low-pass filter processing for phase comparison result information from the phase detection and bias supply circuit 68A to extract a dc component of the phase comparison result information.

Figure 16:
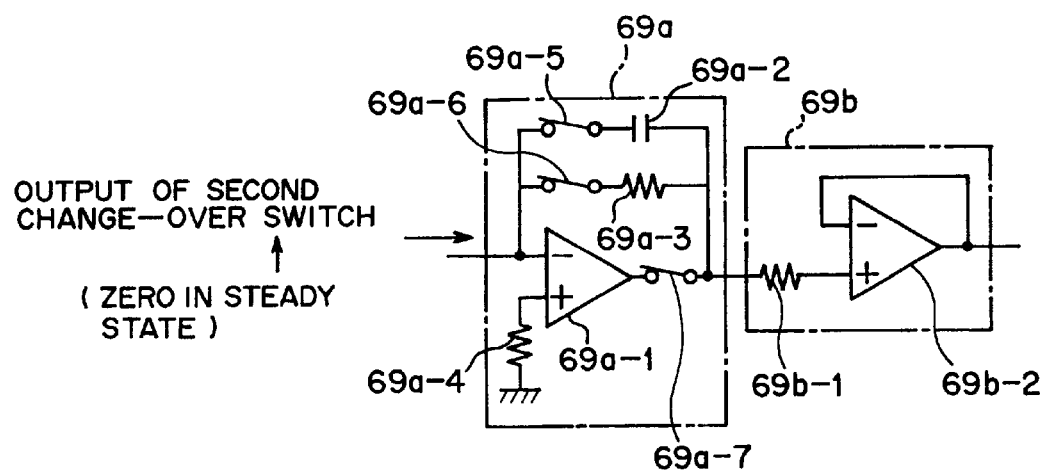
FIG. 16 is a block diagram showing details of part of the optical time division demultiplexing apparatus of FIG. 15.

The integration circuit 69a shown in FIG. 16 includes an operational (OP) amplifier 69a-1, a capacitor 69a-2, and resistors 69a-3 and 69a-4. The integration circuit 69a further includes switches 69a-5 to 69a-7 for controlling conduction states of the operational amplifier 69a-1, capacitor 69a-2 and resistor 69a-3 between on and off, respectively.

The switches 69a-5 to 69a-7 are controlled between on and off in synchronism with each other in response to switching signals $C_1$ to $C_3$ from the oscillation circuit 70. Particularly when the switches 69a-5 to 69a-7 are in an on-state, the integration circuit 69a can output a dc bias voltage based on phase difference detection information from the phase detection circuit 68A, but when they are in an off-state, charge when they have been switched from on to off can be stored in the capacitor 69a-2. Consequently, a voltage immediately before the switches are switched off can be outputted as a dc bias voltage.

In other words, when the switching signals $C_1$ to $C_3$ mentioned above are not inputted to the bias holding circuits 68B-1 to 68B-3, the bias holding circuits 68B-1 to 68B-3 are in a state wherein they can output dc bias voltage information stored therein, and then, when the switching signals $C_1$ to $C_3$ are inputted, the bias voltage information held in the bias holding circuits 68B-1 to 68B-3 is updated to bias voltage information from the phase detection circuit 68A.

The voltage follower 69b is provided to prevent electric current flowing between an output terminal of the integration circuit 69a and a corresponding one of the optical switches 62-1 to 62-3. The voltage follower 69b includes a resistor 69b-1 and an operational (OP) amplifier 69b-2.

Further, the oscillation circuit 70 mentioned above is formed from, for example, a multivibrator and an analog switch or a like element and outputs a timing pulse signal of the period of $1/F_0$ to be supplied to the first change-over switch 61-1 and the second change-over switch 61-2 and the switching signals $C_1$ to $C_3$ to be outputted to the bias holding circuits 68B-1 to 68B-3, respectively, in a synchronized relationship with each other.

It is to be noted that the switching period $1/F_0$ for operating point stabilization control generated by the oscillation circuit 70 described above is set to a period as short as possible within a range sufficiently longer than a time constant of the control.

In other words, when the first change-over switch 61-1 is controlled so that the low frequency oscillator 63 and the driving circuit 64-1 are rendered conducting and the second change-over switch 61-2 is controlled so that the phase detection circuit 68A and the bias holding circuit 68B-1 are rendered conducting by the timing pulse signals from the oscillation circuit 70, the switches 69a-5 to 69a-7 of the bias holding circuit 68B-1 are switched on by the switching signal $C_1$. In this instance, by the switching signals $C_2$ and $C_3$, the switches 69a-5 to 69a-7 of the corresponding integration circuits 69a are switched off.

Consequently, the low frequency signal $f_0$ from the low frequency oscillator 63 is superposed on one driving circuit 64-k (k; 1, 2 or 3) of the three driving circuits 64-1 to 64-3 while information held by the bias holding circuit 68B-k is updated with a dc bias voltage from the phase detection circuit 68A.

In other words, production of a dc bias voltage to be used for operating point compensation of the plurality of optical switches 62-1 to 62-3 described above is performed successively and switchably at time intervals of $f/F_0$ among the optical switches 62-1 to 62-3.

Further, as components of feedback systems for allowing operating point compensation to be performed by the optical switches 62-1 to 62-3, the light branching element 65, optical receiver 66, band-pass filter 67, phase detection circuit 68A and 68 can be used commonly.

In the optical time division demultiplexing apparatus 60 according to the seventh embodiment of the present invention having the construction described above, similarly as in the optical time division demultiplexing apparatus of the fifth embodiment described above, a received optical time division multiplex signal is demultiplexed by and outputted from the optical switches 62-1 to 62-3 based on a clock signal generated by the clock signal generation element 21.

The oscillation circuit 70 outputs timing pulse signals synchronized with each other to the first change-over switch 61-1 and the second change-over switch 61-2 and outputs switching signals $C_1$ to $C_3$ to one of the bias holding circuits 68B-1 to 68B-3 so that production of dc bias voltages to be used for operating point compensation of the plurality of optical switches 62-1 to 62-3 described above is performed successively and switchably at time intervals of $1/F_0$ by and among the optical switches 62-1 to 62-3.

In this manner, with the optical time division demultiplexing apparatus according to the seventh embodiment of the present invention, since switching of the first change-over switch 61-1 and the second change-over switch 61-2 described above is controlled so that control of the operating point of a clock signal to be supplied to a pertaining one of the plurality of optical switches 62-1 to 62-3 to a fixed position on the operation characteristic of the optical switch 62-1, 62-2 or 62-3 is performed switchably with respect to time and updating of bias voltage information to be held in the bias holding circuits 68B-1 to 68B-3 is controlled, components of feedback systems for allowing operating point compensation to be performed by the individual optical switches 62-1 to 62-3 can be used commonly and the number of branching operations for light can be reduced. Consequently, the optical time division demultiplexing apparatus is advantageous in that reduction in size of the circuit can be achieved.

i. Eighth Embodiment

Figure 17:
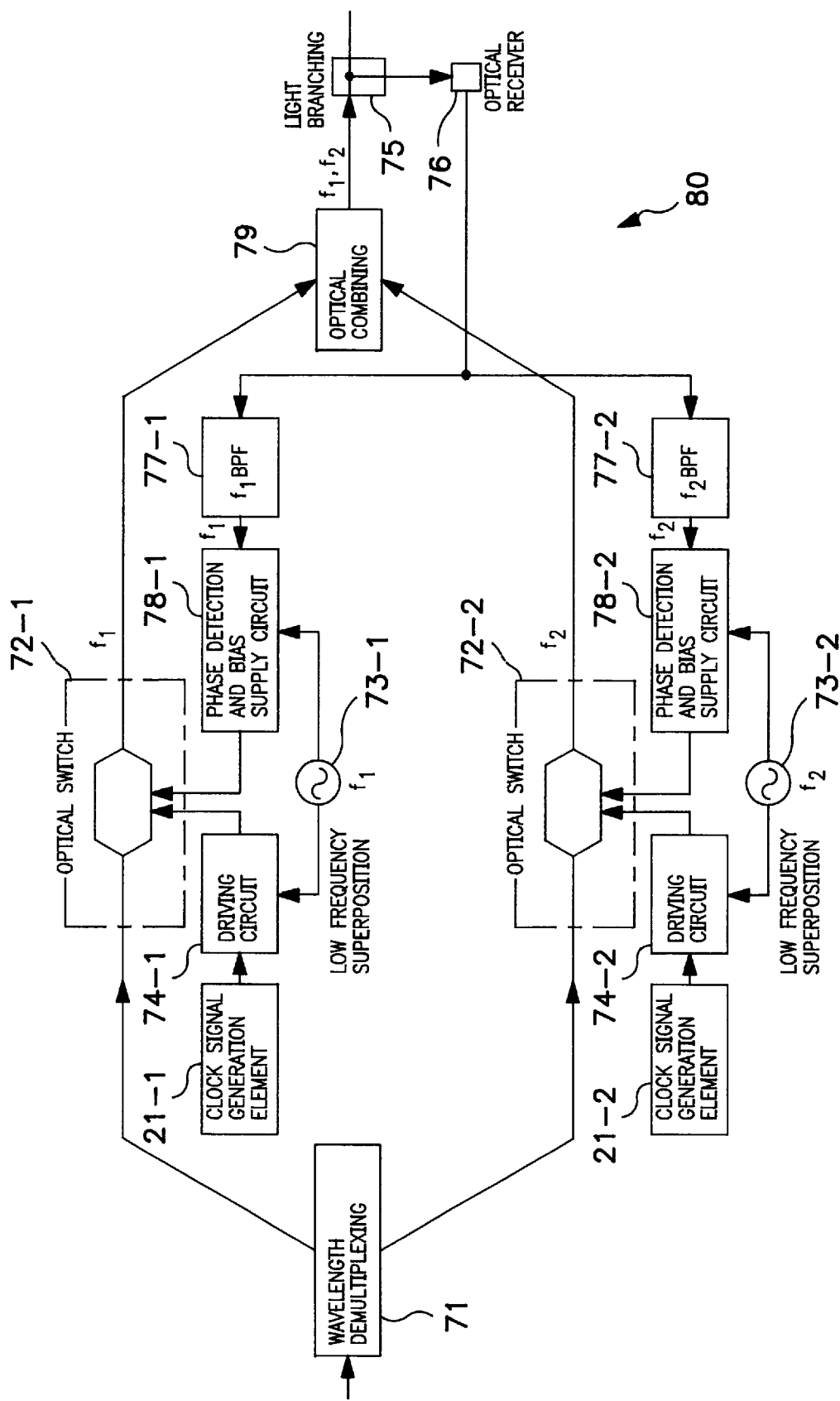
FIG. 17 is a block diagram showing an optical time division demultiplexing apparatus according to an eighth embodiment of the present invention.

FIG. 17 is a block diagram showing an optical time division demultiplexing apparatus according to an eighth preferred embodiment of the present invention. Also the optical time division demultiplexing apparatus 80 shown in FIG. 17 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 80 according to the eighth embodiment is different from the optical time division demultiplexing apparatus of the embodiments described above in that, if an inputted optical time division multiplex signal is a wavelength multiplexed signal, then it wavelength demultiplexes the inputted optical time division multiplex signal first and then performs time division demultiplexing processing, but is basically similar in terms of the manner of operating point stabilization control.

To this end, the optical time division demultiplexing apparatus 80 according to the eighth embodiment includes, as seen in FIG. 17, a pair of clock signal generation elements 21-1 and 21-2, a wavelength demultiplexing element 71, a pair of optical switches 72-1 and 72-2, a pair of low frequency oscillators 73-1 and 73-2, a pair of driving circuits 74-1 and 74-2, a light branching element 75, an optical receiver 76, a pair of band-pass filters 77-1 and 77-2, a pair of phase detection and bias supply circuits 78-1 and 78-2, and an optical combining element 79.

The wavelength demultiplexing element 71 performs wavelength demultiplexing processing for an inputted received optical signal (wavelength multiplexed optical time division multiplex signal) (in the apparatus shown in FIG. 17, the inputted received optical signal is demultiplexed into two optical signals) and has a function as a first optical demultiplexing element.

The clock signal generation elements 21-1 and 21-2 generate clock signals to be used for time division demultiplexing processing by the optical switches 72-1 and 72-2 in the next stage, respectively, based on optical signals of two different wavelengths demultiplexed by the wavelength demultiplexing element 71.

The low frequency oscillators 73-1 and 73-2 generate predetermined low frequency signals different from each other. For example, the low frequency oscillator 73-1 generates a low frequency signal $f_1$ while the low frequency oscillator 73-2 generates another low frequency signal $f_2$.

The driving circuit 74-1 serving as a low frequency superposition element superposes the predetermined low frequency signal $f_1$ from the low frequency oscillator 73-1 on a clock signal from the clock signal generation element 21-1 and outputs a resulting signal as a clock signal to the optical switch 72-1.

The driving circuit 74-2 serving as another low frequency superposition element superposes the predetermined low frequency signal $f_2$ from the low frequency oscillator 73-2 on another clock signal from the clock signal generation element 21-2 and outputs a resulting signal as a clock signal to the optical switch 72-2.

Accordingly, the optical switch 72-1 performs time division demultiplexing processing for one of optical time division multiplex signals wavelength demultiplexed by the wavelength demultiplexing element 71 based on a clock signal from the driving circuit 74-1 and outputs a resulting signal as a demultiplexed signal. It is to be noted that, similarly as in the optical time division demultiplexing apparatus of the first embodiment described hereinabove, when an operating point drift occurs with the optical switch 72-1, a low frequency component $f_1$ is included in the demultiplexed signal.

Similarly, the optical switch 72-2 performs time division demultiplexing processing for the other time division multiplex signal wavelength demultiplexed by the wavelength demultiplexing element 71 based on a clock signal from from the driving circuit 74-2 and outputs a resulting signal as a demodulated signal. In this instance, if an operating point drift occurs with the optical switch 72-2, then a low frequency component $f_2$ is included in the demultiplexed signal.

Further, the optical combining element 79 combines optical signals time division demultiplexed by the optical switches 72-1 and 72-2. The light branching element 75 branches an optical signal outputted from the optical combining element 79 into two.

The optical receiver 76 converts a branched optical signal from the light branching element 75 into an electric signal. The electric signal obtained by the conversion is outputted to the band-pass filters 77-1 and 77-2.

The band-pass filter 77-1 detects a low frequency signal $f_1$ from an electric signal obtained by conversion of an optical signal outputted from the optical combining element 79. Similarly, the band-pass filter 77-2 detects a low frequency signal $f_2$ from the electric signal obtained by conversion of the optical signal outputted from the optical combining element 79. Accordingly, the band-pass filters 77-1 and 77-2 described above function as low frequency signal detection elements.

It is to be noted that, since the low frequency signals $f_1$ and $f_2$ to be superposed on clock signals to be supplied to the optical switches 72-1 and 72-2 described above have frequencies different from each other, low frequency signals to be used for detection of operating point drifts of the optical switches 72-1 and 72-2 in the different stages can be detected at a time distinctly from the low frequency signals superposed by the other optical switches using only the optical signal after multiplexed.

The phase detection and bias supply circuit 78-1 applies a bias voltage to the optical switch 72-1 in accordance with a difference between the phase of the low frequency signal $f_1$ from the low frequency oscillator 73-1 and the phase of the low frequency signal $f_1$ detected by the band-pass filter 77-1.

Similarly, the phase detection and bias supply circuit 78-2 applies a bias voltage to the optical switch 72-2 in accordance with a difference between the phase of the low frequency signal $f_2$ from the low frequency oscillator 73-2 and the phase of the low frequency signal $f_2$ detected by the band-pass filter 77-2.

In other words, the phase detection and bias supply circuits 78-1 and 78-2 described above function as bias voltage supplying elements, and particularly, each of them has such a construction as shown in FIG. 5 similarly to that (refer to reference numeral 28) in the optical time division demultiplexing apparatus of the first embodiment described hereinabove.

Accordingly, the low frequency oscillators 73-1 and 73-2, driving circuits 74-1 and 74-2, band-pass filters 77-1 and 77-2 and phase detection and bias supply circuits 78-1 and 78-2 provided corresponding to the optical switches 72-1 and 72-2 described above, respectively, form an operating point stabilization control circuit which superposes predetermined low frequency signals set in advance on clock signals for optical time division demultiplexing processing to be supplied to the optical switches 72-1 and 72-2, respectively, and controls the clock signals to be supplied to the optical switches 72-1 and 72-2 based on phase differences between the low frequency signals $f_1$ and $f_2$ of optical signals after time division demultiplexing processing by the optical switches 72-1 and 72-2 and components of the low frequency signals $f_1$ and $f_2$ from the low frequency oscillators 73-1 and 73-2 so that the operating points of the optical switches 72-1 and 72-2 on their operation characteristics may be is fixed positions.

In the optical time division demultiplexing apparatus according to the eighth embodiment of the present invention having the construction described above, the wavelength demultiplexing element 71 performs wavelength demultiplexing processing for an inputted received optical signal (wavelength multiplexed optical time division multiplex signal).

The optical switches 72-1 and 72-2 perform optical time division demultiplexing processing similar to that in the optical time division demultiplexing apparatus of the embodiments described above for the two optical time division multiplex signals obtained by wavelength demultiplexing by the wavelength demultiplexing element 71 based on clock signals generated by the clock signal generation elements 21-1 and 21-2, respectively. Then, the optical time division multiplex signals are combined by the optical combining element 79 and then outputted as an electric signal via the light branching element 75 and the optical receiver 76 to the band-pass filters 77-1 and 77-2.

The band-pass filter 77-1 detects a component of the low frequency signal $f_1$ included in the output optical signal from the optical receiver 76. If a component of the frequency $f_1$ is detected by the band-pass filter 77-1, then this signifies that an operating point drift occurs, and the phase detection and bias supply circuit 78-1 performs phase comparison between the low frequency signal $f_1$ from the band-pass filter 77-1 and the low frequency signal $f_1$ from the low frequency oscillator 73-1 to detect the operating point drift.

Further, the phase detection and bias supply circuit 78-1 produces a dc bias voltage based on the amount of the operating point drift and outputs the dc bias voltage in a superposing relationship on a clock signal from the driving circuit 74-1 to the optical switch 72-1.

Similarly, the band-pass filter 77-2 detects a component of the low frequency signal $f_2$ included in the output optical signal from the optical receiver 76. If a component of the low frequency signal $f_2$ is detected by the band-pass filter 77-2, then this signifies that an operating point drift occurs, and the phase detection and bias supply circuit 78-2 performs phase comparison between the low frequency signal $f_2$ from the band-pass filter 77-2 and the low frequency signal $f_2$ from the low frequency oscillator 73-2 to detect the operating point drift.

Further, the phase detection and bias supply circuit 78-2 produces a dc bias voltage based on the amount of the operating point drift and outputs the dc bias voltage in a superposing relationship on a clock signal from the driving circuit 74-2 to the optical switch 72-2.

Consequently, the dc bias voltages are added to the clock signals as driving signals in accordance with the detected operating point drifts and resulting signals are applied to the optical switches 72-1 and 72-2 to control the optical switches 72-1 and 72-2 so that the operating points of the optical switches 72-1 and 72-2 on their operation characteristics may be fixed points.

In this manner, with the optical time division demultiplexing apparatus according to the eighth embodiment of the present invention, since it includes the clock signal generation elements 21-1 and 21-2, wavelength demultiplexing element 71, optical switches 72-1 and 72-2 and optical combining element 79 and predetermined low frequency signals $f_1$ and $f_2$ set in advance and different from each other are superposed on clock signals for optical time division demultiplexing processing to be supplied to the optical switches 72-1 and 72-2, respectively, while the clock signals to be supplied to the optical switches 72-1 and 72-2 are controlled based on phase differences between the low frequency signals $f_1$ and $f_2$ of optical signals after time division demultiplexing processing by the optical switches 72-1 and 72-2 and components of the low frequency signals $f_1$ and $f_2$ from the low frequency oscillators 73-1 and 73-2 so that the operating points of the optical switches 72-1 and 72-1 on their operation characteristics may be fixed positions, the optical time division demultiplexing apparatus can be constructed so as to perform optical time division demultiplexing processing also for an optical time division multiplex signal for which wavelength multiplexing processing has been performed. The optical time division demultiplexing apparatus is advantageous also in that, since components of feedback systems for allowing operating point compensation to be performed by the optical switches 72-1 and 72-2 can be used commonly and the number of branching operations for light can be reduced, reduction in size of the circuit and reduction of the cost required to construct the apparatus can be achieved.

It is to be noted that, while, in the optical time division demultiplexing apparatus of the eighth embodiment described above, compensation control for operating point drifts of the optical switches 72-1 and 72-2 is realized using different frequencies $f_1$ and $f_2$ as the frequencies of low frequency signals to be superposed, the low frequency signals to be superposed are not limited to them, and it is otherwise possible to use a same frequency $f_0$ for the low frequency signals to be superposed and successively switch it with respect to time similarly as in the optical time division demultiplexing apparatus of the seventh embodiment described above.

Figure 18:
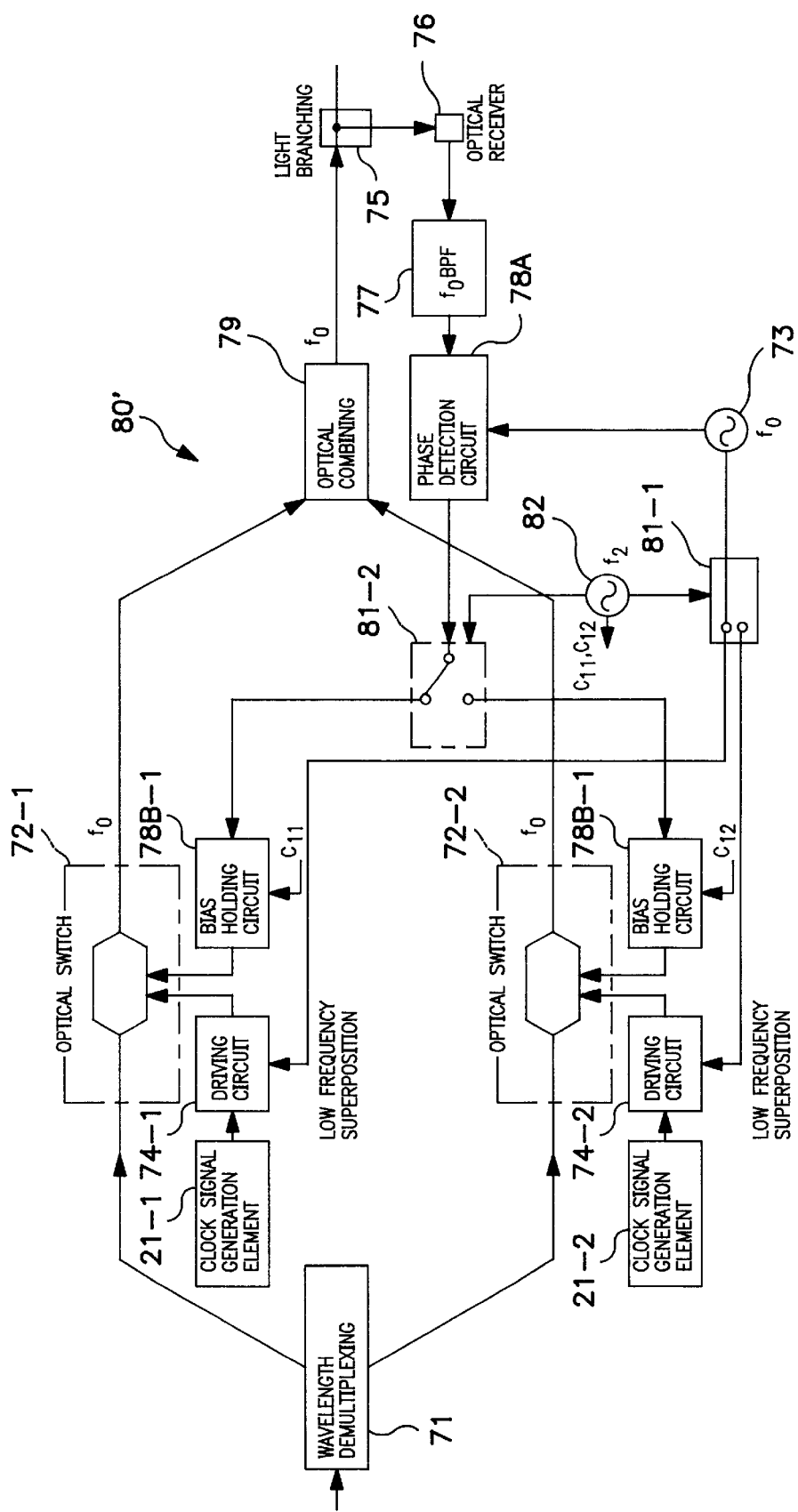
FIG. 18 is a block diagram showing a modification to the optical time division demultiplexing apparatus of FIG. 17.

In this instance, the optical time division demultiplexing apparatus 80' shown in FIG. 18 is constructed including a wavelength demultiplexing element 71, a pair of optical switches 72-1 and 72-2, an optical combining element 79, a light branching element 75 and an optical receiver 76 similar to those in the optical time division demultiplexing apparatus 80 described hereinabove with reference to FIG. 17 and including a first change-over switch 81-1, a second change-over switch 81-2, a phase detection circuit 78A, a pair of bias holding circuits 78B-1 and 78B-2 and an oscillation circuit 82 which have functions similar to those (refer to reference symbols 61-1, 61-2, 68A, 68B-1 to 68B-3 and 70) in the optical time division demultiplexing apparatus of the seventh embodiment described above.

Thus, the oscillation circuit 82 outputs timing pulse signals synchronized with each other to the first change-over switch 81-1 and the second change-over switch 81-2 and outputs a switching signal $C_{11}$ or $C_{12}$ to a corresponding one of the bias holding circuits 78B-1 and 78B-2 so that production of a dc bias voltage to be used for operating point compensation by one of the two optical switches 72-1 and 72-2 can be performed successively switching the same in order at time intervals $1/F_0$ between the optical switches 72-1 and 72-2.

Accordingly, the optical time division demultiplexing apparatus 80' shown in FIG. 18 is advantageous in that, since components of feedback systems for allowing operating point compensation to be performed by the optical switches 72-1 and 72-2 can be used commonly and the number of branching operations for light can be reduced, reduction in size of the circuit can be achieved.

j. Ninth Embodiment

Figure 19:
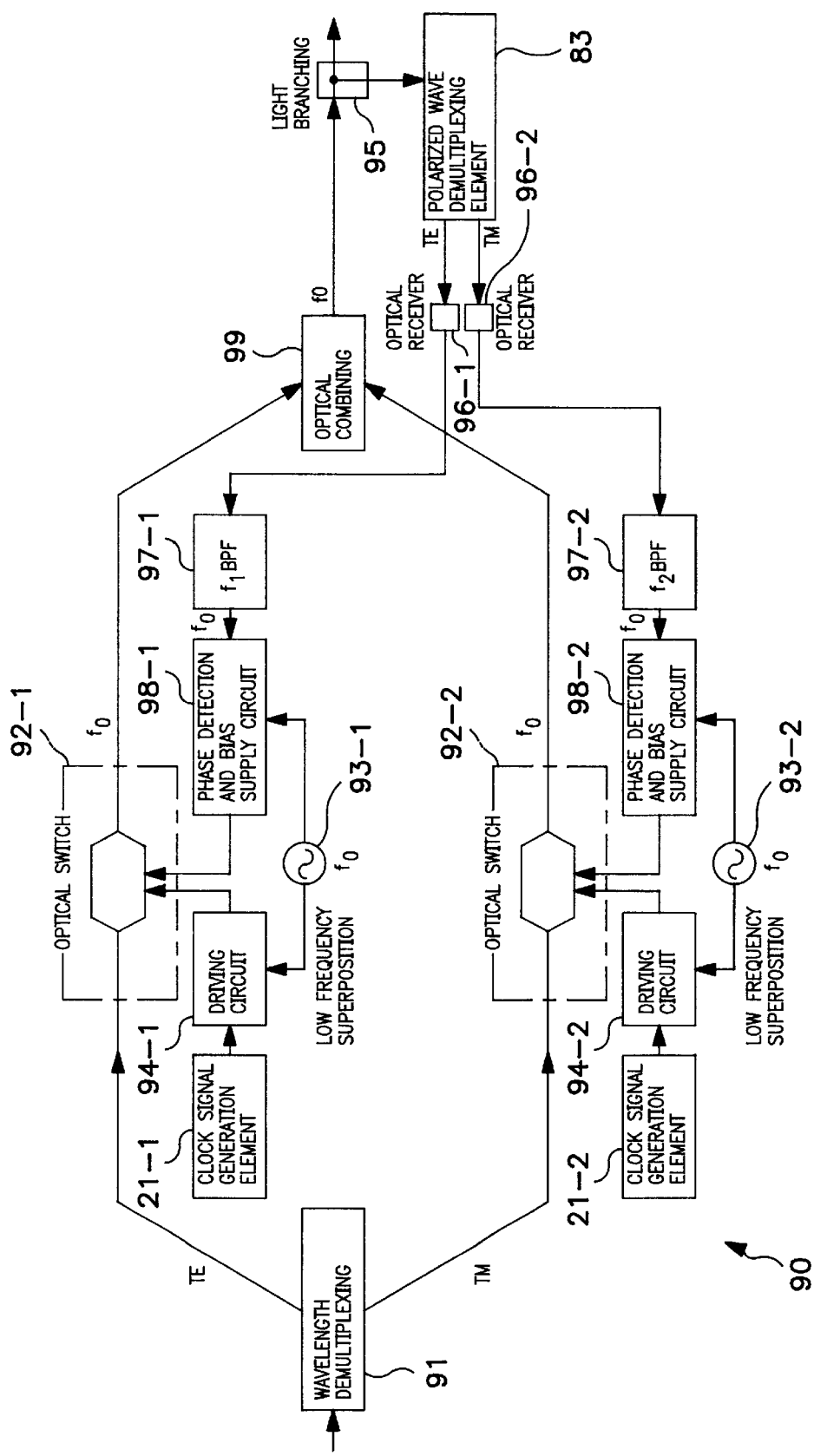
FIG. 19 is a block diagram showing an optical time division demultiplexing apparatus according to a ninth embodiment of the present invention.

FIG. 19 is a block diagram showing an optical time division demultiplexing apparatus according to a ninth preferred embodiment of the present invention. Also the optical time division demultiplexing apparatus 90 shown in FIG. 19 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 90 according to the ninth embodiment is different from the optical time division demultiplexing apparatus of the embodiments described above in that it is constructed as an optical time division demultiplexing apparatus of the polarization non-dependent type which performs time division demultiplexing processing after it performs polarized wave demultiplexing processing for an inputted optical time division multiplex signal, but is basically similar in terms of the manner of operating point stabilization control.

To this end, the optical time division demultiplexing apparatus 90 according to the ninth embodiment includes, as seen in FIG. 19, a pair of clock signal generation elements 21-1 and 21-2, a polarized wave demultiplexing element 91, a pair of optical switches 92-1 and 92-2, a pair of low frequency oscillators 93-1 and 93-2, a pair of driving circuits 94-1 and 94-2, a light branching element 95, a pair of optical receivers 96-1 and 96-2, a pair of band-pass filters 97-1 and 97-2, a pair of phase detection and bias supply circuits 98-1 and 98-2, an optical combining element 99 and a polarized wave demultiplexing element 83.

The polarized wave demultiplexing element 91 demultiplexes an inputted received optical signal (wavelength multiplexed optical time division multiplex signal) to obtain two polarized wave components (TE wave and TM wave) and has a function as a first light demultiplexing element.

The clock signal generation elements 21-1 and 21-2 generate clock signals to be used for time division demultiplexing processing by the optical switches 92-1 and 92-2 in the next stage based on optical signals of two different polarized waves separated by the polarized wave demultiplexing element 91. The low frequency oscillators 93-1 and 93-2 generate a predetermined low frequency signal $f_0$.

Further, the driving circuit 94-1 serving as a low frequency superposition element superposes the predetermined low frequency signal $f_0$ from the low frequency oscillator 93-1 on a clock signal from the clock signal generation element 21-1 and outputs a resulting signal as a clock signal to the optical switch 92-1.

The driving circuit 94-2 serving as a low frequency superposition element superposes the predetermined low frequency signal $f_0$ from the low frequency oscillator 93-2 on another clock signal from the clock signal generation element 21-2 and outputs a resulting signal as a clock signal to the optical switch 92-2.

Accordingly, the optical switch (1×1 Mach-Zehnder optical switch) 92-1 performs time division demultiplexing processing for one (for example, for the TE wave) of optical time division multiplex signals wavelength demultiplexed by the polarized wave demultiplexing element 91 based on a clock signal from the driving circuit 94-1 and outputs a resulting signal as a demultiplexed signal. It is to be noted that, similarly as in the optical time division demultiplexing apparatus of the first embodiment described above, when an operating point drift occurs with the optical switch 92-1, a low frequency signal $f_0$ is included in the demultiplexed signal.

Similarly, the optical switch (1×1 Mach-Zehnder optical switch) 92-2 performs time division demultiplexing processing for the other one (for example, for the TM wave) of the optical time division multiplex signals wavelength demultiplexed by the polarized wave demultiplexing element 91 based on a clock signal from the driving circuit 94-2 and outputs a resulting signal as a demultiplexed signal. It is to be noted that, also in this instance, when an operating point drift occurs with the optical switch 92-2, a low frequency signal $f_0$ is included in the demultiplexed signal.

The optical combining element 99 combines optical signals polarization demultiplexed by the polarized wave demultiplexing element 91 and time division demultiplexed by the optical switches 92-1 and 92-2. The light branching element 95 branches an optical signal outputted from the optical combining element 99 into two.

The polarized wave demultiplexing element 83 is provided in a stage preceding to the band-pass filters 97-1 and 97-2 and demultiplexes polarized wave components (TE wave and TM wave) from a branched signal from the light branching element 95. The polarized wave demultiplexing element 83 thus has a function as a second optical demultiplexing element for demultiplexing two polarized wave components of an optical signal combined by the optical combining element 99.

In other words, since an optical demultiplexer of the polarized light non-dependent type can be formed using the polarized wave demultiplexing element 91, optical combining element 99 and polarized wave demultiplexing element 83 described above, even if the low frequency signals to be superposed on clock signals to be supplied to the optical switches 92-1 and 92-2 have an equal frequency $f_0$, the low frequency signals to be used for detection of operating point drifts of the optical switches 92-1 and 92-2 in the different stages can be detected at a time distinctly from the low frequency signals superposed by the other optical switches only using the optical signal after multiplexed.

The optical receiver 96-1 receives a TE wave polarization demultiplexed by the polarized wave demultiplexing element 83, converts the received TE wave into an electric signal and outputs the electric signal to the band-pass filter 97-1. The optical receiver 96-2 receives a TM wave polarization demultiplexed by the polarized wave demultiplexing element 83, converts the received TM wave into an electric signal and outputs the electric signal to the band-pass filter 97-2.

The band-pass filter 97-1 detects a low frequency signal $f_0$ from a signal for which polarization demultiplexing and photo-electric conversion processing has been performed by the polarized wave demultiplexing element 83 and the optical receiver 96-1, respectively. The band-pass filter 97-2 detects a low frequency signal $f_0$ from another signal for which polarization demultiplexing and photo-electric conversion processing has been performed by the polarized wave demultiplexing element 83 and the optical receiver 96-2, respectively. Accordingly, the band-pass filters 97-1 and 97-2 described above function as low frequency signal detection elements.

The phase detection and bias supply circuit 98-1 applies to the optical switch 92-1 a bias voltage corresponding to the difference between the phase of the low frequency signal $f_0$ from the low frequency oscillator 93-1 and the phase of the low frequency signal $f_0$ detected by the band-pass filter 97-1.

Similarly, the phase detection and bias supply circuit 98-2 applies to the optical switch 92-2 another bias voltage corresponding to the difference between the phase of the low frequency signal $f_0$ from the low frequency oscillator 93-2 and the phase of the low frequency signal $f_0$ detected by the band-pass filter 97-2.

In other words, while the phase detection and bias supply circuits 98-1 and 98-2 described above function as bias voltage supply elements, each of them particularly has such a construction as shown in FIG. 5 similarly to that (refer to reference numeral 28) in the optical time division demultiplexing apparatus of the first embodiment described hereinabove.

Accordingly, the low frequency oscillators 93-1 and 93-2, driving circuits 94-1 and 94-2, band-pass filters 97-1 and 97-2 and phase detection and bias supply circuits 98-1 and 98-2 provided corresponding to the optical switches 92-1 and 92-2 described above, respectively, form an operating point stabilization control circuit which superposes predetermined low frequency signals $f_0$ set in advance on clock signals for optical time division demultiplexing processing to be supplied to the optical switches 92-1 and 92-2, respectively, and controls the clock signals to be supplied to the optical switches 92-1 and 92-2 based on phase differences between the low frequency signal components $f_0$ of an optical signal after time division demultiplexing processing by the optical switches 92-1 and 92-2 and components of the low frequency signals $f_0$ from the low frequency oscillators 93-1 and 93-2 so that the operating points of the optical switches 92-1 and 92-2 on their operation characteristics may be fixed positions.

In the optical time division demultiplexing apparatus according to the ninth embodiment of the present invention having the construction described above, the polarized wave demultiplexing element 91 demultiplexes and outputs two polarized wave components (TE wave and TM wave) of an inputted received optical signal (optical time division multiplex signal).

The optical switches 92-1 and 92-2 perform optical time division demultiplexing processing similar to that in the optical time division demultiplexing apparatus of the embodiments described above for two optical time division multiplex signals (TE wave and TM wave) polarization demultiplexed by the polarized wave demultiplexing element 91 based on clock signals generated by the clock signal generation elements 21-1 and 21-2, respectively, and then, they are combined by the optical combining element 99.

The optical signal combined by the optical combining element 99 is inputted to the polarized wave demultiplexing element 83 via the light branching element 95 and demultiplexed into two polarized wave components again by the polarized wave demultiplexing element 83. Further, the two optical signals (TE wave and TM wave) obtained as two separated polarized wave components are converted into electric signals by the optical receivers 96-1 and 96-2 and outputted to the band-pass filters 97-1 and 97-2, respectively.

The band-pass filter 97-1 detects a component of the frequency $f_0$ included in an output optical signal from the optical receiver 96-1. If a component of the low frequency signal $f_0$ is detected by the band-pass filter 97-1, then this signifies that an operating point drift occurs with the optical switch 92-1.

In this instance, the phase detection and bias supply circuit 98-1 performs phase comparison between the low frequency signal $f_0$ from the band-pass filter 97-1 and the low frequency signal $f_0$ from the low frequency oscillator 93-1 to drift the operating point drift.

Further, the phase detection and bias supply circuit 98-1 produces a dc bias voltage based on the amount of the operating point drift and outputs the dc bias voltage in a superposing relationship on a clock signal from the driving circuit 94-1 to the optical switch 92-1.

Similarly, the band-pass filter 97-2 detects a component of the low frequency signal $f_0$ included in an output optical signal from the optical receiver 96-2. If a component of the low frequency signal $f_0$ is detected by the band-pass filter 97-2, then this signifies that an operating point drift occurs with the optical switch 92-2.

Also in this instance, the phase detection and bias supply circuit 98-2 performs phase comparison between the low frequency signal $f_0$ from the band-pass filter 97-2 and the low frequency signal $f_0$ from the low frequency oscillator 93-2 to detect the operating point drift.

Further, the phase detection and bias supply circuit 98-2 produces a dc bias voltage based on the amount of the operating point drift and outputs the dc bias voltage in a superposing relationship on a clock signal from the driving circuit 94-2 to the optical switch 92-2.

Consequently, the dc bias voltages are added to the clock signals as driving signals in response to the detected operating point drifts and resulting signals are applied to the optical switches 92-1 and 92-2 to control the optical switches 92-1 and 92-2 so that the operating points of the optical switches 92-1 and 92-2 on their operation characteristics may be fixed positions.

In this manner, also with the optical time division demultiplexing apparatus according to the ninth embodiment of the present invention, since it includes the clock signal generation elements 21-1 and 21-2, polarized wave demultiplexing element 91, optical switches 92-1 and 92-2 and optical combining element 99 and predetermined low frequency signals $f_0$ set in advance are superposed on clock signals for optical time division demultiplexing processing to be supplied to the optical switches 92-1 and 92-2 while the clock signals to be supplied to the optical switches 92-1 and 92-2 can be controlled based on the phase differences between the low frequency signals $f_0$ of an optical signal after time division demultiplexing processing by the optical switches 92-1 and 92-1 and components of the low frequency signals $f_0$ from the low frequency oscillators 93-1 and 93-2 so that the operating points of the optical switches 92-1 and 92-2 on their operation characteristics may be fixed positions, the optical time division demultiplexing apparatus can be constructed as an apparatus of the polarized wave non-dependent type. Further, since components of feedback systems for allowing operating point compensation to be performed by the optical switches 92-1 and 92-2 can be used commonly, the number of branching operations for light can be reduced, and consequently, the optical time division demultiplexing apparatus is advantageous also in that reduction in size of the circuit and reduction of the cost required to construct the apparatus can be achieved.

Figure 20:
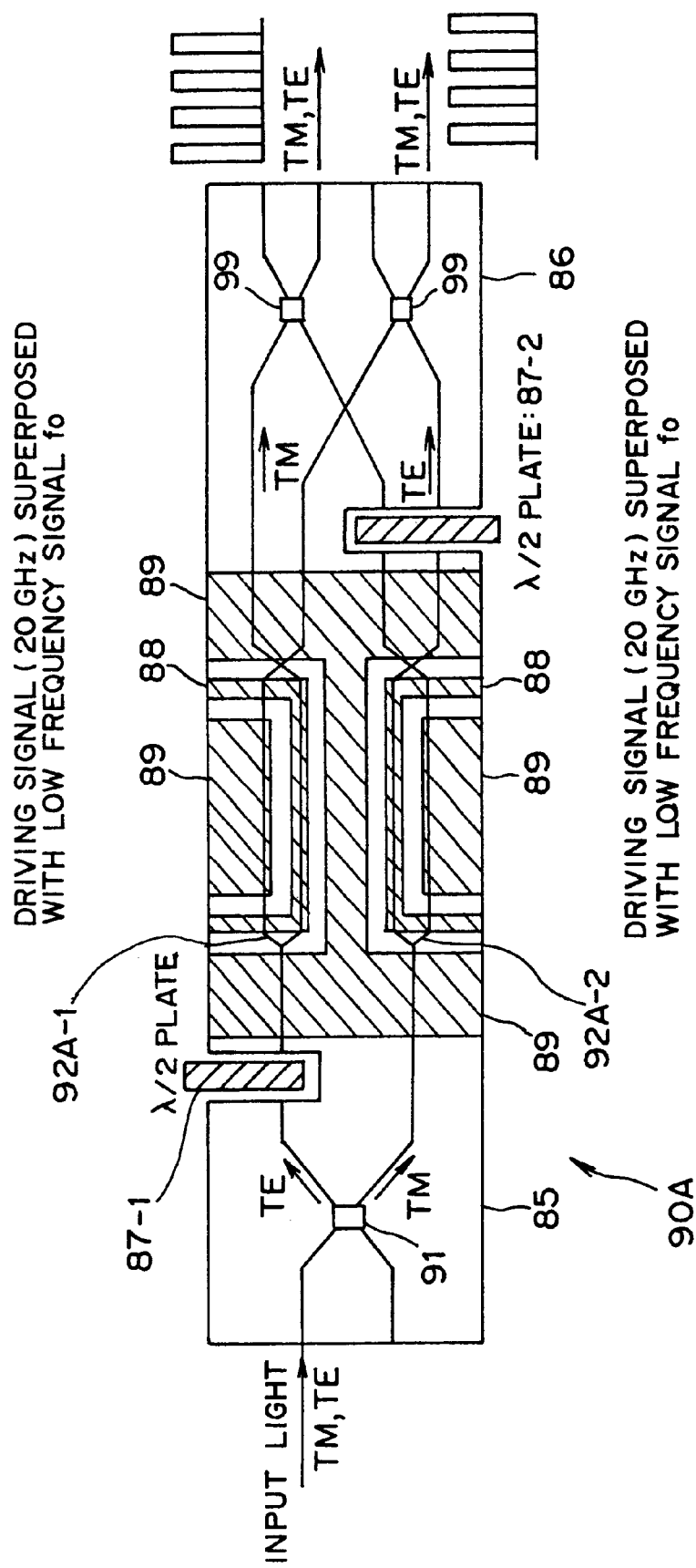
FIG. 20 is a diagram showing a modification to the optical time division demultiplexing apparatus of FIG. 19.

It is to be noted that, while, in the ninth embodiment described above, an optical time division demultiplexing apparatus of the polarized light non-dependent type is constructed using a 1×1 Mach-Zehnder optical switch, the switch to be used is not limited to this, and, for example, as shown in FIG. 20, a 1×2 Mach-Zehnder optical switch can be used. Also this naturally achieves advantages similar to those of the optical time division demultiplexing apparatus of the ninth embodiment described above.

In the time division demultiplexing apparatus 90A shown in FIG. 20, two optical switches 92A-1 and 92A-2 are formed on a waveguide substrate, and polarizing splitters 85 and 86 are formed forwardly and rearwardly (on the input and output sides) of the optical switches 92A-1 and 92A-2 on the waveguide substrate. Further, clock signal generation elements, low frequency oscillators, driving circuits, a light branching element, polarized wave demultiplexing elements, optical receivers, band-pass filters and phase detection and bias supply circuits (not shown in FIG. 20) similar to those in the optical time division demultiplexing apparatus of the ninth embodiment described above.

The polarizing splitter 85 includes a polarized wave demultiplexing element 91 having a function similar to that described hereinabove with reference to FIG. 19, and a wavelength plate ($\lambda/2$ plate) 87-1 for converting one of two polarized wave demultiplexed light beams (a TE wave) into TM light is interposed in a stage preceding to the optical switch 92A-1.

Meanwhile, the polarizing plate 86 includes, similarly as in the optical time division demultiplexing apparatus of the ninth embodiment described above, two optical combining elements 99 for combining output light beams of the optical switches 92A-1 and 92A-2, and a wavelength plate ($\lambda/2$ plate) 87-2 for converting two output light beams from the optical switch 92A-2 from TM light into TE light is interposed in a stage preceding to the optical combining element 99. It is to be noted that two mutually complementary signals are outputted from the two optical combining elements 99.

In FIG. 20, reference numeral 88 denotes a signal electrode, and 89 a ground electrode.

In the optical time division demultiplexing apparatus described above with reference to FIG. 20, predetermined low frequency signals $f_0$ set in advance can be superposed on clock signals (for example, 20 GHz) for optical time division demultiplexing processing to be supplied to the signal electrodes 88 of the optical switches 92A-1 and 92A-2 by means of low frequency oscillators not shown while the clock signals to be supplied to the optical switches 92A-1 and 92A-2 can be controlled based on the phase differences between the low frequency signals $f_0$ of optical signals after optical time division demultiplexing processing by the optical switches 92A-1 and 92A-2 and components of the low frequency signals $f_0$ from the low frequency oscillators described above so that the operating points of the optical switches 92A-1 and 92A-2 on their operation characteristics may be fixed positions.

It is to be noted that, in this instance, one of the totalling four output optical signals from the two optical combining elements 99 can be used commonly for operating point stabilization control for the optical switches 92A-1 and 92A-2 and the operating point stabilization control for the two parallel optical switches 92A-1 and 92A-2 can be performed simultaneously.

k. Tenth Embodiment

Figure 21:
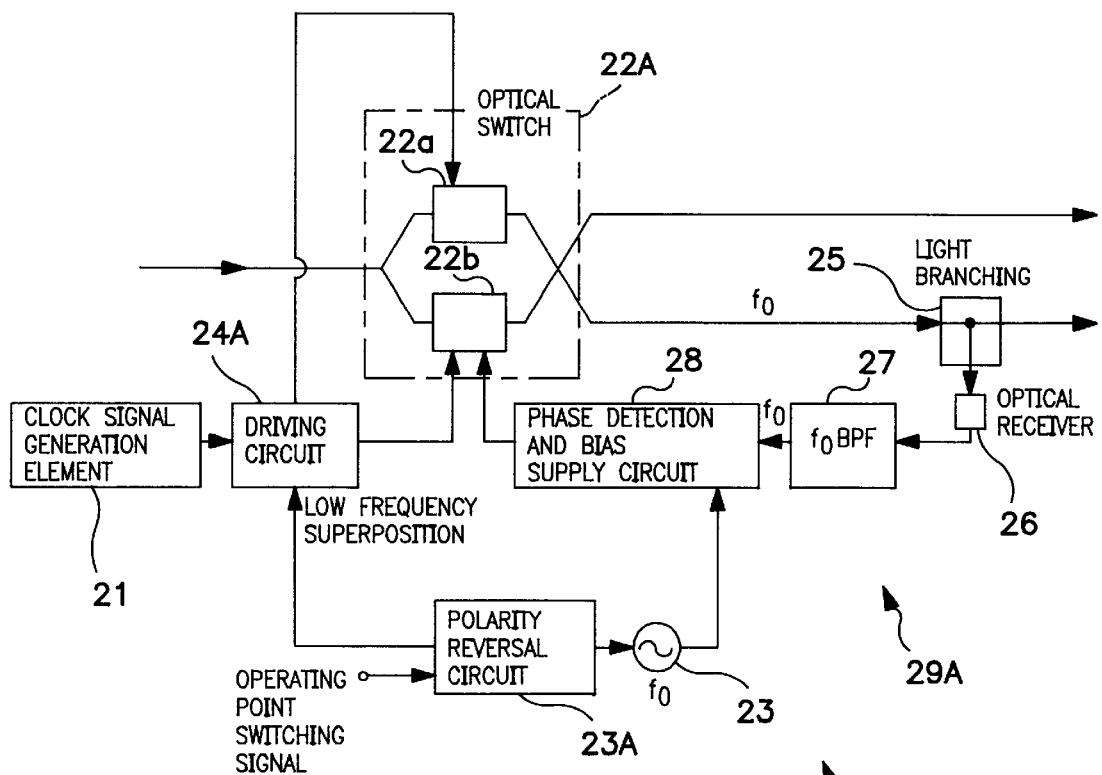
FIG. 21 is a block diagram showing an optical time division demultiplexing apparatus according to a tenth embodiment of the present invention.

FIG. 21 is a block diagram showing an optical time division demultiplexing apparatus according to a tenth preferred embodiment of the present invention. Also the optical time division demultiplexing apparatus 20B shown in FIG. 21 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 20B according to the tenth embodiment is different from the optical time division demultiplexing apparatus of the third embodiment described above in that it additionally includes a polarity reversal circuit 23A serving as an extraction bit train switching element for switching a bit train to be extracted after time division demultiplexing is performed by an optical switch, but is basically similar in the other construction.

In other words, while, in the optical time division demultiplexing apparatus according to the embodiments described above, the bit train to be extracted is fixed depending upon the output position, in the optical time division demultiplexing apparatus 20B according to the tenth embodiment, a function of changing the bit train to be extracted is additionally provided. It is to be noted that, in FIG. 21, like reference symbols to those of FIG. 8 denote like elements.

By the way, also with the optical time division demultiplexing apparatus 20B shown in FIG. 21, if it is disposed at the position of the optical demultiplexer 115 described hereinabove with reference to FIG. 36, then an optical receiver can be formed from such optical time division demultiplexing apparatus 20B and the identification elements 116 and 117.

The polarity reversal circuit 23A receives an operating point switching signal inputted from the outside when the bit train to be identified (extracted) by each of the identification elements 116 and 117 is to be switched to the other bit train, and shifts the operating point of the optical switch 22A on its operation characteristic by one half period.

Figure 39:
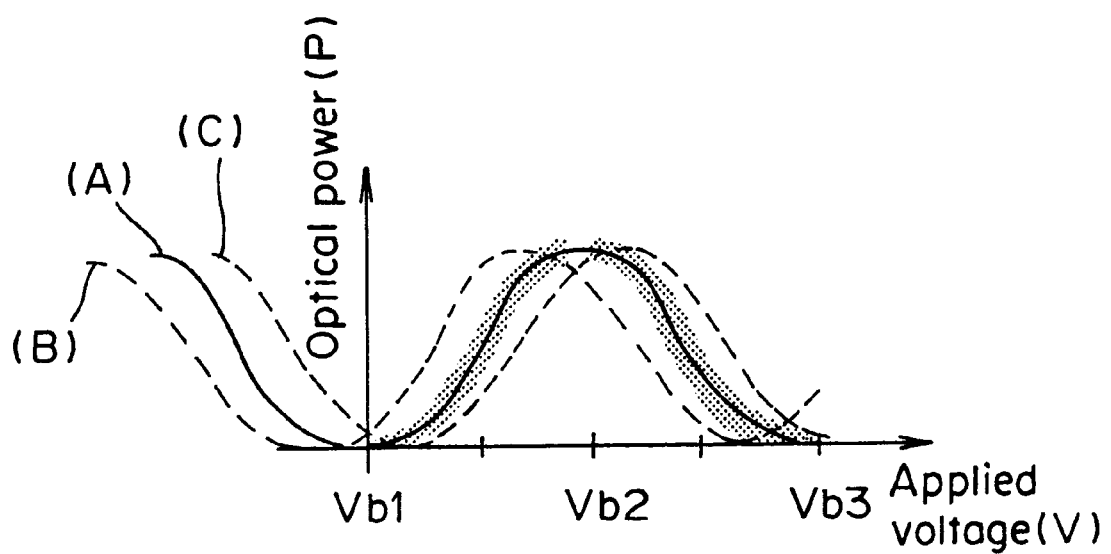
FIG. 39 is a diagram illustrating an optical output characteristic of a Mach-Zehnder optical switch with respect to a driving voltage.

In particular, the polarity reversal circuit 23A switches the operating point (Vb) of the optical switch 22A on its optical output characteristic curve described hereinabove with reference to FIG. 39 between a region from Vb1 to Vb2 and another region from Vb2 to Vb3 (reverses the polarity of the operating point (Vb)) to switch the bit train to be extracted by the optical demultiplexer.

In the optical time division demultiplexing apparatus 20B according to the tenth embodiment of the present invention having the construction described above, optical time division demultiplexing processing and operating point stabilization controlling operations for an inputted optical time division multiplex signal are performed in a similar manner as in the optical time division demultiplexing apparatus of the third embodiment described hereinabove.

Here, the polarity reversal circuit 23A reverses the polarity of the low frequency signal $f_0$ to be provided from the low frequency oscillator 23 to the driving circuit 24A when an operating point switching signal is inputted from the outside.

Consequently, the phase of a low frequency component included in an optical signal branched by the optical switch 22A is displaced by one half period. As a result, the output of the low frequency signal $f_0$ detected by the band-pass filter 27 is reversed, and the operating point (Vb) on the optical output characteristic curve is stabilized at a point shifted by one half period (refer to FIG. 39).

In this manner, the optical time division demultiplexing apparatus according to the tenth embodiment has advantages similar to those of the optical time division demultiplexing apparatus of the third embodiment described above since it includes the polarity reversal circuit 23A serving as an extraction bit train switching element for switching the bit train to be extracted after time division demultiplexing is performed by the optical switch 22A. Further, since the bit train to be extracted after time division demultiplexing processing can be switched arbitrarily, the optical time division demultiplexing apparatus is advantageous also in that reception setting can be performed in accordance with a requirement of a receiver of the optical signal.

It is to be noted that, while, in the optical time division demultiplexing apparatus of the tenth embodiment described above, the polarity reversal circuit 23A described above is interposed between the low frequency oscillator 23 and the driving circuit 24 and reverses the polarity of the low frequency signal $f_0$ to be outputted from the low frequency oscillator 23 to the driving circuit 24, the interposition position of the polarity reversal circuit 23A is not limited to this. For example, the polarity reversal circuit 23A may be interposed between the low frequency oscillator 23 and the phase detection and bias supply circuit 28 so that it reverses the low frequency signal $f_0$ as a phase comparison criterion of the phase detection and bias supply circuit 28, or may be interposed between the optical receiver 26 and the band-pass filter 27 so that the low frequency signal $f_0$ from the optical receiver 26 to be outputted to the band-pass filter 27 is reversed by the same, thereby reversing the polarity of the feedback control.

Further, while, in the optical time division demultiplexing apparatus of the tenth embodiment described above, the polarity reversal circuit 23A for reversing a low frequency signal component is used as the extraction bit train switching element, such a function element that reverses a dc bias voltage from the phase detection and bias supply circuit 28 by means of a suitable circuit may be additionally provided as the extraction bit train switching element.

Further, while the optical time division demultiplexing apparatus of the tenth embodiment described above is described in detail in regard to a case wherein a function of switching the extraction bit train is added to the optical time division demultiplexing apparatus of the third embodiment described above, the optical time division demultiplexing apparatus to which the function is added is not limited to this, and the function can be applied to any of the optical time division demultiplexing apparatus of the embodiments described above.

l. Eleventh Embodiment

Figure 22:
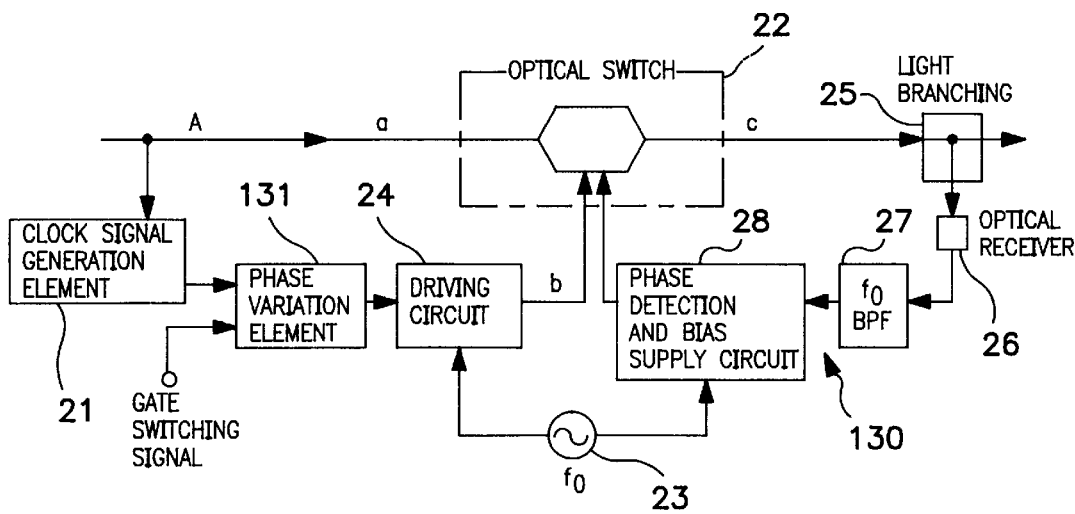
FIG. 22 is a block diagram showing an optical time division demultiplexing apparatus according to an eleventh embodiment of the present invention.

FIG. 22 is a block diagram showing an optical time division demultiplexing apparatus according to an eleventh preferred embodiment of the present invention. Also the optical time division demultiplexing apparatus 130 shown in FIG. 22 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 130 according to the eleventh embodiment is principally different from the optical time division demultiplexing apparatus of the first embodiment described above in that it additionally includes a phase variation element 131 interposed between the clock signal generation element 21 and the driving circuit 24 and serving as an extraction bit train switching element for switching a bit train to be extracted after time division demultiplexing is performed by the optical switch 22. It is to be noted that, in FIG. 22, like reference symbols to those of FIG. 4 denote like elements and overlapping detailed description of them is omitted here.

The phase variation element 131 mentioned above receives a gate switching signal inputted thereto from the outside, delays a clock signal from the clock signal generation element 21 by one half period and outputs the delayed clock signal to the driving circuit 24. The driving circuit 24 produces and supplies a driving signal to the optical switch 22 based on a reversed clock signal from the phase variation element 131.

Accordingly, the phase variation element 131 described above has a function as a clock variation element which varies a component of a clock signal from the clock signal generation element 21 and outputs a resulting signal to the optical switch 22 via the driving circuit 24.

It is to be noted that, in the optical time division demultiplexing apparatus 130 according to the eleventh embodiment, the driving circuit 24 and the phase detection and bias supply circuit 28 supply a driving signal and a dc bias voltage to only one of the two electrodes of the optical switch 22.

In the optical time division demultiplexing apparatus 130 according to the eleventh embodiment of the present invention having the construction described above, optical time division demultiplexing processing and operating point stabilization controlling operations for an inputted optical time division multiplex signal are performed in a similar manner as in the optical time division demultiplexing apparatus of the first embodiment described hereinabove.

Figure 23:
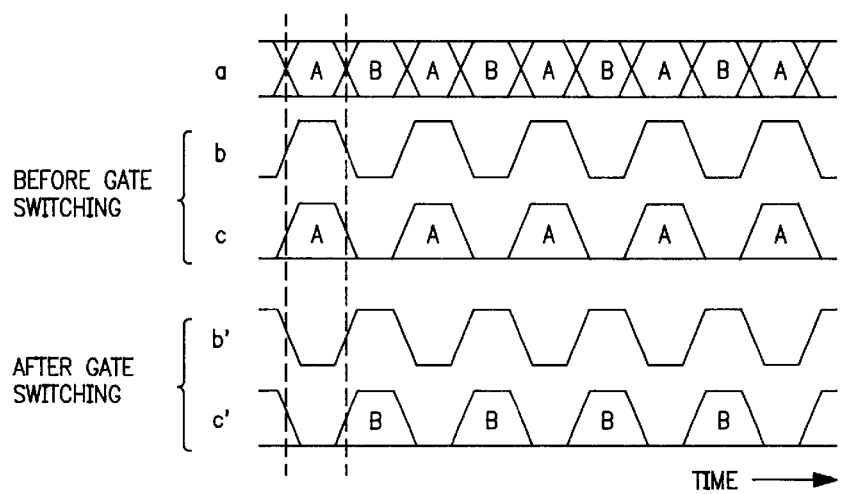
FIG. 23 is a time chart illustrating operation of the time division demultiplexing apparatus of FIG. 22.

In particular, as seen in FIG. 23, if an optical time division multiplex signal a composed of bit trains "A" and "B" optically time division multiplexed with each other is received, then the optical switch 22 performs time division demultiplexing processing based on a clock signal b from the driving circuit 24 and outputs a resulting signal as an extracted demultiplexed signal c of the bit train "A" (in this situation, no gate switching signal is inputted to the phase variation element 131 from the outside).

Then, if the phase variation element 131 receives a gate switching signal for switching the bit train to be extracted from the outside, then it delays a clock signal from the clock signal generation element 21 by one half period and outputs the delayed clock signal to the driving circuit 24. Consequently, the clock signal b' supplied from the driving circuit 24 to the optical switch 22 is delayed by one half period with respect to that before the gate switching signal is inputted.

Consequently, the optical switch 22 performs time division demultiplexing processing based on the clock signal b' from the driving circuit 24 and switches the bit train to be extracted to the bit train "B" so that it outputs the bit train "B".

In this manner, the optical time division demultiplexing apparatus 130 according to the eleventh embodiment of the present invention has similar advantages to those of the optical time division demultiplexing apparatus of the first embodiment described hereinabove since it includes the phase variation element 131 as an extraction bit train switching element which switches the bit train to be extracted after time division demultiplexing is performed by the optical switch 22. Further, the optical time division demultiplexing apparatus 130 is advantageous also in that, since the bit train to be extracted after time division demultiplexing processing is performed can be switched arbitrarily, reception setting can be performed in accordance with a requirement of a receiver of the optical signal.

It is to be noted that, while the phase variation element 131 in the optical time division demultiplexing apparatus of the eleventh embodiment described above delays a clock signal from the clock signal generation element 21 by one half period, the delaying of the clock signal is not limited to this, and the clock signal from the clock signal generation element 21 may be reversed. Also in this instance, similar effects and advantages to those described hereinabove can be obtained.

In this instance, in place of the phase variation element 131 described above, as a function element which can reverse the clock signal from the clock signal generation element 21, a polarity reversal circuit which reverses the length of the electric path from the clock signal generation element 21 based on a gate signal similar to that of the phase variation element 131 described above is interposed between the clock signal generation element 21 and the driving circuit 24.

Further, while the optical time division demultiplexing apparatus of the eleventh embodiment described above is described in detail as an apparatus wherein a function of varying the clock signal to be supplied to an optical switch to switch the extraction bit train is added to the optical time division demultiplexing apparatus of the first embodiment described above, the apparatus to which the function can be added is not limited to this, and the function can be applied to the optical time division demultiplexing apparatus according to any of the embodiments described above.

m. Twelfth Embodiment

Figure 24:
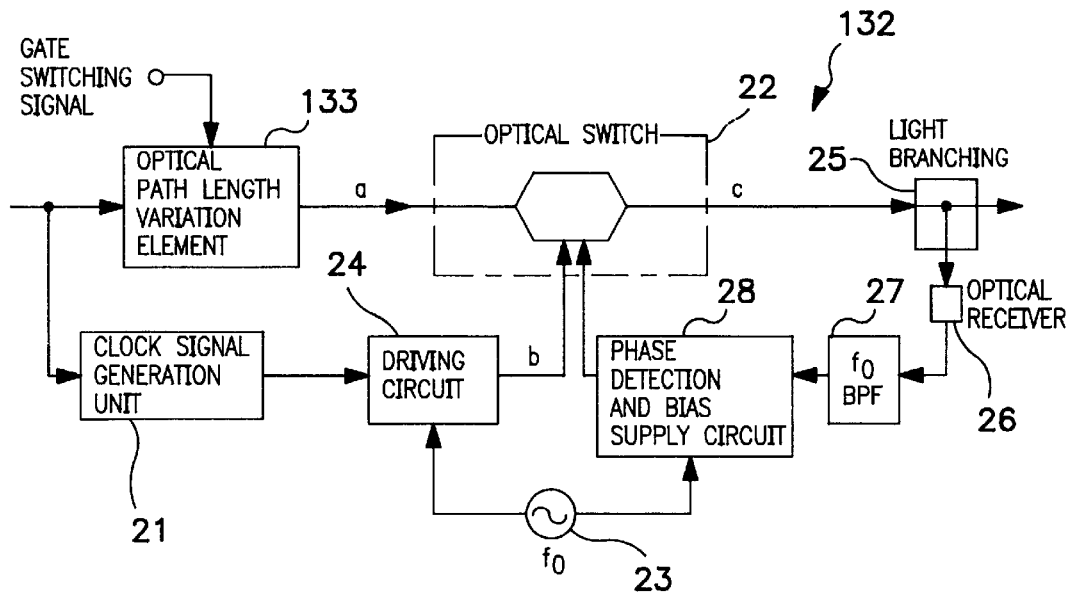
FIG. 24 is a block diagram showing an optical time division demultiplexing apparatus according to a twelfth embodiment of the present invention.

FIG. 24 is a block diagram showing an optical time division demultiplexing apparatus according to a twelfth preferred embodiment of the present invention. Also the optical time division demultiplexing apparatus 132 shown in FIG. 24 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 132 according to the twelfth embodiment is different from the optical time division demultiplexing apparatus of the eleventh embodiment described above in that it includes an optical path length variation element 133 serving as an extraction bit train switching element and also in a manner in which the bit train to be extracted after time division multiplexing is performed by the optical switch 22 is switched. It is to be noted that, in FIG. 24, like reference symbols to those of FIG. 22 denote like elements and overlapping detailed description of them is omitted here.

The optical path length variation element (optical path length change-over switch) 133 is interposed in a stage prior to the optical switch 22 and receives a gate switching signal inputted from the outside to switch the optical path to such an optical path with which the optical path length for the input optical signal can be varied by one time slot.

In the optical time division demultiplexing apparatus 132 according to the twelfth embodiment of the present invention having the construction described above, similarly as in the optical time division demultiplexing apparatus of the eleventh embodiment described above, optical time division demultiplexing processing and operating point stabilization controlling operations for an inputted optical time division multiplex signal are performed.

Figure 25:
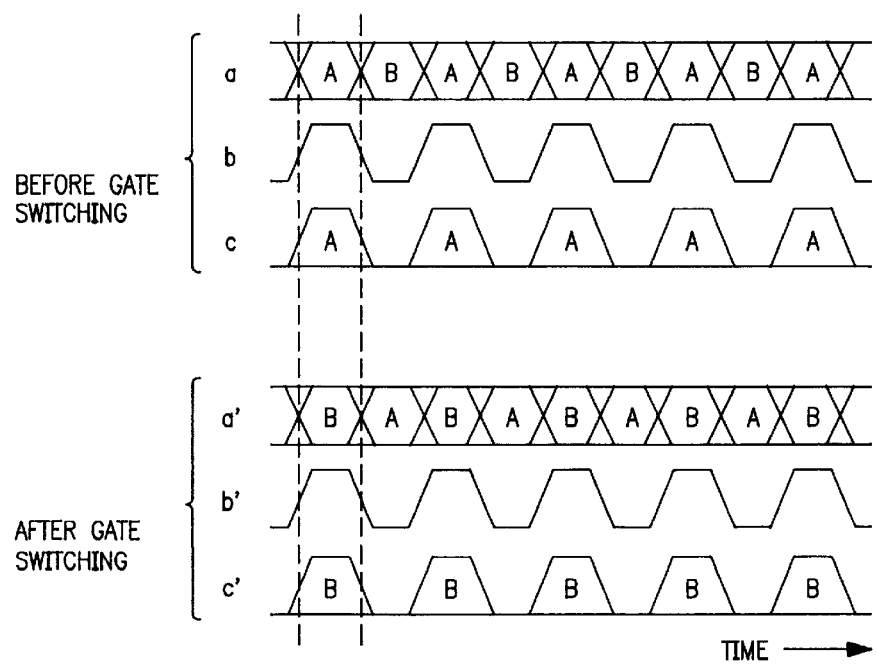
FIG. 25 is a time chart illustrating operation of the time division demultiplexing apparatus of FIG. 24.

In particular, if an optical time division multiplex signal a formed from bit trains "A" and "B" optically time division multiplexed with each other as shown in FIG. 25 is received, then the optical switch 22 performs time division demultiplexing processing based on a clock signal b from the driving circuit 24 and outputs a resulting signal as an extracted demultiplexed signal c of the bit train "A" (in this situation, no gate switching signal is inputted from the outside to the phase variation element 131).

Here, if the optical path length variation element 133 receives a gate switching signal for switching the bit train to be extracted from the outside, then it varies the inputted optical time division multiplex signal by one time slot and outputs a resulting signal as an optical time division multiplex signal a' to the optical switch 22.

In this instance, the optical switch 22 can perform time division demultiplexing processing to switch the bit train c' to be extracted from the bit train "A" to the bit train "B" without varying the clock signal b to be supplied from the driving circuit 24 to the optical switch 22.

In this manner, the optical time division demultiplexing apparatus 132 according to the twelfth embodiment of the present invention has advantages similar to those of the optical time division demultiplexing apparatus of the eleventh embodiment since it includes the optical path length variation element 133 serving as an extraction bit train switching element which switches the bit train to be extracted after time division demultiplexing is performed by the optical switch 22.

It is to be noted that such a function which switches the extraction bit train by varying the optical path length as described in detail in connection with the optical time division demultiplexing apparatus of the twelfth embodiment described above can be applied to the optical time division demultiplexing apparatus of the embodiments described above.

n. Thirteenth Embodiment

Figure 26:
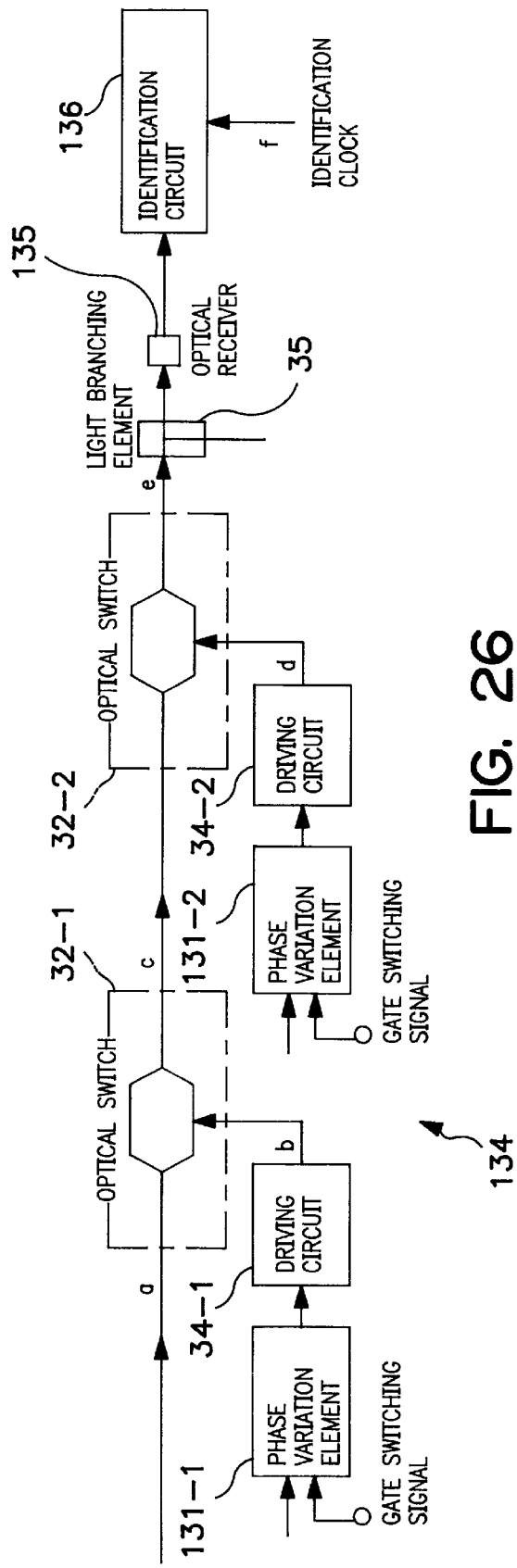
FIG. 26 is a block diagram showing an optical time division demultiplexing apparatus according to a thirteenth embodiment of the present invention.

FIG. 26 is a block diagram showing an optical time division demultiplexing apparatus according to a thirteenth preferred embodiment of the present invention. Also the optical time division demultiplexing apparatus 134 shown in FIG. 26 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 134 according to the thirteenth embodiment is different from the optical time division demultiplexing apparatus of the fourth embodiment described above in that it includes a pair of phase variation elements 131-1 and 131-2 interposed between the clock signal generation element 21 and the driving circuit 34-2 and serving as extraction bit train switching elements for switching bit trains to be extracted after time division demultiplexing is performed by the optical switch 22. The other construction of the optical time division demultiplexing apparatus 134 is basically similar to that of the optical time division demultiplexing apparatus of the fourth embodiment.

It is to be noted that FIG. 26 shows the optical time division demultiplexing apparatus 134 according to the thirteenth embodiment taking notice of a function element which switches the extraction bit train, and function elements (refer to reference symbols 33-1, 33-2, 36, 37-1, 37-2, 38-1 and 38-2) for operating point stabilization control other than the clock signal generation element 21, optical switches 32-1 and 32-2, and driving circuits 34-1 and 34-2 are omitted in FIG. 26.

Further, the optical time division demultiplexing apparatus 134 according to the thirteenth embodiment includes an optical receiver 135 which receives an optical signal branched by the light branching element 35 and converts the optical signal into an electric signal, and an identification circuit 136 for identifying data from an electric signal from the optical receiver 135 in response to an identification clock signal. It is to be noted that also the identification clock signal just mentioned is produced by extraction from a received optical signal, similarly to clock signals to be inputted to the driving circuits 34-1 and 34-2 described above.

The phase variation element 131-1 mentioned above receives a gate switching signal inputted thereto from the outside, reverses an inputted clock signal and outputs the reversed clock signal to the driving circuit 34-1.

Meanwhile, the phase variation element 131-2 receives a gate switching signal inputted thereto from the outside, reverses a clock signal inputted thereto and outputs the reversed clock signal to the driving circuit 34-2. Further, if the bit train to be optically time division demultiplexed and extracted by the optical switch 32-1 in a stage preceding to the optical switch 32-2 is switched, then the phase variation element 131-2 shifts, in synchronism with the switching timing, the phase of the clock signal to be inputted to the optical switch 32-2 by a desired amount (for example, an amount corresponding to one time slot; refer to time T of FIG. 27).

In particular, the driving circuit 34-1 produces and supplies a driving signal to the optical switch 32-1 based on a reversed clock signal from the phase variation element 131-1 while the driving circuit 34-2 produces and supplies another driving signal to the optical switch 32-2 based on a clock signal having a phase shifted by a desired amount by the phase variation element 131-2.

Consequently, if the phase variation element 131-1 reverses a clock signal to the driving circuit 34-1 to switch the bit train to be optically time division demultiplexed and extracted by the optical switch 32-1, then the phase variation element 131-2 shifts the phase of the clock signal to be supplied to the optical switch 32-2 by a desired amount so that the center of the gate of the optical switch 32-2 may be the center of a bit of an optical time division demultiplexed signal from the optical switch 32-1.

In other words, if a gate switching signal is inputted to the phase variation element 131-1 described above, then the phase variation element 131-2 shifts the phase of a clock signal inputted thereto by a desired amount in synchronism with the gate switching signal so that the gate center of the optical switch 32-2 may be the bit center of the optical time division demultiplexed signal from the optical switch 32-1 in the preceding stage.

Accordingly, the phase variation elements 131-1 and 131-2 described above have a function as clock variation elements which vary components of clock signals from the clock signal generation element (not shown) and output resulting signals to the optical switches 32-1 and 32-2 via the driving circuits 34-1 and 34-2, respectively.

Further, also the phase of the identification clock signal for the identification circuit 136 is shifted, if the optical signals to be time division demultiplexed by the optical switches 32-1 and 32-2 are switched, by a desired amount in synchronism with the switching timing of the optical signals to be time division demultiplexed described above.

In the optical time division demultiplexing apparatus 134 according to the thirteenth embodiment of the present invention having the construction described above, similarly as in the optical time division demultiplexing apparatus of the fourth embodiment described hereinabove (refer to reference numeral 31), optical time division demultiplexing and operating point stabilization controlling operations for an inputted optical time division multiplex signal are performed.

In particular, the optical switch 32-1 modulates, as seen in FIG. 27, an optical time division multiplex signal a as an inputted received optical signal with a clock signal b (on which a dc bias voltage for operating point stabilization is superposed) for optical time division demultiplexing processing generated by the driving circuit 34-1 described above, and outputs a resulting signal as a demultiplexed signal c.

Similarly, the optical switch 32-2 modulates, as seen in FIG. 27, the output signal c of the optical switch 32-1 with a clock signal d (on which a dc bias voltage for operating point stabilization is superposed) for optical time division demultiplexing processing generated by the driving circuit 34-2 described above, and outputs a resulting signal as a decomposed signal e.

Data of the signal e for which the time division demultiplexing processing has been performed in this manner are identified in response to an identification clock signal f by the identification circuit 136.

Here, if the phase variation element 131-1 receives a gate switching signal for switching the bit train to be extracted from the outside, then it reverses, as seen in FIG. 28, a clock signal from the clock signal generation element not shown and outputs a resulting clock signal to the driving circuit 34-1. Consequently, the clock signal b' supplied from the driving circuit 34-1 to the optical switch 32-1 is in a reversed state from that before the gate switching signal is inputted.

Consequently, the optical switch 32-1 performs time division demultiplexing processing based on the clock signal b' from the driving circuit 24 to switch the bit train to be extracted and outputs a resulting signal as a demultiplexed signal c'.

The phase variation element 131-2 shifts the phase of the clock signal from the clock signal generation element by a desired amount so that the phase of the clock signal d' to be supplied from the driving circuit 34-2 to the optical switch 32-2 may be shifted by a time interval T from d (refer to FIG. 27) to d' (or in the opposite direction when necessary).

Consequently, since the phase of the clock signal inputted to the optical switch 32-2 is shifted in synchronism with a timing at which the bit train to be optically time division demultiplexed and extracted by the optical switch 32-1 is switched, when the optical switch 32-2 performs time division demultiplexing processing based on the clock signal d' from the driving circuit 34-2, the center of the gate of the optical switch 32-2 is prevented from being displaced from the center of a bit of the input signal and a desired decomposed signal e' can be extracted.

Further, if the optical signals to be time division demultiplexed by the optical switches 32-1 and 32-2 are switched, then also the phase of the identification clock signal for the identification circuit 136 in the following stage is shifted from f (refer to FIG. 27) to f' in synchronism with the switching timing of the optical signal to be time division demultiplexed described above.

Consequently, when switching of the bit train to be optically time division demultiplexed and extracted is performed, synchronism of the phase relationship between a signal and an identification clock signal after the optical time division demultiplexing processing is established.

In this manner, with the optical time division demultiplexing apparatus 134 according to the thirteenth embodiment of the present invention, since it includes the phase variation elements 131-1 and 131-2 as extraction bit switching elements for switching the bit trains to be extracted after time division multiplexing is performed by the optical switch 22, the bit trains to be extracted after time division demultiplexing processing can be switched arbitrarily. Consequently, the optical time division demultiplexing apparatus 134 is advantageous also in that reception setting can be performed in accordance with a requirement of a receiver of an optical signal.

Further, since, if the bit train to be optically time division demultiplexed and extracted by the optical switch 32-1 in the preceding stage is switched, then the phase of the clock signal to be inputted to the optical switch 32-2 in the following stage can be shifted by a desired amount in synchronism with the switching timing of the optical signal to be time division demultiplexed, the center of the gate of the optical switch 32-2 in the following stage can be prevented from being displaced from the center of a bit of the input signal. Consequently, the optical time division demultiplexing apparatus 134 is advantageous also in that a desired optical signal can be obtained efficiently with certainty.

Further, since, if the optical signals to be time division demultiplexed by the driving circuits 34-1 and 34-2 are switched, then the phase of the identification clock signal for the identification circuit 136 can be shifted by a desired amount in synchronism with the switching timing of the optical signal to be time division demultiplexed, when switching of the bit trains to be optically time division demultiplexed and extracted is performed, synchronism of the phase relationship between the signal and the identification clock signal after the optical time division demultiplexing processing can be established. Consequently, the optical time division demultiplexing apparatus 134 is advantageous in that desired bit trains can be identified efficiency and with certainty.

o. Fourteenth Embodiment

Figure 29:
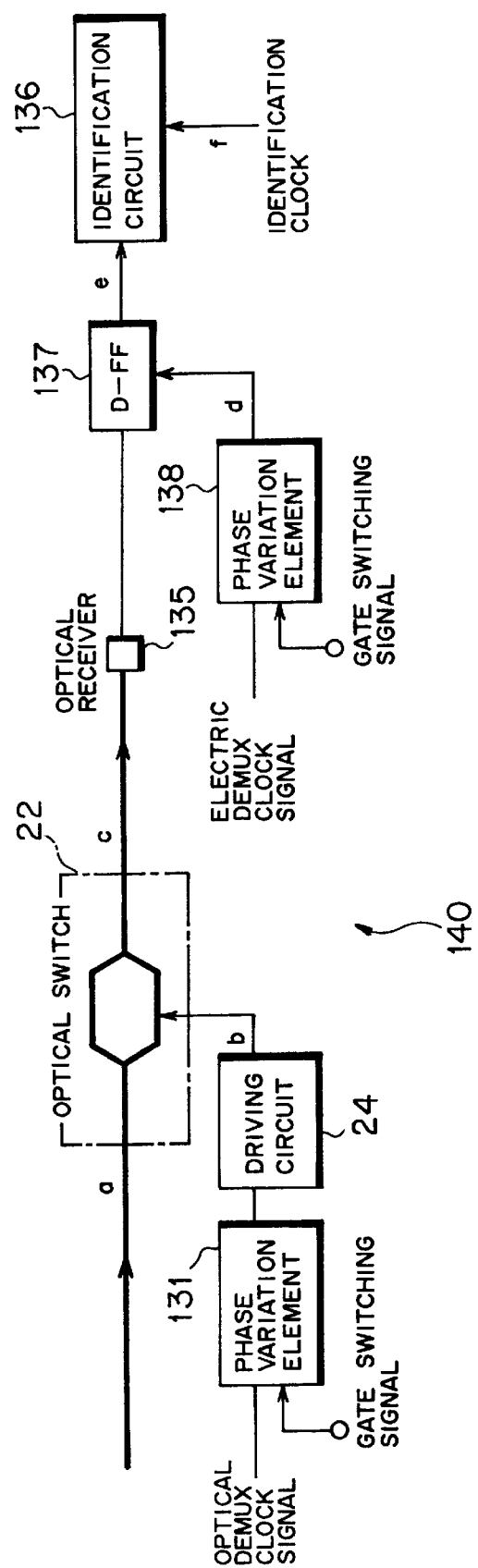
FIG. 29 is a block diagram showing an optical time division demultiplexing apparatus according to a fourteenth embodiment of the present invention.

FIG. 29 is a block diagram showing an optical time division demultiplexing apparatus according to a fourteenth preferred embodiment of the present invention. Also the optical time division demultiplexing apparatus 140 shown in FIG. 29 can be applied, similarly to the optical time division demultiplexing apparatus of the embodiments described above, to an optical receiver which performs optical time division demultiplexing for an optical time division multiplex signal from the optical transmitter 102 of such an optical time division multiplex transmission system as described hereinabove with reference to FIG. 32.

The optical time division demultiplexing apparatus 140 according to the fourteenth embodiment includes a function element for performing further electric time division demultiplexing processing in a stage following the optical time division demultiplexing apparatus of the eleventh embodiment described hereinabove.

Accordingly, the optical time division demultiplexing apparatus 140 according to the fourteenth embodiment includes a phase variation element 131 similar to that in the optical time division demultiplexing apparatus of the eleventh embodiment described above (refer to reference numeral 130).

It is to be noted that FIG. 29 shows the optical time division demultiplexing apparatus 140 according to the fourteenth embodiment paying attention to the function elements (refer to reference numerals 135 to 138) which perform the electric time division demultiplexing processing mentioned above together with the function elements for switching the extraction bit train when optical time division demultiplexing is to be performed, but does not show the other function elements (refer to reference numerals 23 and 26 to 28) for operating point stabilization control than the clock signal generation element 21, optical switch 22 and driving circuit 24.

The optical time division demultiplexing apparatus 140 includes, as the function elements for performing the electric time division demultiplexing processing (electric DEMUX) mentioned above, an optical receiver 135, a D-type flip-flop (D-FF) 137 and a phase variation element 138 as well as an identification circuit 136.

The optical receiver 135 receives an optical signal branched by the branching element 25 and converts the received optical signal into an electric signal. The D-type flip-flop 137 receives an electric demultiplexing clock signal as an input thereto via the phase variation element 138, and outputs data of the electric signal from the optical receiver 135 to perform electric time division demultiplexing processing for the signal from the optical receiver 135 using the received electric demultiplexing clock signal as a clock timing signal.

It is to be noted that also the electric demultiplexing clock signal mentioned above is extracted and produced from a received optical time division multiplex signal similarly to the clock signal (generated by a clock signal generation element not shown) for optical time division demultiplexing processing inputted thereto via the phase variation element 131.

The identification circuit 136 identifies data from the signal, for which electric demultiplexing processing has been performed by the D-type flip-flop 137, in response to an identification clock signal. It is to be noted that also the identification clock signal just mentioned is extracted and produced from a received optical signal similarly to the clock signals to be inputted to the driving circuit 24 and the phase variation element 138 described hereinabove.

The phase variation element 138 is provided, similarly to the phase variation element 131, to receive a gate switching signal inputted thereto from the outside, reverse a clock signal inputted thereto and output the reversed clock signal to the D-type flip-flop 137. Further, if the bit train to be optically time division demultiplexed and extracted by the optical switch 22 in a stage preceding to the D-type flip-flop 137, then the phase variation element 138 shifts, in synchronism with the switching timing, the phase of the electric demultiplexing clock signal to be inputted to the D-type flip-flop 137 by a desired amount (for example, an amount corresponding to one time slot; refer to the time T of FIG. 30).

In other words, if the bit train to be optical time division demultiplexed and extracted by the optical switch 22 is switched, then in synchronism with the switching timing of the bit train to be extracted, the phase of a clock signal to be used for electric time division demultiplexing by the D-type flip-flop 137 is shifted by a desired amount so that the identification position by the D-type flip-flop 137 may become coincident with the bit center of the optical time division demultiplexed signal from the optical switch 22 in the preceding stage.

Further, if the optical signal to be optically time division demultiplexed by the optical switch 22 is switched, then also the identification clock for the identification circuit 136 in the following stage is shifted by a desired amount in synchronism with the switching timing of the optical signal to be time division demultiplexed described above.

In the optical time division demultiplexing apparatus 140 according to the fourteenth embodiment of the present invention described above, similarly as in the optical time division demultiplexing apparatus of the eleventh embodiment (refer to reference numeral 130) described hereinabove, optical time division demultiplexing processing and operating point stabilization controlling operations for an inputted optical time division multiplex signal are performed. Besides, the D-type flip-flop 137 performs electric time division demultiplexing processing for a signal after the optical time division demultiplexing processing, and the identification circuit 136 identifies data from an output signal of the D-type flip-flop 137.

In particular, the optical switch 22 modulates an optical time division multiplex signal a as an inputted received optical signal with a clock signal b (on which a dc bias voltage for operating point stabilization is superposed) for optical time division demultiplexing processing generated by the driving circuit 24 described above, and outputs a resulting signal as a decomposed signal c.

Figure 30:
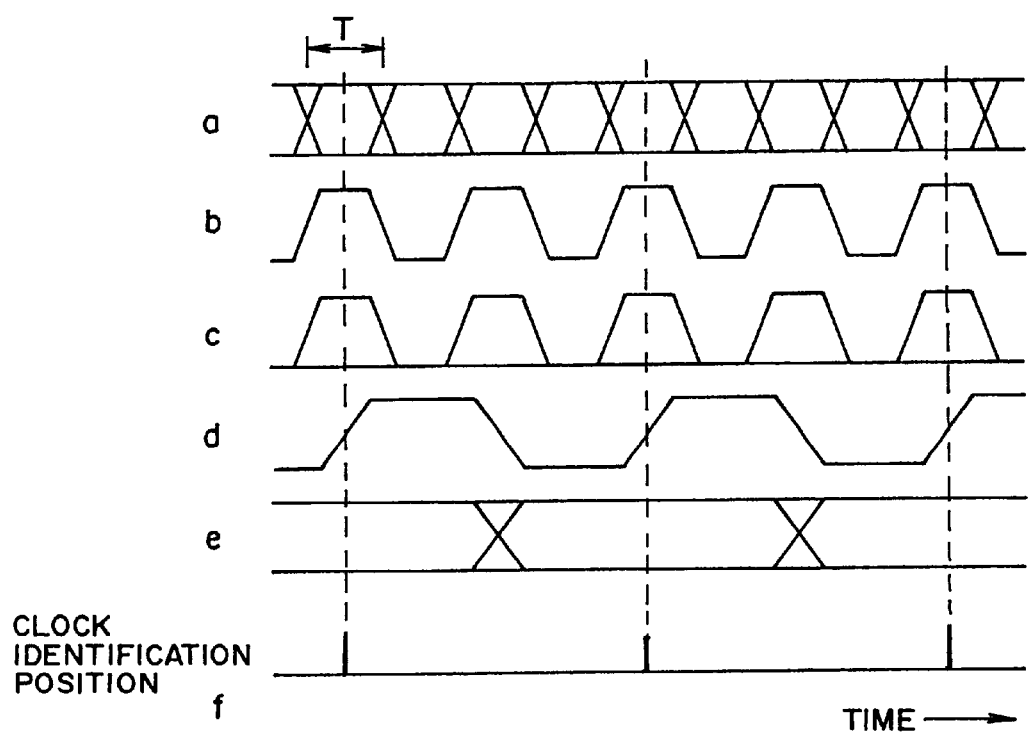
FIGS. 30 and 31 are time charts illustrating operation of the time division demultiplexing apparatus of FIG. 29.

As seen in FIG. 30, the output signal c of the optical switch 22 is converted into an electric signal by the optical receiver 135, and electric time division demultiplexing processing is performed for the electric signal by the D-type flip-flop 137.

In particular, the D-type flip-flop 137 receives a clock signal d for electric time division demultiplexing processing extracted from the received optical time division demultiplex signal via the phase variation element 138 and outputs an electric time division demultiplexed signal e. It is to be noted that, from the signal e for which the time division demultiplexing processing has been performed in this manner, data are identified in response to an identification clock signal f by the identification circuit 136.

Where the clock signal d inputted to the D-type flip-flop 137 has a frequency equal to one half that of the clock signal b for optical time division demultiplexing processing, if the D-type flip-flop 137 performs identification at the position of a rising (or falling) edge of the clock signal d, then a signal of a bit rate equal to one fourth that of the optical time division multiplex signal a such as the electric time division demultiplexed signal e is obtained.

Figure 31:
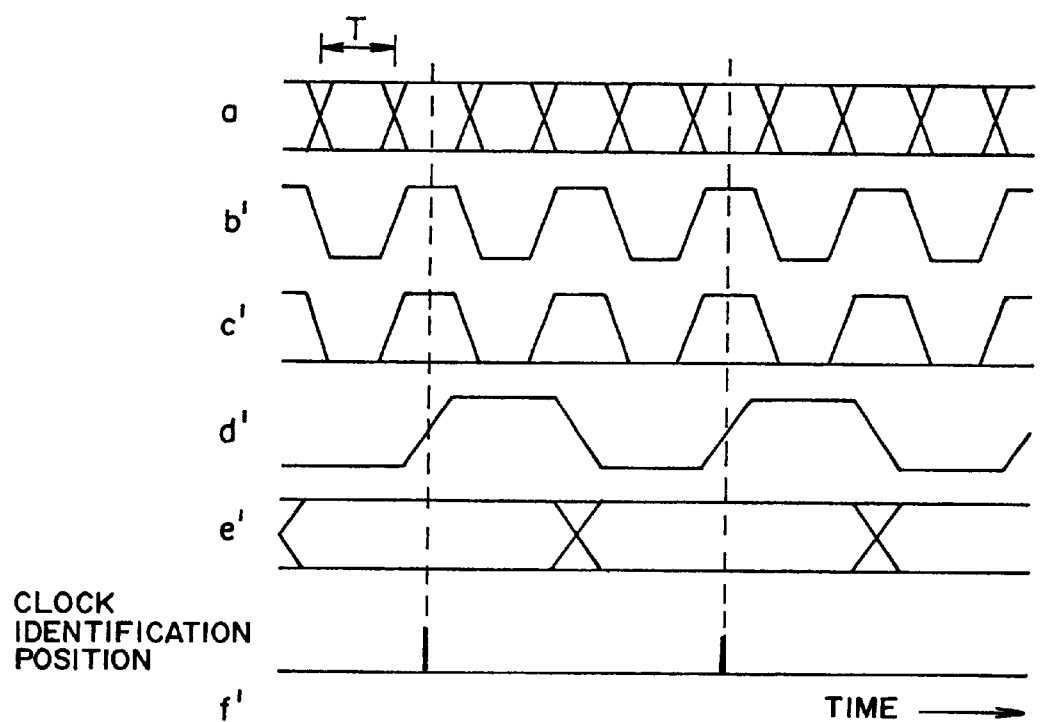

Here, if a gate switching signal for switching the bit train to be extracted is received from the outside, then the phase variation element 131 reverses a clock signal from the clock signal generation element not shown and outputs the reversed clock signal to the driving circuit 24 as seen in FIG. 31. Consequently, the clock signal b' supplied from the driving circuit 24 to the optical switch 22 is reversed comparing with that before the gate switching signal is inputted.

Consequently, the optical switch 22 performs time division demultiplexing processing based on the clock signal b' from the driving circuit 24 to switch the bit train to be extracted and outputs a resulting signal as a decomposed signal c'.

Meanwhile, the phase variation element 138 shifts the phase of the electric demultiplexing clock signal d', for example, by a time T from d (refer to FIG. 30) to d' (or in the opposite direction if necessary).

Consequently, the D-type flip-flop 137 performs electric time division demultiplexing processing based on the clock signal d' whose phase has been shifted by the phase variation element 138. In this instance, since the phase of the clock signal inputted to the D-type flip-flop 137 was shifted in synchronism with the timing at which the bit train to be optically time division demultiplexed and extracted by the optical switch 22 was switched, the center of identification by the D-type flip-flop 137 is prevented from being displaced from the center of a bit of the input signal, and a desired demultiplexed signal e' can be extracted.

Also the phase of the identification clock signal for the identification circuit 136 in the following stage is shifted, when the optical signal to be time division demultiplexed by the optical switch 22 is switched, from f (refer to FIG. 27) to f' in synchronism with the switching timing of the optical signal to be time division demultiplexed described above.

Consequently, when switching of the bit train to be optically time division demultiplexed and extracted is performed, synchronism of the phase relationship between the signal after the optical time division demultiplexing signal and the identification clock signal can be established.

In this manner, with the optical time division demultiplexing apparatus 140 according to the fourteenth embodiment of the present invention, since it includes the phase variation element 131 as an extraction bit train switching element which switches the bit train to be extracted after time division demultiplexing is performed by the optical switch 22, the bit train to be extracted after time division demultiplexing processing can be switched arbitrarily. Consequently, the optical time division demultiplexing apparatus 140 is advantageous also in that reception setting in accordance with a requirement of a receiver of the optical signal can be performed.

Further since, if the bit train to be optically time division demultiplexed and extracted by the optical switch 22 in the preceding stage is switched, then the phase of the clock signal when electric time division demultiplexing is to be performed by the D-type flip-flop 137 can be shifted by a desired amount, the center of identification by the D-type flip-flop 137 can be prevented from being displaced from the center of a bit of the input signal. Accordingly, the optical time division demultiplexing apparatus 140 is advantageous also in that a desired optical signal can be obtained efficiently and with certainty.

Further, if the optical signal to be time division demultiplexed by the optical switch 22 is switched, then since the phase of the identification clock signal for the identification circuit 136 can be shifted by a desired amount in synchronism with the switching timing of the optical signal to be time division demultiplexed, when switching of the bit train to be extracted as a result of optical time division demultiplexing processing is performed, synchronism of the phase relationship between the signal after the optical time division demultiplexing processing and the identification clock signal can be established. Consequently, the optical time division demultiplexing apparatus 140 is advantageous in that a desired bit train can be identified efficiently and with certainty.

p. Others

For an optical switch used to construct the optical time division demultiplexing apparatus according to the embodiments described above, any of an optical switch which applies a driving clock signal to two electrodes and another optical switch which applies a driving clock signal to only one of two electrodes can be applied. Particularly, in an optical switch which applies a driving clock signal to only one of two electrodes, also a dc bias voltage for compensation for an operating point drift is applied to the electrode on the side to which the clock signal is applied.

Further, while, where the optical time division demultiplexing apparatus according to the embodiments described above are applied in a form wherein a driving clock signal is applied to each of two electrodes of an optical switch, a single driving circuit is commonly used to produce the driving clock signals to the two electrodes, the optical time division demultiplexing apparatus are not limited to this, and separate circuits may otherwise be prepared.

Furthermore, while the optical time division demultiplexing apparatus according to the embodiments described above employ a band-pass filter in order to perform operating point stabilization control, particularly where a stable operation is allowed, the band-pass filter may be omitted suitably to construct an optical time division demultiplexing apparatus.

The present invention is not limited to the specifically described embodiment, and variations and modifications may be made without departing from the scope of the present invention.

What is claimed is:

1. An optical time division demultiplexing apparatus, comprising:

a clock signal generation element for generating a clock signal for optical time division demultiplexing processing of a received optical signal which has been transmitted at a predetermined first bit rate;

an optical switch for time division demultiplexing the received first bit rate optical signal into a second bit-rate optical signal having a half speed of said first bit rate based on said clock signal, whose frequency is half the frequency of said first bit rate, from said clock signal generation element; and an operating point stabilization control circuit for superposing a predetermined low frequency signal on said clock signal to be supplied to said optical switch for optical time division demultiplexing processing and controlling said clock signal which is to be supplied to said optical switch, based on a phase difference between a component of said predetermined low frequency signal of the demultiplexed optical signal as the result of time division demultiplexing processing by said optical switch and a component of said predetermined low frequency signal so that the individual optical switch runs with a stable operation characteristic in such a manner that its operating point normally tends to assume a target position.

2. An optical time division demultiplexing apparatus as claimed in claim 1, wherein said operating point stabilization control circuit comprises:

a low frequency oscillator for generating the predetermined low frequency signal set in advance;

a low frequency superposition element for superposing the low frequency signal from said low frequency oscillator on the clock signal from said clock signal generation element and outputting a resulting signal as the clock signal to said optical switch;

a low frequency signal detection element for detecting the low frequency signal included in the optical signal time division demultiplexed by said optical switch; and a bias voltage supply element for applying to said optical switch a bias voltage corresponding to a difference between a phase of the low frequency signal from said low frequency oscillator and a phase of the low frequency signal detected by said low frequency signal detection element.

3. An optical time division demultiplexing apparatus as claimed in claim 1, further comprising an extraction bit train switching element for switching a bit train to be time division demultiplexed and extracted from said optical switch.

4. An optical time division demultiplexing apparatus as claimed in claim 1, wherein said optical switch is formed from a 1-input 1-output Mach-Zehnder optical switch.

5. An optical time division demultiplexing apparatus as claimed in claim 1, wherein said optical switch is formed from a 1-input 2-output Mach-Zehnder optical switch.

6. An optical time division demultiplexing apparatus as claimed in claim 1, wherein said optical switch is in the form of a multi-switch comprised of a plurality of optical switches connected in series multiple stages, each of the last-named optical switches for time division demultiplexing the received first or preceding bit-rate optical signal into a second or succeeding bit-rate optical signal having a half speed of said first or preceding bit rate based on a clock signal, whose frequency is half the frequency of said first or preceding bit rate, from said clock signal generation element.

7. An optical time division demultiplexing apparatus as claimed in claim 1, wherein said optical switch is in the form of a multi-switch composed of a plurality of optical switches, connected in parallel, said apparatus further comprising:

a first optical splitting element for splitting the received optical signal into a plurality of optical signals with keeping the first bit rate unchanged;

the last-named optical switches each for time division demultiplexing an individual part of the split first bit-rate optical signals into a second bit-rate optical signal having a half speed of said first bit rate based on said clock signal; and an optical combining element for combining the individual parts of optical signals which are time division demultiplexed by said optical switches.

8. An optical time division demultiplexing apparatus as claimed in claim 7, wherein said operating point stabilization control circuit comprises:

a low frequency oscillator for generating a predetermined low frequency signal set in advance;

a low frequency signal detection element for detecting the low frequency signal from the optical signal combined by said optical combining element;

a bias voltage supply element for applying to said optical switches a bias voltage corresponding to the difference between a phase of the low frequency signal from said low frequency oscillator and a phase of the low frequency signal detected by said low frequency signal detection element;

a plurality of low frequency superposition elements provided individually for said optical switches for superposing the low frequency signal from said low frequency oscillator on the clock signal from said clock signal generation element;

a plurality of bias voltage holding elements provided individually for said optical switches for temporarily holding information of the bias voltage from said bias voltage supply element;

a first change-over switch for switching the low frequency signal from said low frequency oscillator to selectively output the low frequency signal to one of said low frequency superposition elements; and a second change-over switch for switching the bias voltage from said bias voltage supply element to selectively output the bias voltage to one of said bias voltage holding elements, wherein said operating point stabilization control circuit controls switching of said first and second change-over switches such that the bias voltage from said bias voltage supply element is supplied, so that an operating point of the clock signal to be supplied to a selected one of said optical switches may be a fixed position on an operation characteristic of the selected one of said optical switches, and controls updating of the information of the bias voltages held by said bias voltage holding elements.

9. An optical time division demultiplexing apparatus as claimed in claim 7, wherein said first optical splitting element wavelength demultiplexes a wavelength multiplexed component of the received signal light.

10. An optical time division demultiplexing apparatus as claimed in claim 7, wherein said first optical splitting element demultiplexes two polarized wave components of the received signal light.

11. An optical time division demultiplexing apparatus as claimed in claim 10, wherein a second optical splitting element for demultiplexing two polarized wave components of the optical signal combined by said optical combining element is provided in a stage preceding to said operating point stabilization control circuit.

12. An optical time division demultiplexing apparatus as claimed in claim 2, wherein said operating point stabilization control circuit detects a drift of an operating characteristic of said optical switch based on a difference between the phase of the low frequency signal from said low frequency oscillator and the phase of the low frequency signal detected by said low frequency signal detection element, and supplies a bias voltage with which the operating point of the clock signal to be supplied to the optical switch is controlled to a fixed position of the operating characteristic.

13. An optical time division demultiplexing apparatus as claimed in claim 6, wherein each of said optical switches in said operating point stabilization control circuit comprises:

a low frequency oscillator for generating a predetermined low frequency signal, the predetermined low frequency signals generated by the low frequency oscillators of said optical switches being different from each other, a low frequency superposition element for superposing the predetermined low frequency signal from said low frequency oscillator on the clock signal from said clock signal generation element and outputting a resulting signal as the clock signal to the corresponding optical switch, a low frequency signal detection element for detecting the low frequency signal from the optical signal outputted from the optical switch in the last stage, and a bias voltage supply element for applying to the optical switch a bias voltage corresponding to a difference between a phase of the low frequency signal from said low frequency oscillator and a phase of the low frequency signal detected by said low frequency signal detection element.

14. An optical time division demultiplexing apparatus as claimed in claim 7, wherein each of said optical switches in said operating point stabilization control circuit comprises:

a low frequency oscillator for generating a predetermined low frequency signal, a low frequency superposition element for superposing the predetermined low frequency signal from said low frequency oscillator on the clock signal from said clock signal generation element, a low frequency signal detection element for detecting the low frequency signal from the optical signal combined by said optical combining element, and a bias voltage supply element for applying to the optical switch a bias voltage corresponding to a difference between a phase of the low frequency signal from said low frequency oscillator and a phase of the low frequency signal detected by said low frequency signal detection element.

15. An optical time division demultiplexing apparatus as claimed in claim 14, wherein said operating point stabilization control circuit detects a drift of an operating characteristic of the corresponding optical switch based on a difference between the phase of the low frequency signal from the corresponding low frequency oscillator and the phase of the low frequency signal detected by the corresponding low frequency signal detection element, and supplies a bias voltage with which the operating point of the clock signal to be supplied to the optical switch is controlled to a fixed position of the operating characteristic.

16. An optical time division demultiplexing apparatus as claimed in claim 8, wherein said operating point stabilization control circuit detects a drift of an operating characteristic of the corresponding optical switch based on a difference between the phase of the low frequency signal from the corresponding low frequency oscillator and the phase of the low frequency signal detected by the corresponding low frequency signal detection element, and supplies a bias voltage with which the operating point of the clock signal to be supplied to the optical switch is controlled to a fixed position of the operating characteristic. corresponding optical switch.

17. An optical time division demultiplexing apparatus as claimed in claim 12, wherein said operating point stabilization control circuit comprises:

a drift detection element for detecting a drift of the operation characteristic of said optical switch based on the difference between the phase of the low frequency signal detected by said low frequency signal detection element and the phase of the low frequency signal from said low frequency oscillator, and a bias voltage application element for applying a bias voltage corresponding to the drift detected by said drift detection element in a superposing relationship with the clock signal to be supplied to said optical switch.

18. An optical time division demultiplexing apparatus as claimed in claim 13, wherein said operating point stabilization control circuit detects a drift of an operating characteristic of the corresponding optical switch based on a difference between the phase of the low frequency signal from the corresponding low frequency oscillator and the phase of the low frequency signal detected by the corresponding low frequency signal detection element, and supplies a bias voltage with which the operating point of the clock signal to be supplied to the optical switch is controlled to a fixed position of the operating characteristic.

19. An optical time division demultiplexing apparatus as claimed in claim 18, wherein said operating point stabilization control circuit comprises:

a drift detection element for detecting a drift of the operation characteristic of the corresponding optical switch based on the difference between the phase of the low frequency signal detected by the corresponding low frequency signal detection element and the phase of the low frequency signal from the corresponding low frequency oscillator, and a bias voltage application element for applying a bias voltage corresponding to the drift detected by said drift detection element in a superposing relationship with the clock signal to be supplied to the corresponding optical switch.

20. An optical time division demultiplexing apparatus as claimed in claim 13, further comprising a branching element for branching the optical signal outputted from said optical switch or switches, and a photo-electric conversion element for converting the optical signal branched by said branching element into an electric signal, said low frequency signal detection element being formed from a band-pass filter capable of passing therethrough the predetermined low frequency component of the electric signal from said photoelectric conversion element.

21. An optical time division demultiplexing apparatus as claimed in claim 16, wherein said operating point stabilization control circuit comprises:

a drift detection element for detecting a drift of the operation characteristic of the corresponding optical switch based on the difference between the phase of the low frequency signal detected by the corresponding low frequency signal detection element and the phase of the low frequency signal from the corresponding low frequency oscillator, and a bias voltage application element for applying a bias voltage corresponding to the drift detected by said drift detection element in a superposing relationship with the clock signal to be supplied to the corresponding optical switch.

22. An optical time division demultiplexing apparatus as claimed in claim 14, further comprising a branching element for branching the optical signal outputted from said optical switch or switches, and a photo-electric conversion element for converting the optical signal branched by said branching element into an electric signal, said low frequency signal detection element being formed from a band-pass filter capable of passing therethrough the predetermined low frequency component of the electric signal from said photoelectric conversion element.

23. An optical time division demultiplexing apparatus as claimed in claim 6, wherein said operating point stabilization control circuit comprises:

a low frequency oscillator for generating a predetermined low frequency signal set in advance;

a low frequency signal detection element for detecting the low frequency signal from the optical signal outputted from the optical switch in the last stage;

a phase difference detection element for detecting a difference between a phase of the low frequency signal from said low frequency oscillator and a phase of the low frequency signal detected by said low frequency signal detection element;

a plurality of low frequency superposition elements provided individually for said optical switches in the individual stages for superposing the low frequency signal from said low frequency oscillator on the clock signal from said clock signal generation element;

a plurality of bias voltage holding elements provided individually for said optical switches in the individual stages for temporarily holding bias voltages corresponding to detection information of the phase is difference from said phase different detection element;

a first change-over switch for switching the low frequency signal from said low frequency oscillator to selectively output the low frequency signal to one of said low frequency superposition elements in the individual stages; and a second change-over switch for switching the phase difference detection information from said phase difference detection element to selectively output the phase difference detection information to one of said bias voltage holding elements in the individual stages, wherein said operating point stabilization control circuit controls switching of said first and second change-over switches so that control of an operating point of a clock signal to be supplied to a selected one of said optical switches to a fixed position of an operation characteristic of the optical switch is performed to switch the selected optical switch, and said operating point stabilization control circuit further controls updating of information of the bias voltages to be held by said bias voltage holding elements.

24. An optical time division demultiplexing apparatus as claimed in claim 23, further comprising a branching element for branching the optical signal outputted from said optical switch or switches, and a photo-electric conversion element for converting the optical signal branched by said branching element into an electric signal, said low frequency signal detection element being formed from a band-pass filter capable of passing therethrough the predetermined low frequency component of the electric signal from said photoelectric conversion element.

25. An optical time division demultiplexing apparatus as claimed in claim 23, wherein said operating point stabilization control circuit detects a drift of an operating characteristic of the corresponding optical switch based on a difference between the phase of the low frequency signal from the corresponding low frequency oscillator and the phase of the low frequency signal detected by the corresponding low frequency signal detection element, and supplies a bias voltage with which the operating point of the clock signal to be supplied to the optical switch is controlled to a fixed position of the operating characteristic.

26. An optical time division demultiplexing apparatus as claimed in claim 8, further comprising a branching element for branching the optical signal outputted from said optical switch or switches, and a photo-electric conversion element for converting the optical signal branched by said branching element into an electric signal, said low frequency signal detection element being formed from a band-pass filter capable of passing therethrough the predetermined low frequency component of the electric signal from said photoelectric conversion element.

27. An optical time division demultiplexing apparatus as claimed in claim 25, wherein said operating point stabilization control circuit comprises:
  a drift detection element for detecting a drift of the operation characteristic of the corresponding optical switch based on the difference between the phase of the low frequency signal detected by the corresponding low frequency signal detection element and the phase of the low frequency signal from the corresponding low frequency oscillator, and a bias voltage application element for applying a bias voltage corresponding to the drift detected by said drift detection element in a superposing relationship with the clock signal to be supplied to the corresponding optical switch.

28. An optical time division demultiplexing apparatus as claimed in claim 6, further comprising an extraction bit train switching element for switching a bit train to be time division demultiplexed and extracted from said optical switches.

29. An optical time division demultiplexing apparatus as claimed in claim 6, wherein each of said optical switches is formed from a 1-input 1-output Mach-Zehnder optical switch.

30. An optical time division demultiplexing apparatus as claimed in claim 3, wherein said extraction bit train switching element shifts the operating point of said optical switch on the operation characteristic by one half period.

31. An optical time division demultiplexing apparatus as claimed in claim 28, wherein said extraction bit train switching element shifts the operating point of the optical switch, from which a bit train is to be time division demultiplexed and extracted, on the operation characteristic by one half period.

32. An optical time division demultiplexing apparatus as claimed in claim 6, wherein each of said optical switches is formed from a 1-input 2-output Mach-Zehnder optical switch.

33. An optical time division demultiplexing apparatus as claimed in claim 3, wherein said extraction bit train switching element is formed from a clock variation element for varying the clock signal from said clock signal generation element and outputting a resulting signal to said optical switch.

34. An optical time division demultiplexing apparatus as claimed in claim 28, wherein said extraction bit train switching element is formed from a clock variation element for varying the clock signal from said clock signal generation element and outputting a resulting signal to the optical switch from which a bit train is to be time division demultiplexed and extracted.

35. An optical time division demultiplexing apparatus as claimed in claim 7, wherein each of said optical switches is formed from a 1-input 1-output Mach-Zehnder optical switch.

36. An optical time division demultiplexing apparatus as claimed in claim 33, wherein said clock variation element is capable of reversing the clock signal from said clock signal generation element.

37. An optical time division demultiplexing apparatus as claimed in claim 34, wherein said clock variation element is capable of reversing the clock signal from said clock signal generation element.

38. An optical time division demultiplexing apparatus as claimed in claim 7, wherein each of said optical switches is formed from a 1-input 2-output Mach-Zehnder optical switch.

39. An optical time division demultiplexing apparatus as claimed in claim 33, wherein said clock variation element is capable of delaying the clock signal from said clock signal generation element by one half period.

40. An optical time division demultiplexing apparatus as claimed in claim 34, wherein said clock variation element is capable of delaying the clock signal from said clock signal generation element by one half period.

41. An optical time division demultiplexing apparatus as claimed in claim 28, wherein said extraction bit train switching element is formed from an optical path length switch interposed in a stage preceding to said optical switches and capable of switching the bit train to that of an optical path with which an optical path length of the received light signal is varied by one time slot.

42. An optical time division demultiplexing apparatus as claimed in claim 3, wherein said extraction bit train switching element is formed from an optical path length switch interposed in a stage preceding to said optical switch and capable of switching the bit train to that of an optical path with which an optical path length of the received light signal is varied by one time slot.

43. An optical time division multiplex transmission system, comprising:
  an optical time division multiplexing apparatus comprising a pump light source for outputting pump light, a low frequency oscillator for generating a predetermined low frequency signal, a low frequency superposition element for superposing the low frequency signal from said low frequency oscillator on an input clock signal and a data signal, an optical switch for performing time division multiplexing modulation of the pump light from said pump light source with the clock signal and the data signal on which the low frequency signal has been superposed by said low frequency superposition element and transmitting a resultant optical signal at a first bit rate, a low frequency signal detection element for detecting the low frequency signal included in the optical signal time division multiplexed by said optical switch, and a bias voltage supply element for applying to said optical switch a bias voltage corresponding to a-difference between a phase of the low frequency from said low frequency oscillator and a phase of the low frequency signal detected by said low frequency signal detection element; and an optical time division demultiplexing apparatus comprising a clock signal generation element for generating a clock signal for optical time division demultiplexing processing of a received optical signal which has been transmitted at the first bit rate, a low frequency oscillator for generating a predetermined low frequency signal, a low frequency superposition element for superposing the low frequency signal from said low frequency oscillator on the clock signal from said clock signal generation element, an optical switch for time division demultiplexing the received first bit rate optical signal into a second bit-rate optical signal having a half speed of said first bit rate based on the clock signal, whose frequency is half the frequency of said first bit rate, on which the low frequency signal has been superposed by said low frequency superposition element, a low frequency signal detection element for detecting the low frequency signal included in the optical signal time division demultiplexed by said optical switch, and a bias voltage supply element for applying to said optical switch a bias voltage corresponding to a difference between a phase of the low frequency signal from said low frequency oscillator and a phase of the low frequency signal detected by said low frequency detection element.

44. An optical time division demultiplexing apparatus, comprising:

a clock signal generation element for generating a clock signal for optical time division demultiplexing processing of a received optical signal, which comprises a composite bit train composed of two or more bit trains;

an optical switch for time division demultiplexing the optical signal and outputting the resultant signal with one selected bit train based on the clock signal from said clock signal generation element;

an extraction bit train switching element for changing a bit train, which is contained said optical signal, to be time division demultiplexed and extracted from said optical switch; and an operating point stabilization control circuit for superposing a predetermined low frequency signal on said clock signal, which is to be supplied to said optical switch for optical time division demultiplexing processing and controlling said clock signal, based on a phase difference between said predetermined low frequency which has been affected by the demultiplexed optical signal due to the result of time division demultiplexing processing by said optical switch so that said optical switch can be in such a manner stable in operation characteristic that its operating point normally tends to assume a target position irrespective of the changing of said extraction bit train changing element.

45. An optical time division demultiplexing apparatus as claimed in claim 44, wherein said extraction bit train switching element shifts the operating point of said optical switch on the operation characteristic by one half period.

46. A demultiplexed signal switching method for switching, when an inputted optical signal containing a plurality of bit trains has been transmitted at a predetermined first bit rate, an outputted optical signal with another optical signal to be optically time division demultiplexed based on a clock signal whose frequency is half the frequency of the first bit rate, using a plurality of optical switches connected in series multiple stages, said method comprising the steps of:

at each of the plural optical switches,
(a) superposing a predetermined low frequency signal on the clock signal, which is to be supplied to the individual optical switch, for optical time division demultiplexing processing;
(b) time division demultiplexing the inputted signal by the individual optical switch using the clock signal on which the predetermined low frequency signal is superposed in said step (a);
(c) controlling the clock signal, which is to be supplied to the individual optical switch, based on a phase difference between a component of the predetermined low frequency signal of the demultiplexed optical signal from said step (b) and a component of the predetermined low frequency signal so that the individual optical switch can stable in operation characteristic in such a manner that its operating point normally tends to assume a target position;

during said steps (a) through (c),
in connection with two or more of the optical switches,
(d) changing at one of the optical switches a then-current bit train to another bit train to be optically time division demultiplexed; and
(e) shifting a phase of the clock signal, which is to be inputted to another succeeding said one optical switch, by a desired amount in synchronism with said changing said step (d).

47. A demultiplexed signal switching method comprising the steps of:

(a) providing a optical time division demultiplexing apparatus which comprises
(i) an optical switch for time division demultiplexing optically a received optical signal, which comprises a composite bit train composed of two or more bit trains, from an external device based on a first clock signal and outputting the demultiplexed optical signal,
(ii) an optical converter for converting the optical signal from the optical switch into an electrical signal and outputting the converted electrical signal, and
(iii) an electrical switch for time division demultiplexing electrically the electrical signal from the optical converter based on a second clock signal and outputting the demultiplexed electrical signal;
(b) changing at the optical switch a then-current bit train to another bit train to be optically time division demultiplexed; and
(c) shifting a phase of the second clock signal, which is to be inputted to the electrical switch, by a desired amount in synchronism with said switching said step (b).

48. A demultiplexed signal switching method comprising the steps of:

(a) providing a optical time division demultiplexing apparatus which comprises
  (i) an optical switch for time division demultiplexing optically a received optical signal, which comprises a composite bit train of two or more bit trains, from an external device based on a first clock signal and outputting the demultiplexed optical signal,
  (ii) an optical converter for converting the optical signal from the optical switch into an electrical signal and outputting the converted electrical signal, and
  (iii) an identification circuit for identifying the electrical signal from the optical converter based on a second clock signal; and
(b) changing at the optical switch a then-current bit train to another bit train to be optically time division demultiplexed; and
(c) shifting a phase of the second clock signal, which is to be inputted to the identifying circuit, by a desired amount in synchronism with said switching said step (b).

49. An optical time division demultiplexing apparatus as claimed in claim 15, wherein said operating point stabilization control circuit comprises:
  a drift detection element for detecting a drift of the operation characteristic of the corresponding optical switch based on the difference between the phase of the low frequency signal detected by the corresponding low frequency signal detection element and the phase of the low frequency signal from the corresponding low frequency oscillator, and
  a bias voltage application element for applying a bias voltage corresponding to the drift detected by said drift detection element in a superposing relationship with the clock signal to be supplied to the corresponding optical switch.

50. An optical time division demultiplexing apparatus as claimed in claim 2, further comprising a branching element for branching the optical signal outputted from said optical switch or switches, and a photo-electric conversion element for converting the optical signal branched by said branching element into an electric signal, said low frequency signal detection element being formed from a band-pass filter capable of passing therethrough the predetermined low frequency component of the electric signal from said photoelectric conversion element.

51. An optical time division demultiplexing apparatus as claimed in claim 7, further comprising an extraction bit train switching element for switching a bit train to be time division demultiplexed and extracted from said optical switches.

52. An optical time division demultiplexing apparatus as claimed in claim 51, wherein said extraction bit train switching element shifts the operating point of the optical switch, from which a bit train is to be time division demultiplexed and extracted, on the operation characteristic by one half period.

53. An optical time division demultiplexing apparatus as claimed in claim 51, wherein said extraction bit train switching element is formed from a clock variation element for varying the clock signal from said clock signal generation element and outputting a resulting signal to the optical switch from which a bit train is to be time division demultiplexed and extracted.

54. An optical time division demultiplexing apparatus as claimed in claim 53, wherein said clock variation element is capable of reversing the clock signal from said clock signal generation element.

55. An optical time division demultiplexing apparatus as claimed in claim 53, wherein said clock variation element is capable of delaying the clock signal from said clock signal generation element by one half period.

56. An optical time division demultiplexing apparatus as claimed in claim 51, wherein said extraction bit train switching element is formed from an optical path length switch interposed in a stage preceding said optical switches and capable of switching the bit train to that of an optical path with which an optical path length of the received light signal is varied by one time slot.

* * * * *

UNITED STATES PATENT AND TRADEMARK OFFICE
CERTIFICATE OF CORRECTION

PATENT NO.: 6,118,564
DATED : September 12, 2000
INVENTOR(S): Hiroki OOI, et al.

It is certified that an error appears in the above-identified patent and that said Letters Patent is hereby corrected as shown below:

Col. 65, lines 22-23, delete "corresponding optical switch".

Signed and Sealed this

Twenty-fourth Day of April, 2001

Attest:

NICHOLAS P. GODICI

Attesting Officer　　　　Acting Director of the United States Patent and Trademark Office